(12) United States Patent
Wang

(10) Patent No.: US 11,496,805 B2
(45) Date of Patent: Nov. 8, 2022

(54) VIDEO DELIVERY METHOD AND APPARATUS, AND ELECTRONIC DEVICE

(71) Applicants: NANJING SUPERCOHESION COMMUNICATION SCIENCE & TECHNOLOGY CO., LTD., Nanjing (CN); TSINGHUA SHENZHEN INTERNATIONAL GRADUATE SCHOOL, Shenzhen (CN)

(72) Inventor: Xingjun Wang, Shenzhen (CN)

(73) Assignees: NANJING SUPERCOHESION COMMUNICATION SCIENCE & TECHNOLOGY CO., LTD., Nanjing (CN); TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 17/298,274

(22) PCT Filed: Oct. 28, 2019

(86) PCT No.: PCT/CN2019/113721
§ 371 (c)(1),
(2) Date: May 28, 2021

(87) PCT Pub. No.: WO2020/108200
PCT Pub. Date: Jun. 4, 2020

(65) Prior Publication Data
US 2022/0021940 A1    Jan. 20, 2022

(30) Foreign Application Priority Data

Nov. 30, 2018 (CN) .......................... 201811458456.7

(51) Int. Cl.
*H04N 21/472* (2011.01)
*H04N 21/438* (2011.01)
(Continued)

(52) U.S. Cl.
CPC ... *H04N 21/47202* (2013.01); *H04N 21/4383* (2013.01); *H04N 21/44204* (2013.01); *H04N 21/440281* (2013.01); *H04N 21/845* (2013.01)

(58) Field of Classification Search
CPC ............ H04N 21/252; H04N 21/2407; H04N 21/25435; H04N 21/44224;
(Continued)

(56) References Cited

U.S. PATENT DOCUMENTS 8,510,787 B2 * 8/2013 Agrawal ............ H04N 21/6408
725/127
8,640,166 B1 * 1/2014 Craner ............... H04N 21/4826
725/38

(Continued)

FOREIGN PATENT DOCUMENTS

CN    1604642 A     4/2005
JP    H11261985 A   9/1999

OTHER PUBLICATIONS

Wang, Xingjun et al., "DeRe: A Buffer Saving and Controllable Video-on-Demand Broadcasting Scheme for Heterogeneous Receivers" IEEE Transactions on Broadcasting, vol. 62, No. (1), Mar. 31, 2016, chapters I-IV; pp. 69-81.
(Continued)

*Primary Examiner* — Jason Salce
(74) *Attorney, Agent, or Firm* — Hauptman Ham, LLP

(57) ABSTRACT

A video distribution method and apparatus and an electronic device, where the video distribution method includes: obtaining a popularity of each video program, wherein the popularity is a preference degree of a user group for a video program within a statistic time period; and determining, according the popularity of each video program, to distribute
(Continued)

a video content of the video program through repeating broadcasting channels or by means of broadcasting on demand.

33 Claims, 18 Drawing Sheets

(51) Int. Cl.
    *H04N 21/4402*     (2011.01)
    *H04N 21/442*     (2011.01)
    *H04N 21/845*     (2011.01)

(58) Field of Classification Search
    CPC ......... H04N 21/6582; H04N 21/25891; H04N 21/4532; H04N 21/4668
    See application file for complete search history.

(56) References Cited

U.S. PATENT DOCUMENTS

| | | | |
|---|---|---|---|
| 2007/0022437 A1* | 1/2007 | Gerken | H04N 21/4348 348/E7.071 |
| 2008/0196064 A1* | 8/2008 | Murakami | H04N 21/466 725/46 |
| 2009/0019490 A1* | 1/2009 | Tanikawa | H04N 21/4332 348/E5.002 |
| 2009/0070848 A1* | 3/2009 | Kim | H04N 21/61 725/131 |
| 2016/0212472 A1* | 7/2016 | Shirasuka | H04N 21/4394 |
| 2016/0239571 A1* | 8/2016 | Rowe | H04N 21/251 |
| 2018/0213234 A1* | 7/2018 | Kimura | H04N 21/2662 |
| 2018/0240030 A1* | 8/2018 | Shen | G06F 16/9535 |
| 2019/0058770 A1* | 2/2019 | Galai | H04L 67/535 |
| 2021/0287244 A1* | 9/2021 | Bhole | H04N 21/8456 |

OTHER PUBLICATIONS

Wang, Cuirong et al., "Video permission control algorithm based on popularity in video on demand system", Journal of Northeastern University (Natural Science)),vol. 24, No. (2), Feb. 28, 2003, sections 1-3, 4 pgs., with English abstract.

International Search Report issued in corresponding International Application No. PCT/CN2019/113721; dated Jan. 21, 2020; China National Intellectual Administration, Beijing, China, 8 pgs.

Written Opinion issued in corresponding International Application No. PCT/CN2019/113721; dated Jan. 13, 2021, China National Intellectual Administration, Beijing, China, 8 pgs.

* cited by examiner

VIDEO DELIVERY METHOD AND APPARATUS, AND ELECTRONIC DEVICE

RELATED APPLICATIONS

The present application is a U.S. National Phase of International Application Number PCT/CN2019/113721 filed Oct. 28, 2019 and claims priority to Chinese Application Number 201811458456.7 filed Nov. 30, 2018.

TECHNICAL FIELD

The present application relates to the technical field of multimedia, and in particular, to a video distribution method and apparatus and an electronic device.

BACKGROUND

At present, video flow in the Internet flows is growing rapidly, and this growth will probably continue and even accelerate. The huge number of users and the huge video data stream will lead to network congestions, and further influence the user's Internet surfing experience.

To solve the problem of congestions, operators can only increase inputs to a backbone network and an underlying equipment to increase bandwidth to alleviate the increasing demand for bandwidth day by day and reduce the degree of network congestions. However, to fundamentally and perfectly solve the problem of Internet congestions, the key lies in improving the distribution efficiency of Internet videos and other contents. However, the existing Internet distribution solutions have many problems such as low efficiency. Video on Demand (VOD) is a widely applied video distribution technology and is very popular with the majority of users. The VOD, just as its name implies, is a video-on-demand system that broadcasts programs according to requirements of audiences for transmitting the video content clicked or selected by the users to all requested users. Although VOD technology has been constantly improved and developed, it still faces many problems and challenges: during video distribution, network congestions increase, a transmission latency increases, user experiences decrease, and network expansion is difficult. Content Delivery Network (CDN), which started from mirroring image storage technology twenty years ago, and P2P content distribution technology later actually alleviate many problems mentioned above to some extent; however, the solution is not thorough enough, and it also brings about other difficult problems: the investment in network construction increases exponentially with the increasing of users, the energy consumption of the whole network increases linearly, etc.

Based on the descriptions above, it can be known that it is urgent to propose a new video distribution solution to solve the technical problem of network congestions by providing distribution efficiency without increasing investments.

SUMMARY

The purposes of implementations of the present application are to provide a video distribution method and apparatus and an electronic device; popular video programs with the highest popularity ranking are distributed by means of repeating broadcasting, while the video programs with the lowest popularity ranking are distributed by means of broadcasting on-demand. In a time period when repeating broadcasting channels are spare, or a push efficiency is higher than that of repeating broadcasting and broadcasting on demand, the repeating broadcasting channels are used for recommending target video programs. It can not only greatly reduce the overall data flow, but also quite slowly increase the flow with the increasing of user clicks, which can greatly improve the distribution efficiency.

To implement the purpose above, an implementation of the present application provides a video distribution method, including:

obtaining a popularity of each video program, wherein the popularity is a preference degree of a user group for a video program within a statistic time period; and determining, according the popularity of each video program, to distribute a video content of the video program through repeating broadcasting channels or by means of broadcasting on demand.

To implement the purpose above, an implementation of the present application provides a video distribution method, including:

when the number of repeating broadcasting channels is greater than the total number of repeating broadcasting channels occupied by all video programs distributed through the repeating broadcasting channels, distributing a corresponding video program through spare repeating broadcasting channels according to a total preference degree list.

To implement the purpose above, an implementation of the present application provides a video distribution apparatus, including:

a popularity obtaining unit, configured to obtain a popularity of each video program, wherein the popularity is a preference degree of a user group for a video program within a statistic time period; and a video distribution unit, configured to determine, according the popularity of each video program, to distribute a video content of the video program through repeating broadcasting channels or by means of broadcasting on demand.

To implement the purpose above, an implementation of the present application provides a video distribution apparatus, including:

a first video distribution unit, configured to, when the number of repeating broadcasting channels is greater than the total number of repeating broadcasting channels occupied by all video programs distributed through the repeating broadcasting channels, distribute a corresponding video program through spare repeating broadcasting channels according to a total preference degree list.

To implement the purpose above, an implementation of the present application provides an electronic device, including a memory, a processor, and a computer program stored on the memory and runnable on the processor, where when the computer program is executed by the processor, the video distribution method above is implemented.

To implement the purpose above, an implementation of the present application provides a storage medium, having a computer program stored thereon, where when the computer program is executed, steps of the video distribution method above is implemented.

In view of the above, as compared with the existing technology, in this technical solution, popular videos are distributed to the user terminal by means of repeating broadcasting or recommending, and non-hot videos are distributed to the user terminal by means of VOD, while can not only greatly reduce the overall data flow, but also quite slowly increase the flow with the increasing of user clicks. Hence, the problem of flow congestions on the Internet during peak hours will be solved. Moreover, it can greatly improve the distribution efficiency, reduce flows, reduce investments, and save resources and energy.

BRIEF DESCRIPTION OF THE DRAWINGS

To more clearly explain the implementations of the present application or the technical solutions in the existing technology, a brief introduction of the drawings required in the descriptions of the implementations or the solution is given below. Obviously, the drawings in the descriptions below are only some implementations recited in the present application; for a person having ordinary skill in the art, other drawings can also be obtained according to these drawings in the premise of not paying a creative labor.

DETAILED DESCRIPTION

Figure 1:
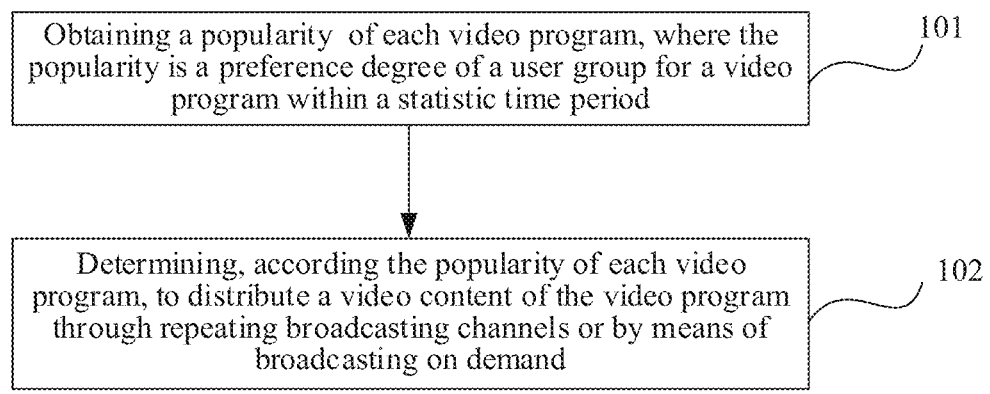
FIG. 1 is a flow chart I of a video distribution method according to this specification.

In combination with the drawings, clear and complete descriptions of the technical solutions in the embodiments of the present disclosure below refer to nonrestrictive exemplary embodiments shown in the drawings and detailed in the descriptions below to more completely explain the exemplary embodiments of the present disclosure and multiple features and beneficial details thereof. It should be noted that the features shown in the drawings do not have to be drawn to scale. Descriptions of known materials, assemblies, and process technologies are omitted in the present disclosure so as not to obfuscate the exemplary embodiments of the present disclosure. The given examples only aim at facilitating the understanding of the implementing of the exemplary embodiments of the present disclosure and further enabling a person skilled in the art to implement the exemplary embodiments. Hence, these examples should not be understood as the limitation to the ranges of the embodiments of the present disclosure.

Unless otherwise particularly defined, technical terms or scientific terms used in the present disclosure should be in general meanings understood by a person having ordinary skill in the art of the present disclosure. Words such as "first" and "second" used in the present disclosure do not represent any order, number, or importance, but just used for distinguishing different composition parts. In addition, in each embodiment of the present disclosure, same or similar reference mark numbers represent same or similar components.

At present, a mainstream network distribution technology, particularly a data distribution technology of the public Internet, is implemented based on a storage and forwarding routing switching network. The multi-layer connection and complex routing and switching structure causes the network transmission latency and congestions. Repeating broadcasting is a kind of broadcasting, which is an improvement and promotion on the basis of broadcasting. It allows multiple users to share channel resources, thus achieving an effect of greatly reducing the overall data flow. A MultiChannel Repeating Broadcasting (MRB) algorithm is the core of this technical solution, since it fundamentally solves the problem of the excessive low distribution efficiency of the popular videos. As a broadcasting network takes over the burden of distributing popular videos on the Internet, the problem of flow congestions during peak hours on the Internet will be solved and the speed of people accessing the Internet will be significantly improved.

In a conventional broadcasting system, each broadcasting channel would broadcast a full video program at a certain time period. The rate at which data is transmitted over this channel is the playing bit rate of the program. Hence, neither the previous TV nor the existing set-top box needs to cache the received data, but directly decodes and plays the received data. However, once the user misses an opening part of the video program, the entire video needs to be viewed for the next time after waiting. However, the waiting time is quite long, and generally it can start again only after the video ends. To reduce waiting time of users and viewers, we can allocate multiple broadcasting channels to transmit the data of the popular video program, so as to reduce the waiting time of the users and viewers and improve the user experience. According to different needs and purposes, there are different repeating broadcasting algorithms, each of which has its own advantages and disadvantages. On the basis of typical repeating broadcasting algorithms such as a staggered repeating broadcasting algorithm and a fast repeating broadcasting algorithm (FB), many repeating broadcasting algorithms are derived.

For this technical solution, a main idea of repeating broadcasting is: first, a video program is sliced, then these sliced are recombined to be divided into different groups, and then in different broadcasting channels, different slice combinations are periodically transmitted; a client then selectively obtains the slice it desires and receives and downloads same according to a slice combination mode of a distribution end. As long as it is ensured that the client can continuously obtain the slice it desires and view same. Repeating broadcasting technology is a highly efficient video distribution technical solution designed to provide a high quality video service for a large number of concurrent users at the same time in a Near Video-on-Demand (NVOD) system network. The repeating broadcasting technology not only serves a large number of users, but also greatly reduces the total flow generated. Therefore, a server, the users or the underlying network all have very little demand for Internet resources. For this reason, repeating broadcasting can greatly save the Internet resources, and with the increasing of the number of users, relatively, more Internet resources will be saved, and the advantages of repeating broadcasting will become more significant. When the video program is distributed by means of repeating broadcasting, the existing repeating broadcasting algorithm and many repeating broadcasting algorithms derived therefrom can all be applied, rather than exhaustive. On the basis of understanding the essence of the technical solution of the present application, a person skilled in the art may produce other deformations or transformations on the basis of the technical solution of the present application. However, as long as the functions implemented and the technical effect achieved thereby are similar to those in the present application, they shall all fall within the protection scope of the present application.

To describe the repeating broadcasting mode in more details, the DeRe repeating broadcasting algorithm and WHB repeating broadcasting algorithm are taken as examples for illustration. The DeRe repeating broadcasting algorithm is one with excellent performances in User Bandwidth Limitation (RBL) algorithms, i.e., limiting bandwidth access values of all users and only allowing access by the users to a certain number of channels, so that the waiting time of the users with the narrow bandwidth is reduced; however, a slight disadvantage is that it would slightly increase the waiting time of the users with the relatively wider bandwidth. The WHB repeating broadcasting algorithm is an improved algorithm using a Harmonic Broadcasting (HB) algorithm as a basis; the WHB repeating broadcasting algorithm improves the original slicing mode and channel design while maintaining a characteristic of low transmission bandwidth requirements of the HB algorithm, so that it is easier for the WHB repeating broadcasting algorithm to be implemented in an engineering manner. The disadvantage thereof is that after the user sends a viewing request, it is required to view the video only after waiting a time length of a time system. The DeRe repeating broadcasting algorithm and WHB repeating broadcasting algorithm greatly reduce the waiting time by slicing the video into a large amount of slices and repeating broadcasting different slices on the same channel. Since the DeRe repeating broadcasting algorithm allows users with different bandwidths to access at the same time, and is suitable for serving a large amount of users having different requirements, and the time lengths of all the users are the same; while the bandwidth required by the WHB repeating broadcasting algorithm when transmitting the video program is close to a lower limit of the principle of the repeating broadcasting algorithm; for the two algorithms, the speed for the slice generation number is relatively fast along with the increasing of the repeating broadcasting channels, and is easily implemented in an engineering manner. Hence, the repeating broadcasting solution used in the video distribution solution provided in this technical solution is preferably the DeRe algorithm or WHB algorithm.

For the DeRe repeating broadcasting algorithm or WHB repeating broadcasting algorithm, once the repeating broadcasting channel number is determined, the maximum slice number of repeating broadcasting thereof is also determined; different repeating broadcasting channels correspond to different repeating broadcasting slice numbers. Since the repeating broadcasting channel number and the slice number in this technical solution are two very important parameters, the relation between the two parameters are introduced below:

As can be seen from Formula (1), the repeating broadcasting channel number CN and the corresponding slice number SN are roughly in an exponential relation.

$$SN = C_1 * \exp(C_2 * CN) \qquad \text{Formula (1)}$$

where $C_1$ and $C_2$ are fitting constant parameters; in the DeRe repeating broadcasting algorithm $C_1$=0.8080, $C_2$=0.7720; in the WHB repeating broadcasting algorithm $C_1$=0.56, $C_2$=1. exp( ) is an index function using a natural constant e as a base.

The following researches and discussions in this technical solutions are all conducted on the following generally simplified model:

1) for each program, a repeating broadcasting solution or a pure broadcasting-on-demand solution is adopted for distribution; and 2) viewing a certain program by a user meets a poisson process, and for each user, clicking a certain program is random.

Then which solution is selected to distribute depends on flows brought by distributing the video; a solution that can generate a relatively fewer flow is necessarily selected to distribute the video, so that a maximum distribution efficiency can be achieved.

It is assumed that a certain program time length is PT (the unit may be a minute or a second); an average effective click rate in the observing time period T is R, and the number of clicking persons is V (the observing time T herein has the same unit as the program time length PT; the video data average transmission (or playing) rate is b; and the average click rate is an average clicking person number in a unit time); measurements occupied by the channel resources all use the channel number*time*video data average transmission (or playing) rate to represent the flow, i.e., Q.

The two solutions are respectively discussed as follows:

(1) The Flow of the Pure Broadcasting-On-Demand Distribution Solution

In T observing time period, the number of clicking persons is V=R*T, and since a separate channel resource is allocated to each user in pure broadcasting on demand, the channel number is consistent with the user number. Since the user viewing a video is a behavior of a client requesting a server to execute a service, while the behavior for requesting a service meets a poisson process, the user viewing a certain program meets the poisson process. According to a theorem of the poisson process: the time for events occurring in a certain time period in the poisson process is known, and therefore, a joint density of the occurring time of these events is evenly distributed in the time period. It can be known that the V click is evenly distributed in the observing time T, and therefore, the pure broadcasting-on-demand solution is divided into two situations for discussion:

a) when the observing time is less than or equal to the program time length, i.e., when T≤PT:

since the observing time is less than or equal to the program time length, the users who enter in the observing time are all intercepted and cannot view the complete program (when and only when the observing time is equal to the program time length and the users enters right at the starting of the statistics, the users can view the complete program), the average viewing time length is $$\frac{T}{2}$$

and at this time, the average flow in T is:

$$Q_{VOD} = R*T*\frac{T}{2}*b = b*V*\frac{T}{2}, T \leq PT \qquad \text{Formula (2)}$$

b) when the observing time is greater than the program time length, i.e., when T>PT:

since the observing time is greater than the program time length, for the users who enter in the observing time, some R*(T−PT) users may view the complete program while the R*PT users are all intercepted and cannot view the complete program, the average viewing time length is $$\frac{PT}{2}$$

and at this time, the average flow in T is:

$$Q_{VOD} = b*R(T-PT)*PT + b*R*PT*\frac{PT}{2} \qquad \text{Formula (3)}$$
$$= b*R*T*PT\left(1-\frac{PT}{2T}\right) = b*V*PT\left(1-\frac{PT}{2T}\right), T > PT$$

Since the repeating broadcasting solution relates to slicing the program in an equal length, the slice time length S of the video program and the definition η of the ratio of the program time length and the statistic time can be defined as:

$$S = \frac{PT}{SN}, \eta = \frac{PT}{T} \qquad \text{Formula (4)}$$

Hence, the flow of the pure broadcasting-on-demand distribution solution is $$Q_{VOD} = \qquad \text{Formula (5)}$$
$$\begin{cases} b*R*T*\frac{T}{2} = b*V*\frac{T}{2} & , \eta \geq 1 \\ b*R*T*PT\left(1-\frac{PT}{2T}\right) = b*V*PT\left(1-\frac{PT}{2T}\right) & , \eta < 1 \end{cases}$$

Herein, b is a constant; for specific program and statistic time, PT, T, and η are all constants; and therefore, the flow of the pure broadcasting-on-demand distribution solution is linearly increased $Q_{VOD}$ along with the user click V. This point is contradictory with the preceding investigations and studies because the pure broadcasting-on-demand distribution solution herein is an idealized broadcasting-on-demand:

1) not considering an extra flow generated through multi-branch routing, storage, and forwarding;

2) assuming a full connection of a network and infinite routing resources;

3) not considering congestions and packet loss in the transmission process, and the like.

However, actually, these factors are inevitable, it is hard to avoid a large amount of extra flows, and necessarily, an upwarp of the flow increasing curve will be caused.

(2) The Flow of the Repeating Broadcasting Distribution Solution

First, it is assumed that the repeating broadcasting channel number is CN, and the corresponding slice number is SN; as can be known from the analysis above that the slice number SN is the function of the channel number CN. For the DeRe repeating broadcasting algorithm, the correspondence between CN and SN is shown in Table 1 below. For the WHB repeating broadcasting algorithm, the correspondence between CN and SN is shown in Table 2 below.

TABLE 1

| | Channel number CN | | | | | | | | | |
|---|---|---|---|---|---|---|---|---|---|---|
| | 2 | 3 | 4 | 5 | 6 | 7 | 8 | 9 | 10 | 11 |
| Slice number SN | 3 | 9 | 20 | 43 | 89 | 186 | 391 | 837 | 1819 | 3942 |

TABLE 2

| | Channel number CN | | | | | | | | | |
|---|---|---|---|---|---|---|---|---|---|---|
| | 2 | 3 | 4 | 5 | 6 | 7 | 8 | 9 | 10 | 11 |
| Slice number SN | 3 | 10 | 30 | 82 | 224 | 614 | 1673 | 4548 | 12365 | 33614 |

It should be indicated that the repeating broadcasting solution does not support fast forward; if the user make the fast forward, the video content of the corresponding time length period of the fast forward request will be obtained by means of supplementary packet, to support the continuous viewing by the user. In this technical solution, to reduce the waiting time for the user when starting to view the video, the supplementary packet refers to obtaining the video content of the corresponding time length period of the fast forward request by means of broadcasting on demand after the user issues a video playing request.

In addition, the user sends the video playing request and the video program is distributed to the client by means of repeating broadcasting. It is possible that the moment corresponding to the video playing request is not the starting point of the video sub-slice; the user needs to wait for the starting point of the first video sub-slice so as to obtain the video content. Hence, the repeating broadcasting slice time length of the video program decides the waiting time when the user requests the video to play. The threshold of the video slice time length is determined upon statistics; when the time length of the repeating broadcasting slice of the video program is greater than the threshold of the time length of the video slice, it indicates that the waiting time for the user to request the video play is likely to exceed the user's tolerance. At this time, the corresponding video content of the time length period is obtained by means of broadcasting on-demand to improve the user's experience. The time length of the video content obtained through supplementary packet is the moment from the starting moment of the video program to the starting point of the first video sub-splice in any repeating broadcasting channel. When the time length of the repeating broadcasting slice of the video program is less than or equal to the threshold of the time length of the video slice, it indicates that the waiting time for the user to request the video play is within the range of the user's tolerance. At this time, the corresponding video content of the time length period is obtained without the supplementary packet mode.

Table 3 shown the percentage of the cache size of the user and the average supplementary packet size of each fast forward to the program total time length in different channels in the DeRe repeating broadcasting solution and the WHB repeating broadcasting solution. As can be seen that from an aspect of cache, although the repeating broadcasting solution needs a relatively large cache of the user, since a cache device of the current user system is relatively cheap, the influences of the cache can be omitted; from an aspect of fast forward, although the repeating broadcasting solution does not support fast forward, the average supplementary packet amount during each fast forward of the user is quite small, and therefore, during fast forwarding by the user, no relatively large flow would be caused and the normal viewing by the user would not be influence.

TABLE 3

| | | Channel number CN | | | | | | | | | |
|---|---|---|---|---|---|---|---|---|---|---|---|
| | | 2 | 3 | 4 | 5 | 6 | 7 | 8 | 9 | 10 | 11 |
| Slice number SN (DeRe) | | 3 | 9 | 20 | 43 | 89 | 186 | 391 | 837 | 1819 | 3942 |
| Cache size (%) | average | 16 | 38 | 40 | 46 | 54 | 61 | 67 | 69 | 72 | 74 |
| | Maximum | 33 | 44 | 55 | 53 | 59 | 63 | 68 | 70 | 72 | 74 |
| | Minimum | 0 | 11 | 5 | 11 | 4 | 6 | 4 | 4 | 3 | 2 |
| Average fast forward supplementary packet (%) | | 5 | 6 | 6 | 6 | 5 | 5 | 5 | 4 | 6 | 5 |
| Slice number SN (WHB) | | 3 | 10 | 30 | 82 | 224 | 614 | 1673 | 4548 | 12365 | 33614 |
| Cache size (%) | | 67 | 47 | 39 | 38 | 37 | 37 | 37 | 37 | 37 | 37 |
| Average fast forward supplementary packet (%) | | 20 | 14 | 12 | 11 | 11 | 11 | 11 | 11 | 11 | 11 |

To reduce the consumption of the supplementary packet flow caused by fast forward, some improvements made from the repeating broadcasting solution itself can effectively reduce the supplementary packet flow. A current solution is to add a repeating broadcasting channel for each program that enters the repeating broadcasting, and the slice arrangement of the repeating broadcasting channel is as follows: the distributed slices have the same slice number as the last channel of the program repeating broadcasting, but the repeating broadcasting order of the slices is completely opposite to that of the last channel of the program repeating broadcasting. For example, the slice arrangement of the last channel is 4-1, 5-1, . . . , 10-1, and then the serial number of sub-slices of the time system incrementally increases periodically, so the arrangement of the newly added channel is 10-10, 9-9, . . . , 4-4. After that, the serial number of sub-slices of the time system incrementally decreases periodically.

Based on the descriptions above, the Internet flows generated through repeating broadcasting are divided into two parts:

a) repeating broadcasting channels always existing;

b) channels upon supplementary packet to reduce delay.

For a) above, the repeating broadcasting channel number is CN; the duration for these channels is T; therefore, the channel resource occupied by the distributed content is:

$$Q_{MCB1} = b*T*CN \qquad \text{Formula (6)}$$

For b) above, supplementary packet is a measure adopted to enable the user missing the first slice or far away from the next slice to obtain the video resource in time; the longest time length of supplementary packet is the time length of the minimum slice, and is $$\frac{PT}{SN}$$

Similar to pure broadcasting on demand, since the click is evenly reached in the time period, the average supplementary packet time is $$\frac{PT}{2*SN}.$$

The occupied channel resource is:

$$Q_{MCB2} = b*V*\frac{PT}{2*SN} \qquad \text{Formula (7)}$$

Hence, the total flow during repeating broadcasting distribution is the sum of the two:

$$Q_{MCB} = Q_{MCB1} + Q_{MCB2} = b*T*CN + b*V*\frac{PT}{2*SN} \qquad \text{Formula (8)}$$
$$= b*\left(T*CN + \frac{T*R*PT}{2SN}\right) = b*T\left(CN + \frac{V*S}{2T}\right)$$

Hence, if $Q_{MCB} < Q_{VOD}$ is met, obviously the distribution using the repeating broadcasting is more efficient, the generated flow is less, and we should use the repeating broadcasting distribution solution. Solving an inequation by combining formulas (4), (5), and (8):

a) when PT<T $$V > \frac{2CN}{1 - \frac{S}{T} - \left(1 - \frac{PT}{T}\right)^2} \qquad \text{Formula (9)}$$

b) when PT≥T $$V > \frac{2CN}{1 - \frac{S}{T}} \qquad \text{Formula (10)}$$

It should be noted that in Formula (10), when PT≥T, a situation of T=S may exists, rendering the formula meaningless. As a matter of fact, when T=S, it means that the statistic time length is equal to the minimum slice time length, while actually, it is impossible for the statistic time length to be less than the minimum slice time length of the repeating broadcasting, i.e., it is constant that T>S. Furthermore, to meet T>S, while S for different programs may be different, it is therefore necessary to find out the maximum slice time length $S_{max}$, so that $$T > S_{max} = \frac{PT_{max}}{SN_{min}},$$

and therefore, when the allowed minimum repeating broadcasting channel number is 2, $$T > \frac{PT_{max}}{3},$$

and when the allowed minimum repeating broadcasting channel number is 3, $$T = \frac{PT_{max}}{10}.$$

In conclusion, $Q_{MCB} < Q_{VOD}$, when using the repeating broadcasting distribution solution, $$V > V_{th} = \begin{cases} \dfrac{2CN}{1 - \dfrac{S}{T} - \left(1 - \dfrac{PT}{T}\right)^2}; PT < T \\ \dfrac{2CN}{1 - \dfrac{S}{T}}; S \le T < PT \\ \text{meaningless } S \ge T \end{cases} \qquad \text{Formula (11)}$$

where the left of the inequation is the number viewers of a certain video, and the right of the inequation is a threshold, represented by $V_{th}$.

In this technical solution, Formula (11) only provide a criterion form. The criterion standard is based on the flows generated by different video distribution modes. The video distribution solution that generates a small flow is used for distributing the corresponding video program so that the performance of the digital network is greatly improved. Formula (11) only represents the criterion based on the form of the effective click; for a person skilled in the art, obtaining the unit channel flow carrying rates of different video programs based on the effective click, and forming the representation criterion upon the comparison between the unit channel flow carrying rate of the video program and the unit channel flow carrying rate threshold, can also determine whether the video program can use the repeating broadcasting solution.

In view of the above, determining whether to use the repeating broadcasting threshold is only related to the channel number. In this way, after the channel number is determined, it is clear whether to use the repeating broadcasting solution. As shown in Table 4, some thresholds are calculated.

As can be seen from Formula (11) that the threshold $V_{th}$ is not only related to the slice number SN and the channel number CN, but also related to the program time length and the observing time length. Under the situation of not considering the channel resource, once we select the repeating broadcasting solution with the number of CN of the channels to distribute the video, it means that the number of viewers in T is definitely greater than the threshold $V_{th}$ corresponding to CN.

The explanations of Table 4 is that, taking the DeRe repeating broadcasting algorithm as an example, when $\eta=0.5$ and if the click in a certain time period is relatively small, less than 6.86, we can only use the pure broadcasting-on-demand distribution solution, that is, not using the repeating broadcasting solution for distribution; when the click is slightly larger, for example, between 6.86 and 8.64, using the repeating broadcasting solution with two channels is better than the pure broadcasting-on-demand solution; if the click is between 18.74 and 21.37, using the repeating broadcasting solution with 2-7 channels is better than the pure broadcasting-on-demand solution.

However, in actual situations, the channel resources are all limited; the threshold will be fluctuated under the influences of factors such as the channel resource, the program number, and the program popularity ranking.

It should be explained that Formula (11) above is only a form for popularity criterion, rather than exhaustive. On the basis of understanding the essence of the technical solution of the present application, a person skilled in the art may produce other deformations or transformations on the basis of the technical solution of the present application. As long as the functions implemented is determining and selecting the push mode of the video content based on flows generated by different video distribution modes, and the technical effect achieved thereby are similar to those in the present application, they shall all fall within the protection scope of the present application.

Taking Formula (11) as an example, in this technical solution, whether to use the repeating broadcasting solution for a certain program is related to the click thereof in a certain time period. The click of the program is not only related to unpopular and popularity of the program itself, in addition, even for the same program, the click will also be greatly different in different time periods in one day. The two situations are respectively discussed and analyzed as follows:

The videos are divided into unpopular and popular ones; for the relatively popular videos, the click is relatively large, and therefore, it is more likely to use the repeating broadcasting distribution solution; in this way, the maximum video pushing efficiency is implemented using the minimum flow; while for the relatively unpopular videos, the click is small, and therefore it is more likely to use the pure broadcasting-on-demand distribution solution.

The click distribution of the Internet video program meets the Two-Eight Law: that is, about 20% of the video programs (generally the relatively popular programs) occupy about 80% of the total click; moreover, the remaining about 80% of the video programs (generally those relatively unpopular programs) only have about 20% of the click. Specifically speaking, this phenomenon is studied by many researchers, and the distribution is a long-tailed distribution or Zipf distribution. The clicks for most contents in the Internet, in particular, the video contents, all meet the law. Taking the video flow with the maximum occupation in the network flow as an entry point, under the situation of knowing the VOD obeys the long-tailed distribution, it is further analyzed that for different program types, the long-

TABLE 4

| | Channel number CN | | | | | | | | | |
|---|---|---|---|---|---|---|---|---|---|---|
| | 2 | 3 | 4 | 5 | 6 | 7 | 8 | 9 | 10 | 11 |
| Slice number SN (DeRe) | 3 | 9 | 20 | 43 | 89 | 186 | 391 | 837 | 1819 | 3942 |
| $V_{th}$ (2PT = T) | 6.86 | 8.64 | 11.03 | 13.54 | 16.12 | 18.74 | 21.37 | 24.02 | 26.68 | 29.34 |
| $V_{th}$ (PT = 2T) | 12.00 | 7.71 | 8.89 | 10.49 | 12.28 | 14.15 | 16.08 | 18.04 | 20.02 | 22.01 |
| Slice number SN (WHB) | 3 | 10 | 30 | 82 | 224 | 614 | 1673 | 4548 | 12365 | 33614 |
| $V_{th}$ (2PT = T) | 6.36 | 8.50 | 10.90 | 13.44 | 16.05 | 18.69 | 21.34 | 24.00 | 26.67 | 29.33 |
| $V_{th}$ (PT = 2T) | 7.74 | 7.30 | 8.56 | 10.25 | 12.11 | 14.05 | 16.02 | 18.01 | 20.00 | 22.00 | tailed distribution is also obeyed; hotspot programs occupy a large proportion of the number of broadcasting on demand.

The formula for the long-tailed distribution is as follows:

$$V_m = \frac{A*V}{m^a} \qquad \text{Formula (12)}$$

where m is a positive integer representing the ranking, $V_m$ is a click of the m-th popular program, V is the sum of all program clicks, and A and a are fitting parameters.

In the traditional video distribution system of the Internet, the playing delay of the video and the speed of video transmission will directly affect the customer's viewing experience after VOD by the user, and these two points are completely decided by the network environment. At the peak of Internet usage, for example, in the evening, each user will focus on VOD for viewing; at this moment, whether it is a video server, or the whole video distribution network, the load thereof is very high, and the user may encounter the phenomenon of overlong of the cache time of the video caused by slow connections of network, which greatly reduces the video viewing experience of users.

Based on the descriptions above, due to people's daily work and life, the distribution of video clicks in a day is very uneven, which is obvious. Generally speaking, video viewings and clicks tend to peak around 8 or 9 p.m., with a small spike around 12 o'clock at noon. The lowest trough is between 3 a.m. and 5 a.m. Specifically, for a specific website, for the number of clicks of a certain video in a specific time period occupied on the clicks of the video in one day is almost an unchanged constant numeral value.

Specifically, for a specific website, for the number of clicks of a certain video in a specific time period occupied on the clicks of the video in one day is almost an unchanged constant numeral value. Hence, we summarize as follows:

$$V_{T_n} = V_D * \lambda_n \qquad \text{Formula (13)}$$

where $\Sigma_{n=1}^{N} V_{T_n} = V_D$; $\Sigma_{n=1}^{N} V_D * \lambda_n = V_D \Sigma_{n=1}^{N} \lambda_n = V_D$; $\Sigma_{n=1}^{N} \lambda_n = 1$; N is the total number of time periods; $V_{T_n}$ is a click in a n-th time period; $V_D$ is the total click of one day; and $\lambda_n$ is a proportion factor in the time period.

Based on the characteristics that VOD on the Internet obeys the long-tailed distribution and the broadcasting network can push a specific video stream through the repeating broadcasting solution, this technical solution will have a special server to mark the VOD popularity of all videos and distribute them according to the popularity:

(1) The popular video programs with the top popularity ranking is distributed using the repeating broadcasting solution.

(2) A large amount of video programs with the latter popularity ranking are subjected to video distribution by means of broadcasting on demand through Internet Content Distribution (CDN) networks, the telecom operators' IPTV networks, and radio and television networks.

(3) The video programs with the slightly latter popularity ranking are calculated based on a hidden factor recommendation model for the user viewing behaviors, and then is subjected to video recommendation using the repeating broadcasting channels in a time period when repeating broadcasting channels are spare, or when a push efficiency is higher than that of repeating broadcasting and broadcasting on demand.

Based on the description above, as shown in FIG. 1, it is a flow chart I of a video distribution method according to this specification. It includes:

Step 101): obtain a popularity of each video program, where the popularity is a preference degree of a user group for a video program within a statistic time period; and Step 102): determine, according the popularity of each video program, to distribute the video program through repeating broadcasting channels or by means of broadcasting on demand.

For this technical solution, a relatively long time period is partitioned, and it is ensured that the effective click of the video program is not sharply fluctuated in each small time period (not sharply fluctuated is generally considered as the fluctuation does not exceed 10%, i.e., the minimum value is not less than 90% of an average value, and the maximum value is not greater than 110% of the average value); if the condition can be met without partitioning, it is unnecessary to partition; a small time interval is selected and then the following processing is conducted in each small time period one by one; for each video program in the time period, the flows generated by different video distribution modes are calculated. Video push is carried out based on the selection of the video distribution mode with a small flow.

In this technical solution, the definition of popularity may be that each video program is represented by the flows generated by different video distribution modes in a statistic time period, and may also be that the user's historical broadcasting-on-demand data is used for representing the preference degree of the video programs.

It is precisely because not all users view the whole video program that the effective click is used as an index of the click of a program; the index can thus effectively distinguish the difference between viewing the whole video program and only viewing a part of the video program. The effective click means that for a specific effective click numeral value V of a certain video, it is considered that there will be V users who will view the video and view all the contents of the video, no matter in the repeating broadcasting solution or broadcasting on-demand solution.

Considering that the viewing progress for a video by a user has a difference, the general trend is that fewer people are viewing a video the longer the viewing time extends, which means more and more people will quit viewing mid-stream. Hence, if only using the time for the user to click the video as the effective click, it is obviously not reasonable. Considering an extreme situation, in a certain time period, if the video with the length of 100 s, 90 users only view the first 10 s of the video while the remaining 90 s are only viewed by 10 users. Hence, 100 is a poor definition of the effective clicks for the time period, because 100 effective clicks mean that 100 users will click the video and view the entire video. In terms of resources, there is a huge waste of resources. It has been expected that 100 users would watch the last 90 s of the video, but it turns out that only 10 people view it.

Therefore, to eliminate the waste of resources caused by this extreme situation, the effective click and effective click rate of the video are defined as follows:

setting a video with a video length being PT, where the viewing progress distribution function is w(t), 0≤t≤PT, and w(t) is one monotone decreasing function, and represents the number of people with the video viewing time not less than t. Hence, the effective click is:

$$V = \frac{1}{PT} \int_0^{PT} w(t)dt \qquad \text{Formula (49)}$$

Furthermore, an expression of the effective click rate is:

$$R = \frac{V}{T} = \frac{1}{T*PT} \int_0^{PT} w(t)dt \qquad \text{Formula (50)}$$

It should be noted that the viewing progress distribution function is w(t) and is a characteristic of the video program itself, but is also related to the observing time period T, and therefore, the effective click R and the effective click V are also attributes of the video program itself, but will also be affected by the observing time period T.

Through Formula (50), the effective click of the extreme example just given can be calculated as $\int_0^{0.1} 100 dt + \int_{0.1}^{1} 10 dt = 19$, which means that is equivalent to 19 users completely viewing the video and viewing all videos. As can be seen that the index for defining the effective click is a compromise and relatively reasonable index.

On this basis, in this embodiment, taking Formula (11) as an example, it can be seen that when a click in a certain time period is greater than a certain threshold, using the repeating broadcasting in this time period for distribution is cost-effective, otherwise, adopting the pure broadcasting-on-demand for distribution is more cost-effective.

Hence, the step of using an effective click of each video program to determine to distribute the video program through the repeating broadcasting channels or by means of broadcasting on demand includes:

comparing the effective click of each video program with an effective click threshold, to obtain a first comparison result; and determining to distribute the video program through the repeating broadcasting channels or by means of broadcasting on demand according to the first comparison result, wherein the effective click threshold is determined according to a time length of the video program, the number of the repeating broadcasting channels, an observing time period, and a repeating broadcasting slice time length.

In actual applications, if the effective click of the video program is greater than the effective click threshold, the video program is distributed through the repeating broadcasting channels; or if the effective click of the video program is less than or equal to the effective click threshold, the video program is distributed by means of broadcasting on demand.

For this technical solution, each video program in the video program set is determined through Formula (11) so that the video program at a long-tailed part in the video set is distributed by means of broadcasting on demand. Other video programs are all distributed through the repeating broadcasting channels as long as the repeating broadcasting channels are sufficient. Under the situation that the repeating broadcasting channels are insufficient, the repeating broadcasting solution needs to be optimized so that the video distribution efficiency is relatively higher.

The video programs without the long-tailed parts through filtering in the video program set are determined as the video programs distributed through the repeating broadcasting channels; since the repeating broadcasting channels are insufficient, it is required to select which video programs are repeatedly broadcast first so that the video distribution efficiency is relatively higher. A first optimization solution for the repeating broadcasting solution is:

sorting the effective clicks of the video programs distributed through the repeating broadcasting channels; and distributing the corresponding video program through the repeating broadcasting channels according to a sorting result.

For this optimization solution, if according to the sorting of the sizes of the effective clicks in descending order, the corresponding video programs are distributed through the repeating broadcasting channels according to a sorting result, so that the video program with a large effective click is preferentially distributed through the repeating broadcasting channels.

The effective click does not considers a viewing behavior of a user, i.e., 1) how many people view the video, which is also referred to as a click frequency $V_{frequency}$;

2) a viewing time length of each user, i.e., the distribution curve of on-line viewers of this program.

Figure 2:
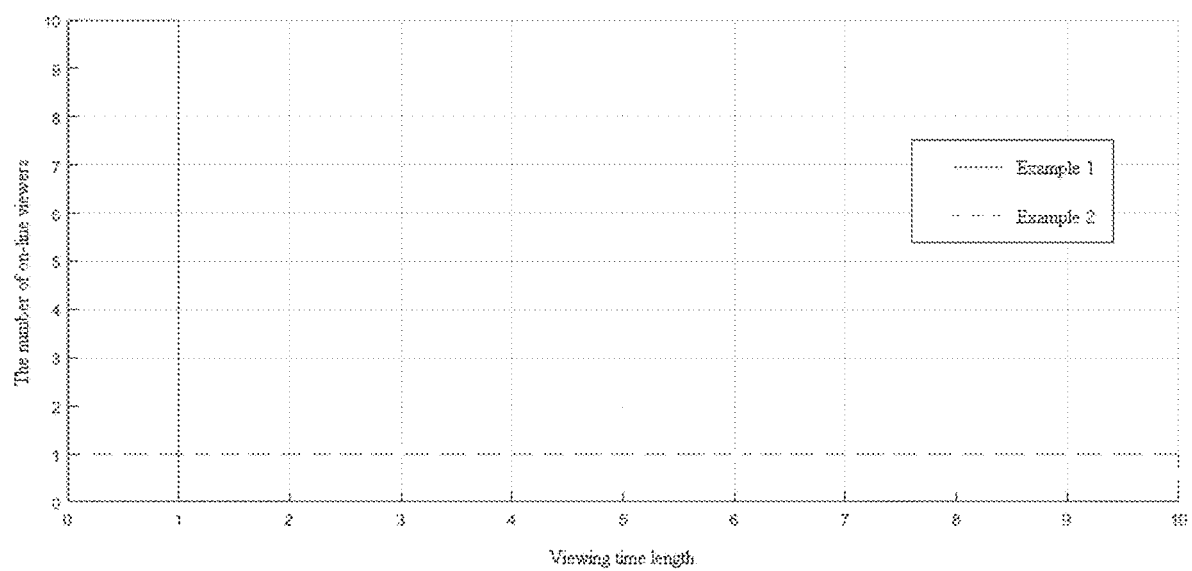
FIG. 2 is a schematic diagram of comparison of flows brought only considering an effective click in this embodiment.

In addition, this index does not consider influences caused by low latency supplementary packaging, either. Hence, for the index to be used as a popularity index has a defect. Considering an example shown in FIG. 2, example 1 provides that 100 persons view a first program, and each person only views for 1 s and then quits the program; example 2 provides that one person views a second program, and a viewing time length is 100 s. The distribution curve of on-line viewers of the two programs are as shown in FIG. 2. In this example, the video flows generated by two viewing behaviors are the same (i.e., areas of a solid line rectangle and a dotted line rectangle). Actually, example 1 only needs to allocate 1 channel to carry all flows, while example 2 needs 3 channels. Under the situation of limited channel resources, it is obvious that the first program needs to be first allocated instead of processing the two programs at the same priority.

Furthermore, on the basis of the effective click, the popularity of the program is partitioned using the unit channel flow carrying rate as a standard. The method for calculating the unit channel flow carrying rate is: dividing a difference, which is obtained by subtracting a supplementary packet flow generated through repeating broadcasting of the video program from a sum of flows generated by viewing the video program by all users in the statistic time period, by the number of channels used for repeating broadcasting of the program, and further by a statistic time length $T_n$, where a calculation formula is as follows:

$$e_1 = \frac{Q_m - Q_{sup}}{CN} = \frac{\sum_{m=1}^{N}\left(t_m - \frac{S}{2}\right)*b}{CN*T_n} \qquad \text{Formula (14)}$$

where $t_m$ is the total time length of viewing the program of a m-th user in the statistic time period $T_n$; N is the total number of people viewing the video in the time period $T_n$; S is a corresponding slice time length of the program; CN is the number of channels required for transmitting the video; and b is a video transmission bit rate. The effective click rate is a ratio of the sum of the viewing time lengths for viewing the program by all users in the statistic time period and the statistic time length. The expression thereof is:

$$R_v^{(T_n)} = \frac{\sum_{m=1}^{N} t_m * b}{T_n}$$

Formula (15)

where $t_m$ is the total time length of viewing the program of a m-th user in the statistic time period $T_n$; N is the total number of people viewing the video in the time period $T_n$; and b is a video transmission bit rate.

As compared with the preceding index, this index is more reasonable, but still has a defect. The size of the unit channel flow carrying rate depends on the channel number allocated to the video program, while the channel number allocated to the video program further depends on the size of the unit channel flow carrying rate with respect to the unit channel flow carrying rate of other video programs, and therefore, it falls in the dilemma of logical nesting and becomes a pathological problem. One solution is to take the derivative of Formula (14) of each program with the channel number CN, and in addition, the formula after the derivative is equal to 0, so as to obtain the maximum value of the unit channel flow carrying rate, then compare the maximum values of the unit channel flow carrying rates of different video programs, and further arrange the repeating broadcasting channel according to the comparison result. However, this solving method can only ensure to obtain a locally optimal solution.

Based on the description above, a second optimization solution for the repeating broadcasting solution is:

obtaining a unit channel flow carrying rate of the video program distributed through the repeating broadcasting channels;

sorting the unit channel flow carrying rates of the video programs distributed through the repeating broadcasting channels; and distributing the corresponding video program through the repeating broadcasting channels according to a sorting result.

For this technical solution, when the number of the repeating broadcasting channels that can be allocated is greater than the total number of the repeating broadcasting channels occupied by all video programs, the time length of the repeatedly broadcast part of the video program is the total time length of the video program. When the number of the repeating broadcasting channels that can be allocated is less than the total number of the repeating broadcasting channels occupied by all video programs, as mentioned above, using the unit flow carrying rate as an index to further perform efficiency optimization on the video programs distributed by means of repeating broadcasting can only ensure to obtain a locally optimal solution. To further solve the problem of popularity ranking, first, each video program is partitioned into multiple segments on time length, and each segment corresponds to one transmission channel number. The partitioning steps are as follows:

Firstly, according to the popularity comparison of each video program, which video programs in the video set are distributed through the repeating broadcasting channels are determined. The minimum value of the sum of the repeating broadcasting flow and the supplementary packet flow when the repeating broadcasting solution is used for the video program repeating broadcasting distribution is obtained. The calculation process is: the sum of the repeating broadcasting flow and the supplementary packet flow is $$CN * T + V_{frequency} * \frac{S}{2},$$

and the derivative of CN in this formula and the result is 0, so as to obtain the minimum value of the sum of the repeating broadcasting flow and the supplementary packet flow, so as to determine the corresponding channel number needed for transmitting the videos during the minimum value of the sum of the repeating broadcasting flow and the supplementary packet flow. Hence, using CN through formulas $SN = c_1 * e^{c_2 * CN}$ and $$S = \frac{PT}{SN},$$

the slice time length S and the repeating broadcasting slice number SN of the video program can be obtained.

According to Table 1 or 2, using the relation between the repeating broadcasting channel number and the maximum slice number can determine the channel number required during different time lengths of repeating broadcasting each program. Specifically, taking the WHB repeating broadcasting algorithm as an example, for a certain video program, a part with the time length of 1 S starting from 0 is the first segment, corresponding to one transmission channel, a part with the time length of 3 S is a second segment, corresponding to three transmission channels, and so on.

Figure 3:
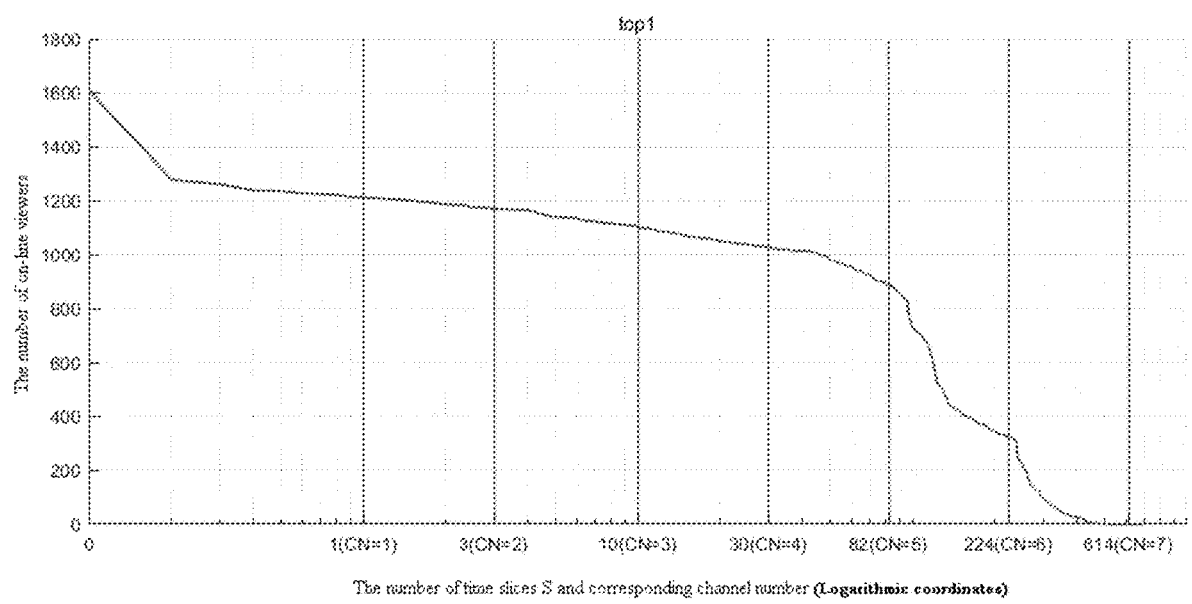
FIG. 3 is a schematic diagram of a curve of the number of on-line viewers of a video program.

As shown in FIG. 3, it is a schematic diagram of a curve of the number of on-line viewers of a video program. For each video program, the statistic time length thereof T=PT, i.e., the program time length. In FIG. 3, a vertical line is the channel number threshold corresponding to the video program time length. The sending channel number required by a part exceeding the vertical line is added by one as compared with a part before the vertical line. After processing above is performed on each video program, the VOD flow size that can be saved for each program every time when a channel is added. Specifically, for a certain video program, the size of an area between the curve of the on-line viewers and the viewing time progress between the two vertical lines represents the VOD flow size that can be carried by adding one channel. The comprehensive comparison is performed on the flows that can be carried by adding one channel for all video programs, so as to determine the channel number required by repeating broadcasting each program, and the time length of the part for repeating broadcasting of the program. Specifically, each time one repeating broadcasting channel is added, the maximum VOD flow that can be carried when the repeating broadcasting channel is allocated to the parts that do not use repeating broadcasting of different video programs is considered, and the corresponding video program time period that generates the maximum VOD flow is placed in the repeating broadcasting channel, and then the process is repeated until all the repeating broadcasting channels are used.

Based on the description above, to further improve the distribution efficiency and overcome the problem brought by the repeating broadcasting solution of using the unit channel flow carrying rate as an index, a third optimization solution for the repeating broadcasting solution is:

obtaining the number of the repeating broadcasting channels, the number of repeating broadcasting slices, and a curve of the number of on-line viewers of the video program distributed through the repeating broadcasting channels;

partitioning the curve of the number of on-line viewers by a time length period corresponding to each addition of a repeating broadcasting channel according to a relation list between the number of the repeating broadcasting channels and the number of repeating broadcasting slices;

in all curves of the number of on-line viewers of the video programs distributed through the repeating broadcasting channels, comparing an area between the number of on-line viewers corresponding to a current time length period that is not placed in the repeating broadcasting channels in each video program and a viewing time progress to obtain a maximum area; and allocating one repeating broadcasting channel for distributing in a repeating broadcasting manner the video content of the video program corresponding to the maximum area upon each comparison.

Figure 4:
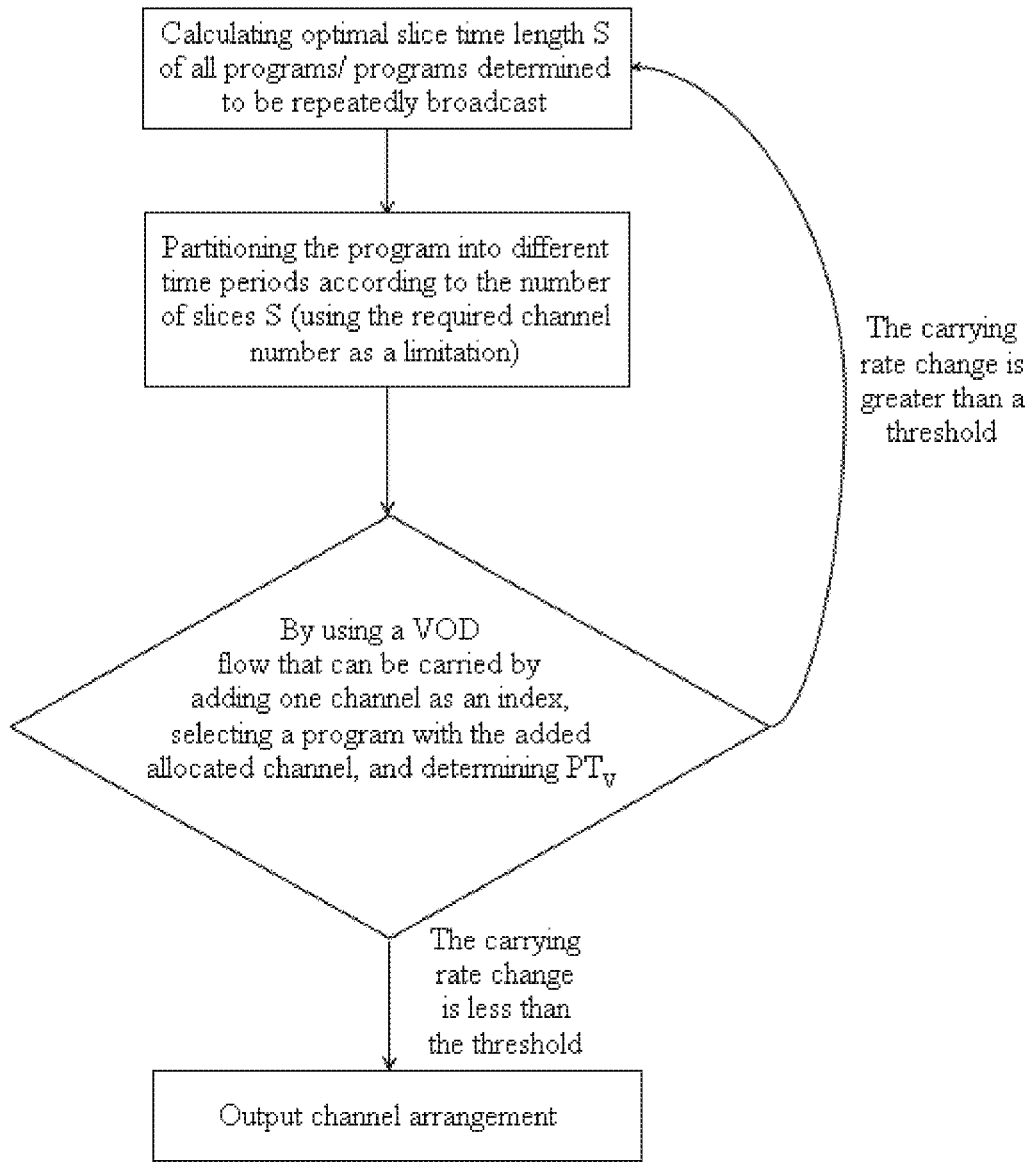
FIG. 4 is a principle diagram of optimization of a time length of a repeating broadcasting part of a video program.

In the third optimization solution, in all video programs distributed by means of repeating broadcasting, an area between the number of corresponding on-line viewers in each repeating broadcasting channel for the video content in each video program that is not placed in the repeating broadcasting channel and the viewing time progress is repeatedly compared to obtain the maximum area, where for each comparison, one repeating broadcasting channel is allocated to distribute in a repeating broadcasting manner the corresponding video content of the video program of the maximum area until all repeating broadcasting channels are allocated; according to each area comparison result, the repeating broadcasting channel number required by the video program distributed by means of repeating broadcasting and the corresponding time length for repeating broadcasting part are obtained through statistics. The time length of the repeating broadcasting part of each video program is finally determined to be referred to as $PT_v$. To further improve the distribution efficiency, the third optimization solution can further be optimized as shown in FIG. 4. Every time after the time length $PT_v$ (equivalent to the slice number) of repeating broadcasting one video program is determined, the corresponding carrying rate is obtained. Then, the corresponding repeating broadcasting slice time length S of each video program at this time is calculated again for all video programs through repeating broadcasting using as $PT_v$ a basis, i.e., $$S = \frac{PT_v}{SN}.$$

At this time, the corresponding curve of the number of on-line viewers is changed. On this basis. for a certain video program, the size of an area between the curve of the on-line viewers and the viewing time progress between the two vertical lines represents the VOD flow size that can be carried by adding one channel. The comprehensive comparison is performed on the flows that can be carried by adding one channel for all video programs, so as to determine the channel number required by repeating broadcasting each program, and the time length of the part for repeating broadcasting of the video program. Specifically, each time one repeating broadcasting channel is added, the maximum VOD flow that can be carried when the repeating broadcasting channel is allocated to the parts that do not use repeating broadcasting of different video programs is considered, and the corresponding video program time period that generates the maximum VOD flow is placed in the repeating broadcasting channel, and then the process is repeated until all the repeating broadcasting channels are used. At this time, a new $PT_v$ of each video program is also obtained. At this time, the corresponding carrying rate is obtained. Whether the change between the two carrying rats is less than a threshold is compared. If not less than the threshold, it indicates that a new $PT_v$ can also be used for determining the curve of the number of on-line viewers again, and the VOD flow that can be carried by adding one repeating broadcasting channel is used as an index to obtain the latest $PT_v$. Repeated iteration is executed until the change between the two neighboring and adjacent carrying rats is less than the threshold.

Based on the description above, a fourth optimization solution for the repeating broadcasting solution is:

obtaining the curve of the number of on-line viewers of the video program distributed through the repeating broadcasting channels;

determining, according to a first repeating broadcasting time length of the video program, the number of the repeating broadcasting channels corresponding to a minimum value of sums of repeating broadcasting flows and supplementary packet flows of the video program distributed through the repeating broadcasting channels;

determining, according to the number of the repeating broadcasting channels and the first repeating broadcasting time length of the video program, a repeating broadcasting slice time length and the number of the repeating broadcasting slices;

partitioning the curve of the number of on-line viewers by a time length period corresponding to each addition of a repeating broadcasting channel according to a relation list between the number of the repeating broadcasting channels and the number of repeating broadcasting slices;

in all curves of the number of on-line viewers of the video programs distributed through the repeating broadcasting channels, comparing an area between the number of on-line viewers corresponding to a current time length period that is not placed in the repeating broadcasting channels in each video program and a viewing time progress to obtain a maximum area; and determining, according to each comparison result, that each repeating broadcasting channel is used for distributing the video content of the video program corresponding to the maximum area in a repeating broadcasting manner, and when the number of comparisons equals to the number of the repeating broadcasting channels, and collecting statistics on the time length corresponding to the maximum area to obtain a second repeating broadcasting time length of each video program; and obtaining an absolute value of a difference between a total flow carrying rate corresponding to the first repeating broadcasting time length and a total flow carrying rate corresponding to the second repeating broadcasting time length; if the absolute value is less than or equal to a threshold, using the second repeating broadcasting time length of the video program distributed in a repeating broadcasting manner as a final repeating broadcasting time length of the video program and arranging the repeating broadcasting channels to distribute the corresponding video content; if the absolute value is greater than the threshold, using the second repeating broadcasting time length of the video program distributed in a repeating broadcasting manner as the first repeating broadcasting time length, determining, according to each area comparison result, the video content for repeating broadcasting through the repeating broadcasting channels and the second repeating broadcasting time length of the video program until the absolute value of the difference between the total flow carrying rate corresponding to the first repeating broadcasting time length and the total flow carrying rate corresponding to the second repeating broadcasting time length is less than or equal to the threshold, stopping an iterative operation, and arranging the repeating broadcasting channels to distribute the corresponding video content.

In addition, the total flow carrying rate in FIG. 4 refers to: dividing the VOD flow carried through repeating broadcasting by the VOD total flow.

For the fourth optimization solution for the repeating broadcasting solution, an area between the number of on-line viewers of the video program in a CN time period and the viewing time progress is used as a unit for whether to repeating broadcasting replace. A fifth optimization solution for the repeating broadcasting solution now is provided:

obtaining the number of the repeating broadcasting channels, the number of repeating broadcasting slices, and a curve of the number of on-line viewers of each video program;

partitioning the curve of the number of on-line viewers by a time length period corresponding to each addition of a repeating broadcasting channel according to a relation list between the number of the repeating broadcasting channels and the number of repeating broadcasting slices;

obtaining an area between the number of on-line viewers corresponding to a time length period of a last repeating broadcasting channel of a video program distributed through the repeating broadcasting channels and a viewing time progress, and arranging in descending order to obtain a first sorting result;

using the popularity to arrange in an ascending order the video programs that are not placed in the repeating broadcasting channels for distribution to obtain a second sorting result;

obtaining an area between the number of on-line viewers corresponding to a time length period of the first n−1 repeating broadcasting channels of each video program in the second sorting result and the viewing time progress, wherein n is the number of the repeating broadcasting channels of the video programs that are not placed in the repeating broadcasting channels for distribution; and comparing an area between the number of on-line viewers corresponding to the time length period of the first n−1 repeating broadcasting channels of a first video program in the second sorting result and a viewing time progress with the sum of areas between the number of on-line viewers corresponding to the time length period of the first n−1 last repeating broadcasting channels in the first sorting result and the viewing time progress; if the area between the number of on-line viewers corresponding to the time length period of the first n−1 repeating broadcasting channels of the first video program in the second sorting result and the viewing time progress is greater than the sum of areas between the number of on-line viewers corresponding to the time length period of the first n−1 last repeating broadcasting channels in the first sorting result and the viewing time progress, using the corresponding n−1 repeating broadcasting channels in the first sorting result for repeatedly broadcasting the video contents corresponding to the time length period of the first n−1 repeating broadcasting channels of the first video program in the second sorting result; continuing to compare the area between the number of on-line viewers corresponding to the time length period of the first n−1 repeating broadcasting channels of a second video program in the second sorting result and the viewing time progress with the sum of areas between the number of on-line viewers corresponding to the time length period of the first n−1 last repeating broadcasting channels in remaining areas in the first sorting result and the viewing time progress, until the video content corresponding to the time length period of the last repeating broadcasting channel of the video program distributed through the repeating broadcasting channels is replaced or the area between the number of on-line viewers corresponding to the time length period of the first n−1 repeating broadcasting channels of the current video program in the second sorting result and the viewing time progress is less than or equal to the sum of the areas between the number of on-line viewers corresponding to the time length period of the first n−1 last repeating broadcasting channels in the remaining areas in the first sorting result and the viewing time progress; and arranging the repeating broadcasting channels to distribute the corresponding video content.

Preferably, when the number of the repeating broadcasting channels is greater than or equal to the total number of the repeating broadcasting channels occupied by all video programs distributed through the repeating broadcasting channels, the time length of the repeatedly broadcast part of the video program is the total time length of the video program.

A sixth optimization solution for the repeating broadcasting solution is:

obtaining historical broadcasting-on-demand data of the video program distributed through the repeating broadcasting channels;

extracting an interest feature of a corresponding user from the historical broadcasting data, wherein the interest feature comprises: a video program and a viewing time length ratio of a certain video program viewed by a user;

obtaining, according to the viewing time length ratio of the video program, a similarity between the video program in the interest feature and each clustering center, wherein the clustering center is obtained by clustering sample video program data;

determining a hidden factor vector of the video program according to the similarity;

determining a video program preference degree deviation value, a user preference degree deviation value, a hidden factor vector of a user, and a hidden factor vector between the user and the viewed video program;

obtaining a preference degree value for the video program according to the video program hidden factor vector, the total number of video programs viewed by the user, the video program preference degree deviation value, the user preference degree deviation value, the hidden factor vector of the user, and the hidden factor vector between the user and the viewed video program;

obtaining, through statistics, the sum of the preference degrees of all users for the video program according to the preference degree value of the user for the video program; and sorting the video programs distributed through the repeating broadcasting channels according to the sum of the preference degrees to obtain a total preference degree list; and distributing the corresponding video program through the repeating broadcasting channels according to the total preference degree list.

In this optimization solution, the step of determining a video program preference degree deviation value, a user preference degree deviation value, a hidden factor vector of a user, and a hidden factor vector between the user and the viewed video program includes:

solving a loss function using a random gradient descent method and determining the corresponding video program preference degree deviation value, user preference degree deviation value, hidden factor vector of the user, and hidden factor vector between the user and the viewed video program when the value of the loss function is a minimum value.

In this optimization solution, the similarity is obtained through a Manhattan distance formula, a Euclidean distance formula or a Pearson formula.

In this optimization solution, the step of determining a hidden factor vector of the video program according to the similarity includes:

obtaining a maximum similarity and a minimum similarity from a similarity between the video program and each clustering center;

dividing the similarity between the video program and each clustering center by the maximum similarity or minimum similarity to obtain normalization result values; and setting the normalization result values less than a threshold as zero, maintaining the normalization result values greater than or equal to the threshold unchanged, and using a vector constituted by obtained result values as the hidden factor vector of the video program.

The six repeating broadcasting solutions described above all enable the limited repeating broadcasting channels to achieve a highly efficient video distribution efficiency.

In the video distribution system of the traditional Internet, the playing delay of the video and the speed of video transmission will directly affect the customer's viewing experience after the user requests to play the video, and these two points are completely decided by the network environment. At the peak of Internet usage, for example, in the evening, each user will focus on VOD for viewing; at this moment, whether it is a video server, or the whole network, the load thereof is very high, and the user may encounter the phenomenon of overlong of the cache time of the video caused by slow connections of network, which greatly reduces the video viewing experience of users. However, using this technical solution, the most popular video would be transmitted by means of repeating broadcasting through the radio and television networks, and the user only needs to wait in a relatively short time (within 5 s) to view the video from beginning to end without cache. When a large number of users view a popular video at the same time, we only need to distribute the program through repeating broadcasting, which can avoid the phenomenon of the traditional broadcasting-on-demand mode for repeated transmission of a large amount of data and extremely inefficiency, but it will produce a certain waiting time. Moreover, the video programs with the slightly latter popularity are usually distributed by means of broadcasting on demand. In this way, the solution of adopting different distribution strategies for the video programs according to different popularities can relieve the problems of network congestions and insufficient bandwidths in the existing infrastructure and can also greatly reduce the waiting time of the user.

This technical solution is quite suitable for an ordinary scene of a video website including a large amount of video programs in a long time period. Different programs have different popularity and cold degrees, and the click distribution throughout one day is also very uneven. Hence, for a certain distribution system, the popularity ranking is performed on the program first, and then the time period partition is further performed thereon. For example, 1 hour can be used as a time interval for division.

For a single video program in a certain time period, according to formulas (5), (10), and (11), the flow can be obtained if using the repeating broadcasting distribution solution:

$$Q_{MCB} = b*T\left(CN + \frac{V*\eta}{2SN}\right) \quad \text{Formula (16)}$$

Herein T is the observing time period, i.e., the small partitioned time period; PT is the program time length; $\eta$ is the ratio of the program time length and the observing time length; V is the effective click of the program in the time period; the repeating broadcasting channel number CN and the repeating broadcasting slice number SN are a pair of related variables, and the specific relation thereof is restrained by Formula (1).

Hence, Formula (1) is introduced into Formula (16) to obtain:

$$Q_{MCB} = b*T\left[CN + \frac{V*\eta}{2C_1}\exp(-C_2*CN)\right] \quad \text{Formula (17)}$$

in a certain observing time period, for a certain specific video program, parameters T, PT, $\eta$, and V are unchanged, while CN and SN are restrained with each other; and therefore, the total flow $Q_{MCB}$ for distributing the video is only decided by CN or SN; and this point can also be seen from Formula (17). That is to say, different repeating broadcasting numbers would cause to generate different distribution flows so as to correspond to different distribution efficiencies. Hence, for fixed variables T, PT, and V, we may find an optimal channel number CN, so that the flow $Q_{MCB}$ generated by video distribution is minimum. For the function of $Q_{MCB}$ with respect to CN, it thus is obvious a problem of solving the minimum value.

Solving the minimum value of the variable $Q_{MCB}$ with respect to CN for formula (17) to obtain: when meeting:

$$\frac{\partial Q_{MCB}}{\partial CN} = b*T\left[1 + \frac{V*\eta}{2C_1}\exp(-C_2*CN)*(-C_2)\right] = 0 \quad \text{Formula (18)}$$

i.e., $$CN = \frac{1}{C_2}\ln\left(\frac{\eta C_2}{2C_1}V\right)$$

the total flow reaches minimum, and the result is introduced back to Formula (17), so as to obtain the minimum flow:

$$Q_{MCB} = \frac{b*T}{C_2}\ln(V) + \frac{b*T}{C_2}\left(1 + \ln\left(\frac{\eta C_2}{2C_1}\right)\right) = C_3\ln(V) + C_4 \quad \text{Formula (19)}$$

where CN in Formula (19) is an integer approximate value actually. Moreover, the value of CN is the minimum optimal value of the repeating broadcasting channel number.

The repeating broadcasting channel CN greater than or equal to 1 can obtain the effective click threshold $V_{th}$ of another program using the repeating broadcasting distribution solution:

formula (19) is introduced into inequation CN≥1 to obtain:

$$V \geq V_{th} = \frac{2*C_1*e^{C_2}}{\eta*C_2} \qquad \text{Formula (20)}$$

(For a specific observing time period and a specific video program) $C_3$ and $C_4$ in Formula (20) are constant parameters. Formula (19) indicates for a single program in a small time period, the flow generated when using this technical solution to distribute the video through repeating broadcasting and the effective click of the video are in an increasing logarithmic relation. That is, along with the increasing of the effective click, the flow generated when using this technical solution to distribute the video through repeating broadcasting is increased in a logarithmic form; logarithmic increasing is a quite slow increasing mode.

The discussed repeating broadcasting solution above relates to a single program in a small time period, it is promoted and summarized on this basis below so as to be adapted to a more ordinary scene of a video website including a large amount of video programs in a long time period.

It is assumed that a total program amount of a certain video website is PN; and the program time length of each video program is $PT_m$. m value range is from 1 to PN, for representing the popularity ranking of the program; the total number of the partitioned small observing time period is N, each small observing time period time length is $T_n$, and the n value range is from 1 to N; the effective click of a certain video program in a certain small observing time period is $V_{T_n,m}$; the effective click of all video programs in a certain small observing time period is $V_{T_n}$; and the total effective click of all programs in all observing time periods is $V_D$.

Hence, according to Formula (19), the flow generated when distributing m-th program in n-th small observing time period using the repeating broadcasting solution is $Q_{T_n,m}$ and can be given by the following formula:

$$Q_{T_n,m} = \frac{b*T}{C_2}\ln(V_{T_n,m}) + \frac{b*T}{C_2}\left(1 + \ln\left(\frac{\eta C_2}{2C_1}\right)\right) \qquad \text{Formula (21)}$$

Introducing $$V_{T_n,m} = \frac{A*V_{T_n}}{m^\alpha}$$

into Formula (21) can obtain the relation between the flow $Q_{T_n}$ of all programs distributed in a certain small observing time period Tn and the effective click $V_{T_n}$:

$$Q_{T_n} = \frac{b*T*PN}{C_2}\ln(V_{T_n}) + \frac{b*T*PN}{C_2}\left(1 + \ln\left(\frac{A*C_2}{2C_1}\right)\right) + \frac{b*T}{\alpha*C_2}\sum_{m=1}^{PN}\ln\left(\frac{\eta m}{m}\right) \qquad \text{Formula (22)}$$

$$= C_5 \ln(V_{T_n}) + C_6$$

where $C_5$ and $C_6$ are constant parameters for a specific observing time period.

Introducing $$V_{T_n} = \frac{A*V_D*\lambda_n}{m^\alpha}$$

into Formula (22) can obtain the relation between the flows $Q_D$ of all programs in the distribution time period and the total effective click $V_D$:

$$Q_D = \qquad \text{Formula (23)}$$
$$C_5*N*\ln(V_D) + \sum_{m=1}^{PN} C_5 \ln(\lambda_n) + C_6*N = C_7 \ln(V_D) + C_8$$

where $C_7$ and $C_8$ are constant parameters.

Formula (23) shows the repeating broadcasting distribution video program in this technical solution is quite suitable for an ordinary scene of a video website including a large amount of video programs in a long time period.

Flow characteristics of the solution are analyzed above, and herein the characteristics of the repeating broadcasting solution are analyzed from the channel number required for transmitting the program content in the solution. Similarly, in a given time period, for a certain specific program, whether using a pure broadcasting-on-demand distribution solution or a repeating broadcasting distribution solution largely depends on the effective click of the video program in a specific time period. Since the day distribution of the effective click of the video is not evenly distributed, a relatively long time period needs to be divided into many relatively small time periods, so that the effective click of the video program in each small time period is not sharply fluctuated; upon the processing above, the assumption conditions in the preceding text are all met, and the analysis and conclusion are both adaptable.

For a single program in a certain time period, according to the analysis above, since the repeating broadcasting flow is represented by a product of the channel number and the duration thereof, it can be obtained that the channel number when using the repeating broadcasting solution is dividing the flow by the channel duration:

$$BN_{MCB} = Q_{MCB}/T = CN + \frac{V*\eta}{2SN} \qquad \text{Formula (24)}$$

Herein T is the observing time period, i.e., the small partitioned time period; PT is the program time length; $\eta$ is the ratio of the program time length and the observing time length; V is the effective click of the program in the time period; the repeating broadcasting channel number CN and the repeating broadcasting slice number SN are a pair of related variables, and the specific relation thereof is restrained by Formula (1).

Hence, Formula (1) is introduced into Formula (24) to obtain:

$$BN_{MCB} = CN + \frac{V*\eta}{2C_1}\exp(-C_2*CN) \qquad \text{Formula (25)}$$

in a certain observing time period, for a certain specific video program, parameters T, PT, and V are unchanged, while CN and SN are restrained with each other; and therefore, the total channel number $BN_{MCB}$ for distributing the video is only decided by SN or CN; and this point can also be seen from Formula (25). Hence, for fixed variables T, PT, and V, we may find an optimal channel number CN, so that the total channel number $BN_{MCB}$ required by video distribution is minimum. For the function of $BN_{MCB}$ with respect to CN, it thus is obvious a problem of solving the minimum value.

When meeting:

$$CN = \frac{1}{C_2}\ln\left(\frac{\eta C_2}{2C_1}V\right) \qquad \text{Formula (26)}$$

the total flow reaches minimum. As can be seen that Formula (26) and Formula (18) are completely the same, which indicates that the same conclusion can be obtained no matter from the flow or the channel number. Formula (26) is introduced into Formula (25) to obtain the minimum channel number:

$$BN_{MCB} = \frac{1}{C_2}\ln(V) + \frac{1}{C_1}\left(1 + \ln\left(\frac{\eta C_2}{2C_1}\right)\right) = C_3'\ln(V) + C_4' \qquad \text{Formula (27)}$$

where CN in Formula (26) is an integer approximate value actually.

For a specific observing time period and a specific video program, $C_3'$ and $C_4'$ in Formula (27) are constant parameters. Formula (27) indicates for a single program in a small time period, the channel number required when distributing the video using the repeating broadcasting solution and the effective click of the video are in an increasing logarithmic relation. That is, along with the increasing of the effective click, the channel number required when distributing the video using the repeating broadcasting solution is increased in a logarithmic form; logarithmic increasing is a quite slow increasing mode.

When a large amount of video programs exist, it is assumed that a total program amount of a certain video website is PN; and the program time length of each video program is $PT_m$. m value range is from 1 to PN, for representing the popularity ranking of the program; the total number of the partitioned small observing time period is N, each small observing time period time length is $T_n$, and the n value range is from 1 to N; the effective click of a certain video program in a certain small observing time period is $V_{T_n,m}$; the effective click of all video programs in a certain small observing time period is $V_{T_n}$; and the total effective click of all programs in all observing time periods is $V_D$.

Hence, according to Formula (27), the channel number required when distributing m-th program in n-th small observing time period using the repeating broadcasting solution is $B_{T_n,m}$ and can be given by the following formula:

$$BN_{T_n,m} = \frac{1}{C_2}\ln(V_{T_n,m}) + \frac{1}{C_2}\left(1 + \ln\left(\frac{\eta_m C_2}{2C_1}\right)\right) \qquad \text{Formula (28)}$$

Introducing $$V_{T_n,m} = \frac{A * V_{T_n}}{m^a}$$

into Formula (28) can obtain the relation between the channel number $BN_{T_n}$ of all programs distributed in a certain small observing time period and the effective click $V_{T_n}$.

$$BN_{T_n} = \frac{PN}{C_2}\ln(V_{T_n}) + \frac{PN}{C_2}\left(1 + \ln\left(\frac{A*C_2}{2C_1}\right)\right) + \qquad \text{Formula (29)}$$
$$\frac{1}{\alpha * C_2}\sum_{m=1}^{PN}\ln\left(\frac{\eta_m}{m}\right)$$
$$= C_5'\ln(V_{T_n}) + C_6'$$

where $C_5'$ and $C_6'$ are constant parameters for a specific observing time period.

Introducing $$V_{T_n} = \frac{A * V_D * \lambda_n}{m^a}$$

into Formula (29) can obtain the relation between the channel number $BN_D$ required by all programs in the distribution time period and the total effective click $V_D$:

$$BN_D = C_5' * N * \ln(V_D) + \sum_{n=1}^{N}\ln(\lambda_n) + C_6' * N \qquad \text{Formula (30)}$$
$$= C_7'\ln(V_D) + C_8'$$

where $C_7'$ and $C_8'$ are constant parameters.

Formula (30) shows this technical solution is quite suitable for an ordinary scene of a video website including a large amount of video programs in a long time period.

For the repeating broadcasting solution without counting the supplementary packet, the second item of Formula (16) is the flow generated by zero-latency supplementary packet; if the shortest slice time length S is relatively small, supplementary packet cannot be used considering the tolerance latency of the user, and at this time, the flow is:

$$Q_{MCB} = b * T * CN \qquad \text{Formula (31)}$$

where CN is the channel number required by repeating broadcasting. Obviously, when the observing time T is given, the repeating broadcasting flow $Q_{MCB}$ is a monotonic function of the repeating broadcasting channel CN. Moreover, CN values are in one-by-one correspondence to SN values; both are related to the slice time length and the program time length, and the specific relation is as shown in Formula (4). Hence, combining formulas (1), (4), and (31), a repeating broadcasting flow without supplementary packet is included:

$$Q_{MCB} = b * T * \frac{1}{C_2}\ln\left(\frac{SN}{C_1}\right) = \frac{b*T}{C_2}\ln\left(\frac{PT}{C_1 S}\right) \qquad \text{Formula (32)}$$

Since the pure broadcasting-on-demand does not have the supplementary packet, the flow without counting the supplementary packet is the same as that in Formula (5). Hence, when not counting the supplementary packet, $V'_{th}$ of the threshold using repeating broadcasting and pure broadcasting-on-demand is a solution of the inequation $Q_{MCB}<Q_{VOD}$ at this time. $Q_{MCB}$ and $Q_{VOD}$ herein are respectively values for Formula (33) and Formula (5). An expression for Formula (33) is:

$$V > V'_{th} = \begin{cases} \frac{2}{C_2}\ln\left(\frac{PT}{C_1S}\right) & , \eta \geq 1 \\ \frac{1}{\eta(2-\eta)} * \frac{2}{C_2}\ln\left(\frac{PT}{C_1S}\right) & , \eta < 1 \end{cases} \quad \text{Formula (33)}$$

where the left of the inequation is the number viewers of a certain video, and the right of the inequation is a threshold, represented by $V'_{th}$. It can be seen that when a click in a certain time period is greater than a certain threshold, using the repeating broadcasting in this time period for distribution is cost-effective, otherwise, adopting the pure broadcasting-on-demand for distribution is more cost-effective. Moreover, when determining the minimum slice time length, the more the click is higher than the threshold, the higher the efficiency, or at the same click, the smaller the threshold is less than the click, i.e., the greater the slice time length, the higher the efficiency.

Formula (32) is a flow of a single program in a certain time period, i.e., $$Q_{T_n,m} = \frac{b*T}{C_2}\ln\left(\frac{PT_m}{C_1S}\right) \quad \text{Formula (34)}$$

As can be seen from the formula above, the flow of a certain program in a certain time period is irrelevant to the click of the video.

If only considering the program with the click greater than the threshold $V'_{th}$, the discussion similar to the last section is conducted. Introducing $$V_{T_n,m} = \frac{A * V_D * \lambda_n}{m^a}$$

into Formula (34) can obtain the flow without counting the supplementary packet of all programs with the click greater than the threshold in a certain small observing time period is $$Q_{T_n} = \sum_{m=1}^{PN} Q_{T_n,m} = \sum_{m=1}^{PN} \frac{b*T}{C_2}\ln\left(\frac{PT_m}{C_1S}\right) \quad \text{Formula (35)}$$

irrelevant to the click of the program.

Introducing Formula (22) into Formula (35) can obtain the flow without counting the supplementary packet of all programs is $$Q_D = \sum_{n=1}^{N} Q_{T_n} = \sum_{m=1}^{PN} \frac{N*b*T}{C_2}\ln\left(\frac{PT_m}{C_1S}\right) \quad \text{Formula (36)}$$

irrelevant to the click of the program.

For formulas (34), (35), and (36), the relation between the corresponding channel number and click can be obtained by dividing the constant, i.e., the statistic time T, and thus is no longer listed one by one herein.

A recommendation model based on user viewing behaviors predicts the video programs that users are likely to choose to view to obtain the video program pushing lists of different users. For this technical solution, the recommendation model accurately pushes the video program data liked by the user to the user terminal for different users. During the user views the video, since the video program to be viewed by the user is accurately pushed, in the video click peak, the network performance is improved and the usage experience of the user is effectively improved.

The recommendation model obtains the user historical broadcasting-on-demand data from the log record of viewing the video program by the user and extracts the interest feature of the user from the historical broadcasting-on-demand data. The interest feature includes: a user ID, a video program ID, and a viewing time length ratio of a certain video program viewed by a user. Furthermore, the technical solution aggregates a large number of video programs into hundreds of categories and obtains hundreds of clustering centers accordingly. The similarity between the video program and the corresponding video type of the clustering center is calculated by using the interest feature and the clustering center. According to the similarity, the user's preference degree for various types of videos is predicted, and the data of the video program that the user likes is sent to the user terminal by using the predicted preference degree.

For the recommendation model, the sample video programs are classified using a clustering algorithm, for example, for 20000 video program data sets, without clustering, they are seen as 20000 categories, but in fact there are definitely not that many categories, and some video types in similar types can be classified as one category; through the clustering algorithm, the 20000 video programs are clustered into 200 categories; and during follow-up similarity calculation, when processing the data, 2 orders of magnitudes are reduced so as to greatly reduce the complexity of the algorithm, and improving the recommendation efficiency. In addition, this technical solution predicts the favorite video programs of users based on the user historical broadcasting-on-demand data, and accurately partitions type information of each video program, for example, a video program Forever Young includes war factors, love factors, social factors and so on; each factor in the video program is seen as the hidden factor; the similarity between each hidden factor of the video program and each clustering center upon the clustering processing is calculated; according to the similarity, the hidden factor vector of each video program is constructed; the hidden factor vector is used for predicting the preference degree of each video program by the user; according to the predicted preference degree, the video program is recommended to the user terminal. Although the complexity of the video recommendation algorithm is reduced, due to the consideration of various factors of the video program, the video program is accurately recommended to the user terminal based on the user's historical behavior, thus greatly improving the usage experience of the user.

For this technical solution, video programs can be recommended to specific users according to personalized recommendation video program lists of different users. The total recommendation video program list can also be obtained based on the personalized recommendation video program lists of different users, and the video programs are recommended to the users according to the total recommendation video program list.

For total resources of limited push channels, push is carried out according to the popularity ranking of all recommended programs. For a specific user, only the video programs on the corresponding personalized recommendation video program list are received for local storage. Users receiving recommended video programs can adopt different receiving strategies according to whether there is a memory for receiving pushed content on the local receiving device, the size of the memory capacity and the popularity ranking of the recommended programs to the user. For example, it can receive and store all or part of the time length of several programs ranked top in the personalized recommendation video program list or the total recommendation video program list; it can also store only part of the time length of the video program according to the user's prediction of the program viewing time length; it can also cooperate with the repeating broadcasting algorithm to receive and store the first slice time length of the previous several programs in the personalized recommendation video program list or total recommendation video program list, so as to save the repeating broadcasting supplementary packet flow; furthermore, according to the prediction of fast forward behavior of the user for the program, it can also receive and store the repeating broadcasting slices of the latter segments of the recommended program time length to reduce the flow of the fast forward supplementary packet flow. Furthermore, strategies such as a program push cycle, resource allocation of a push channel, sorting of pushed programs, and receiver memory refresh are determined according to users' preferences of the viewing time in 24 hours, from Monday to Sunday, or from weekdays to holidays. For example, according to the number of channel resources, it can be arranged to push programs that rank high (with high popularity) several times a day, programs that are in the middle of popularity once a day, and programs that are low in popularity once a week (assuming that the refresh cycle of the receiving memory is 7 days). The channel resource number and push program list strategy can be arranged according to push at different absolute time and the repeating broadcasting channel flow criterion formula. Generally speaking, repeating broadcasting in the evening will occupy more channel resources, and pushing in the late night will occupy more resources.

In this technical solution, in the video distribution stage, there may be a situation of spare repeating broadcasting channels when the repeating broadcasting channels are sufficient. At this time, the spare repeating broadcasting channels are used for pushing the video programs to the users. The specific arrangement process is as follows: first, ranking all the videos to be pushed according to the predicted number of viewers; prioritizing a video program that is likely to be viewed by a large number of viewers; placing the video program into a channel and push it to potential users until there is no spare repeating broadcasting channel.

For the situation of no spare repeating broadcasting channel, to improve the efficiency of video distribution, when it is predicted that there are quite many viewers of a certain video program and Formula (37) below is met, i.e., when the recommendation efficiency is higher than the repeating broadcasting efficiency and the broadcasting-on-demand efficiency, some of the repeating broadcasting channels are used for distributing the video program predicted through the recommendation model.

$$Q_{CN_{last}} < I_p * B * PT * p * \lambda(t) * b \qquad \text{Formula (37)}$$

where $Q_{CN_{last}}$ is an area between the number of on-line viewers in the last occupied repeating broadcasting channel in the program with the minimum VOD flow carried when currently entering the repeating broadcasting and the viewing time progress. $I_p$ is a preference degree matrix of the recommendation program by the user; B is the cache size matrix of the recommended user; PT is a program time length matrix; P is the prediction accuracy; $\lambda(t)$ is a control reference parameter, is related to the current absolute moment, and is inversely proportional to the total number of people clicking by the user.

Figure 5:
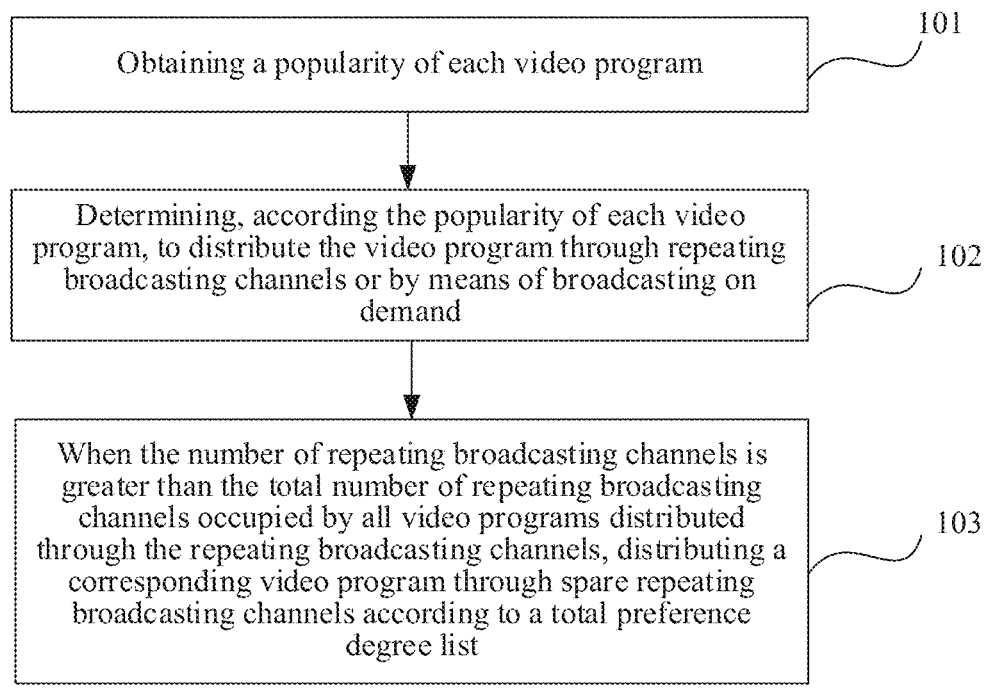
FIG. 5 is a flow chart II of a video distribution method according to this specification.

Based on the description above, according to FIG. 1, it is shown in FIG. 5. The video distribution method further includes:

Step 103): when the number of repeating broadcasting channels is greater than the total number of repeating broadcasting channels occupied by all video programs distributed through the repeating broadcasting channels, distribute a corresponding video program through spare repeating broadcasting channels according to a total preference degree list.

Actually, the recommendation program list of each user is first obtained through the recommendation algorithm (sorting the programs from popular to unpopular, or from a high click probability to a low click probability by a user); then summation and statistics are conducted according to the recommended time of the program by the recommendation lists of all users to obtain the popularity list of the recommended program. Pushing is a process of sending to a push queue according to the popularity list of the recommended program and according to the size of the channel resource from high popularity to low popularity and broadcasting and distributing to all users through broadcasting channels. It may be one-time or periodic.

The user vector: u=[1, 2, 3, . . . , U], and the program vector: p=[1, 2, . . . , P]. First, a matrix Rup of the preference degree r for a certain program by a certain user u is obtained; for a certain program p, the preference degrees for the program by all users are summed $$\vec{R}_p = \sum_{u=1}^{U} R_{up} = [R1, R2, R3, \ldots, RP];$$

the vectors are sorted from large to small to obtain $\vec{R}_{p'}=[R_{1'}, R_{2'}, \ldots, R_{p'}]$ where $R_{1'} \geq R_{2'} \geq \ldots \geq R_{p'}$, and a subscript vector $\vec{p}'=[1', 2', 3', \ldots, p']$ of r after sorting is the recommendation program list.

Figure 6:
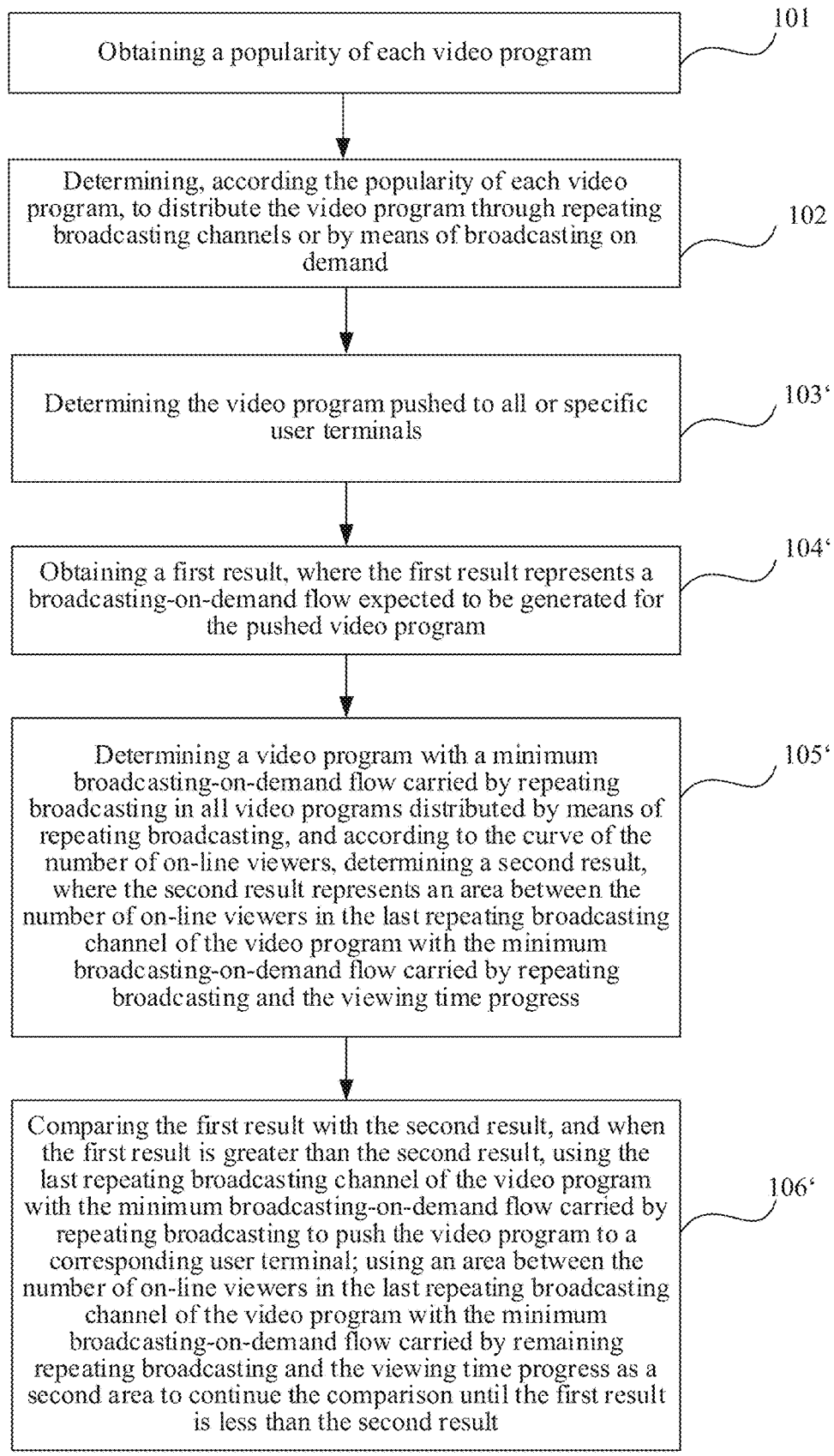
FIG. 6 is a flow chart III of a video distribution method according to this specification.

Based on FIG. 1, as shown in FIG. 6, the video distribution method further includes:

Step 103'): determine the video program pushed to all or specific user terminals;

Step 104'): obtain a first result, where the first result represents a VOD flow expected to be generated for the pushed video program;

Step 105'): determine a video program with a minimum broadcasting-on-demand flow carried by repeating broadcasting in all video programs distributed by means of repeating broadcasting, and according to the curve of the number of on-line viewers, determine a second result, where the second result represents an area between the number of on-line viewers in the last repeating broadcasting channel of the video program with the minimum broadcasting-on-demand flow carried by repeating broadcasting and the viewing time progress; and Step 106'): compare the first result with the second result, and when the first result is greater than the second result, use the last repeating broadcasting channel of the video program with the minimum broadcasting-on-demand flow carried by repeating broadcasting to push the video program to a corresponding user terminal; and use an area between the number of on-line viewers in the last repeating broadcasting channel of the video program with the minimum broadcasting-on-demand flow carried by remaining repeating broadcasting and the viewing time progress as a second area to continue the comparison until the first result is less than the second result.

Figure 7:
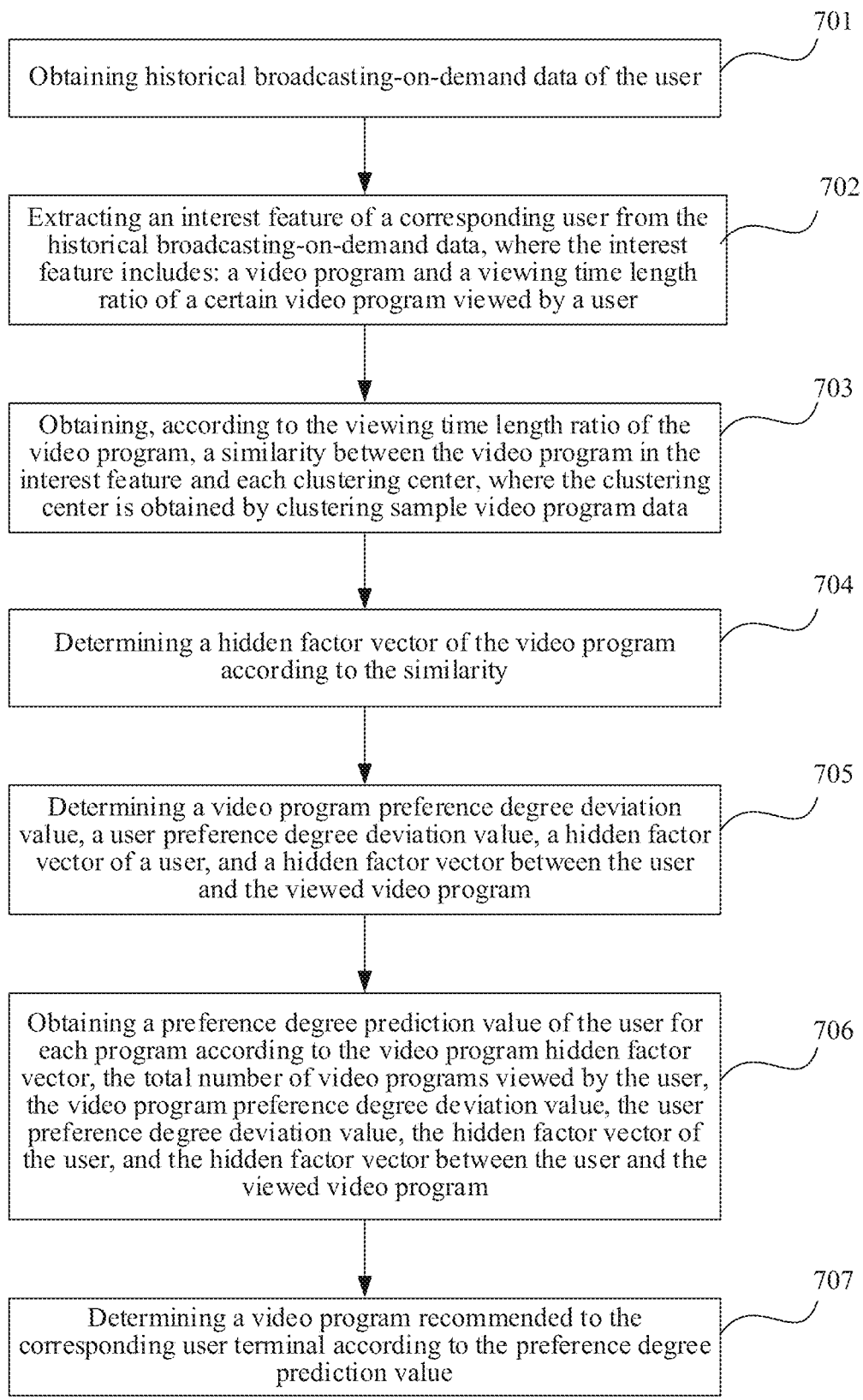
FIG. 7 is a flow chart of a method for recommending a video program to a user terminal.

Based on the description above, as shown in FIG. 7, it is a flow chart of a method for pushing a video program to a user terminal. It includes:

Step 701): obtain historical broadcasting-on-demand data of the user.

In this embodiment, log records of the historical VOD for one day, one week, or one month in the past are used as data sources, to obtain past historical broadcasting-on-demand information of each user. The log records include: a user ID, a video program ID, a viewing start time, and a viewing end time.

Step 702): extract an interest feature of a corresponding user from the historical broadcasting-on-demand data, where the interest feature includes: a video program and a viewing time length ratio of a certain video program viewed by a user.

In this embodiment, the historical broadcasting-on-demand data is preprocessed; according to the start time and viewing end time of the corresponding video program viewed by the corresponding user in each log record, a viewing time length ratio of a certain video program viewed by a user is obtained. In this technical solution, the viewing time length ratio of the user is used as a replacement index for the user viewing time length and is used as a definition for the degree of interest in the video program by the user; if $dur_i$ is defined as the total program time length of the program i, $du_i/dur_i$ is the program time length ratio, which can represent the interest or preference degree for the program i by the user u, and the value range of $du_i/dur_i$ is set as [0,1]. Hence, an interest feature is extracted according to a preprocessing result, and the interest feature includes: a video program and a viewing time length ratio of a certain video program viewed by a user.

Step 703): obtain, according to the viewing time length ratio of the video program, a similarity between the video program in the interest feature and each clustering center, where the clustering center is obtained by clustering sample video program data.

In this technical solution, the similarity between the video programs is calculated and the similar video programs are clustered into the same category through a clustering algorithm. The calculation of similarity is the most important and key step in the clustering algorithm. First, the similarity calculation formula is correspondingly and targetedly selected. The current popular similar formulas include a Manhattan distance formula, a Euclidean distance formula, a Pearson formula, and the like. Upon multiple attempts, this technical solution finally uses the Manhattan distance formula to calculate the similarity among the video programs. The similarity among the video programs is calculated as shown in Formula (38):

$$sim(i, j) = \frac{1}{1 + d_{i,j}} \cdot \frac{1}{c_i} \cdot \frac{1}{c_j} \qquad (38)$$

In Formula (38), im(i,j) represents the similarity between the video program i and the video program j; $c_i$, $c_j$ are respectively the numbers of users viewing the video program i and the video program j, i.e., the program popularity, which are multiplied by reciprocal of the program popularity to reduce the influence of the video program having the relatively higher popularity; $d_{ij}$ is the distance between the video program i and the video program j, as shown in Formula (2), the value range of $d_{ij}$ is from 0 to positive infinity, and in this way, the value range of $$\frac{1}{1 + d_{i,j}}$$

is from 0 to 1; when $$\frac{1}{1 + d_{i,j}}$$

is 0, it is indicated that the two video programs are completely different; when $$\frac{1}{1 + d_{i,j}}$$

is 1, it is indicated that the two video programs are basically similar; the specific definition of $d_{ij}$ is as shown in Formula (39); $r_{ui}$ is a viewing time length ratio for the user u to view the video program i; $r_{uj}$ is a viewing time length ratio for the user u to view the video program j; U is a set of users for simultaneously viewing the video program i and the video program j; the viewing time length ratio of the user u for viewing the video program i minus the viewing time length ratio to view the video program j and taking an absolute value, then performing the same processing on the viewing time length ratios of all user in U and performing summation, the distance between the video program i and the video program j is further obtained.

$$d_{ij} = \sum_{u \in U} |r_{ui} - r_{uj}| \qquad (39)$$

In this embodiment, a large amount of video programs in various types are selected as a sample data set and clustering processing is performed on the sample data set. First, an initial cluster center is found in the sample data set, i.e., the two programs with the minimum program similarity in the sample data set, and is marked as $c_1$, $c_2$. According to the Nearest Neighbor Principle, $c_1$, $c_2$ is used as the clustering center to cluster the corresponding video programs to obtain a clustering result. In the clustering result, the cluster having the maximum video program data amount is selected; the video program with the minimum program similarity to the cluster center in the cluster as a new cluster center. According to the Nearest Neighbor Principle, clustering is performed again on all programs using the new cluster center until the clustering center number reaches a maximum value K, and therefore, the finally obtained total clustering number is the clustering center center=$\{c_1, c_2, \ldots, c_k\}$ of K. Is the clustering number does not reach K, clustering is continued.

Step 704): determine a hidden factor vector of the video program according to the similarity.

In this embodiment, certain implicit factors in the video program that can represent program type information are regarded as hidden factors, such as the degree of comedy, the degree of horror, and the degree of tenderness and sweetness in the love content of the video program.

In this embodiment, after obtaining the program hidden factors, the program factor vector constructing work may be started. In this embodiment, the program factor vector is defined as multi-dimensional, because the video program basically cannot have a single factor, for example, in a movie, science fiction components may basically not included, but comedy components, horror components and the like are possibly included. Hence, for the video program i, it can be represented by Formula (40):

$$p_i = (p_{i1}, p_{i2}, \ldots, p_{ik}, \ldots, p_{iK}) \tag{40}$$

In Formula (40), $p_i$ is a program vector consisting of K hidden factors; $p_{ik}$ is a proportion of k-th hidden factor in the video program i; the proportion value can be obtained by calculating the similarity between the video program i and different hidden factors; the hidden factors herein correspond to the clustering center obtained through the clustering processing. The clustering center represents a certain type of video programs; in Formula (41) below, sim(i,center (k)) represents the similarity between the video program i and the k-th clustering center; the calculation of the similarity is obtained as in Formula (38) above; the k-th clustering center is determined through the clustering algorithm.

$$p_{ik} = sim(i, \text{center}(k)) \tag{41}$$

In this technical solution, after calculating the proportion size of each hidden factor in the video program i, since some proportion values are quite small and some are relatively large, it does not facilitate the reflection of the feature of the video program and the subsequent calculation. Hence, the proportion value of each hidden factor of the video program i needs to be further normalized.

First, the hidden factor with the maximum proportion occupied in the video program a is obtained, and the definition thereof is as shown in Formula (42) below:

$$sMax = \max(sim(i, \text{center}(k))) \tag{42}$$

In the formula above, max(sim(i,center(k))) represents the maximum similarity value in the similarities between the video program and clustering centers; dividing $p_{ik}$ by sMax can limit the value of $p_{ik}$ between 0 and 1, so as to normalize $p_{ik}$, as shown in Formula (43).

$$p_{ik} = \frac{sim(i, \text{center}(k))}{sMax} \tag{43}$$

Because certain hidden factors with a small proportion in the video program may be noise data or redundant data, and some hidden factors with a small proportion value in the video program can be removed. The method adopted is to first set a threshold. If the normalized $p_{ik}$ is below the threshold, the numeral value is set to zero. After normalization and zero setting processing, the hidden factor vector of the video program i is obtained.

Step 705): determine a video program preference degree deviation value, a user preference degree deviation value, a hidden factor vector of a user, and a hidden factor vector between the user and the viewed video program.

In this embodiment, the interest features of all users are solved according to the loss function; the loss function is shown in Formula (44), and is solved using a random gradient descent method so as to determine the corresponding video program preference degree deviation value, user preference degree deviation value, hidden factor vector of the user, and hidden factor vector between the user and the viewed video program when the value of the loss function is a minimum value.

$$\min_{b_i, b_u, q_u, y_j} \sum_{(u,i) \in K} \left( r_{ui} - \mu - b_i - b_u - p_i^T \cdot \left( q_u + \frac{1}{\sqrt{|N(u)|}} \sum_{j \in N(u)} y_j \right) \right)^2 + \lambda \left( \sum_u (b_u^2 + \|q_u\|^2) + \sum_i (b_i^2 + \|p_i\|^2 + \|y_i\|^2) \right) \tag{44}$$

In Formula (44), min represents solving the sizes of $b_i$, $b_u$, $q_u$, and $y_j$ when the minimum value of the loss function is obtained; $r_{ui}$ in the formula above is a true value of the preference degree of the user u for the video program i; $\lambda$ is a regularization parameter; the first line in the formula above adopts the method for solving a minimum square error between the true value $r_{ui}$ of the preference degree of the user u for the video program i and a prediction value of the preference degree of the user u for the video program i; a second line thereof is a regularization item introduced for avoiding overfitting; $\lambda$ is used for maintaining the degree of regularization and the size thereof is obtained through cross validation.

Step 706): obtain a preference degree prediction value of the user for each program according to the video program hidden factor vector, the total number of video programs viewed by the user, the video program preference degree deviation value, the user preference degree deviation value, the hidden factor vector of the user, and the hidden factor vector between the user and the viewed video program.

In this embodiment, through Formula (45) below, the prediction value $\hat{r}_{ui}$ of the preference degree of the user u for the video program i is obtained; and according to the historical record for the user to view the video program, the viewing time length ratio is determined. As shown in the specific calculation Formula (45):

$$\hat{r}_{ui} = \mu + b_i + b_u + p_i^T \cdot \left( q_u + \frac{1}{\sqrt{|N(u)|}} \sum_{j \in N(u)} y_j \right) \tag{45}$$

In Formula (45), μ is an average preference degree for the programs viewed by all users; $b_i$ is a deviation value of the preference degree for the video program i by all users with respect to an average value μ; for example, if a certain video program is low in quality, the score for it by the user would not generally be high; $b_u$ is a deviation value of the preference degree for all the video programs viewed by the user u with respect to an average value μ; for example, if the user tends to be easygoing, even if the program quality is below an average level, the user may still accept it and will not reject it. Hence, the preference degree of the user would be above the average value μ; $p_i$ is the hidden factor vector of the video program i and is obtained in step 904. Qu is a hidden factor vector of a user u, and represents the preference degree of the user for the video program hidden factor; an initial value is defined as a random value in the range between [0,1]; N(u) is a set of all programs viewed by the user u, and is obtained through statistics according to the number of the different video program IDs. In this technical solution, different video programs are represented by different video program IDs. |N(u)| is the total number of the programs in the set; to reduce the influence of an active user, a reciprocal of |N(u)| is used in Formula (45); taking the square root is to prevent an excessive drop; $y_j$ is a hidden factor vector between the user u and the viewed video program j.

Formula (45) mainly calculates based on the idea of the hidden factor model, and the historical broadcasting-on-demand data of the user is further introduced. The hidden factor model is first introduced into the field of recommendation systems mainly to be applied to a scoring system, and a main idea thereof is to fully use scoring data. For example, in a movie recommendation system, the hidden factor vector of the movie and the hidden factor vector of the user can be calculated first; the predicted score value of the movie by the user can be obtained by calculating an inner product of the hidden factor vector. As discussed above, the hidden factors in the movie or video can be understood as the size of proportion of combat components or horror degree in the entire movie. As mathematically described, Formula 46 resolves a scoring matrix R of N×M into a movie-hidden factor matrix P of M×F and a user-hidden factor matrix Q of N×F. N, M and F are respectively matrices with the sizes of n×r, r×m, and r×r, as shown in Formula (46):

$$R = Q * P^T \quad (46)$$

In the formula above, $P^T$ is a transposition matrix of the movie hidden factor matrix P.

Step 707): determine a video program recommended to the corresponding user terminal according to the preference degree prediction value.

In this embodiment, using this technical solution can obtain the preference degree prediction values $\hat{r}_{ui}$ for different video program IDs by different user IDs, and all, $\hat{r}_{ui}$ constitute the preference degree prediction matrix. The line numbers of the matrix correspond to different user IDs; the column numbers of the matrix correspond to different video program IDs; element values of the matrix are the preference degree prediction values for different video programs by different users. For example, when recommending a video program for a user u, u-th line is extracted from the preference degree prediction matrix, and it is the predicted preference degree for the video program by the user. In Formula (47), $\hat{r}_u$ is the preference degree prediction value for n video programs by the user u; $\hat{r}_{un}$ is the preference degree prediction value for the video program n by the user u:

$$\hat{r}_u = (\hat{r}_{u1}, \hat{r}_{u2}, \ldots, \hat{r}_{un}) \quad (47)$$

In an actual application, a video program viewed by the user u is removed; remaining video programs are arranged according to the size of the preference degree prediction value in descending order and a recommendation list is generated according to an arrangement result; and data of a video program ranked front in the recommendation list is sent to a user terminal.

According to the description of the embodiment above, it can be known that this recommendation model considers both the historical broadcasting-on-demand data of the user and the hidden factors of the video program, and through the clustering algorithm, clusters sample video program data, so as to, during the recommendation processing, on the basis of a comprehensive consideration of the type of the video program, reduce the dimension of video program, realize the video recommendation service with high accuracy, and effectively improve the usage experience of the user.

Figure 8:
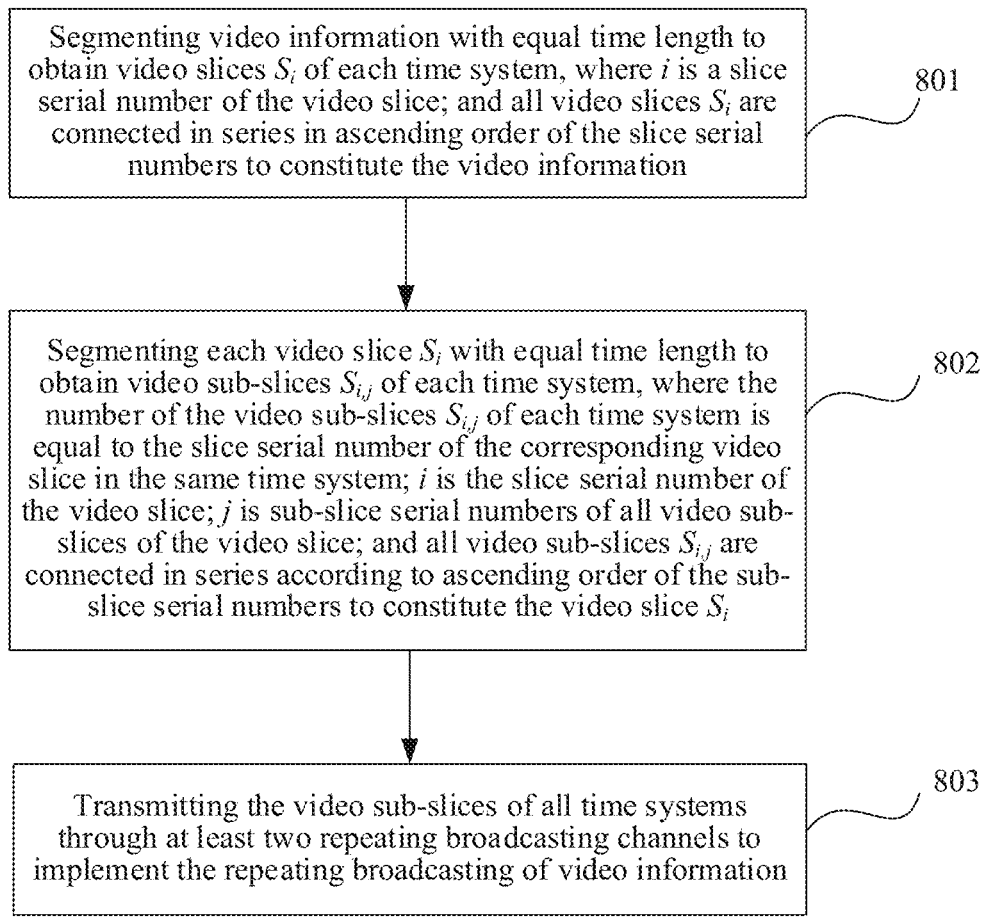
FIG. 8 is a flow chart of a WHB repeating broadcasting algorithm.

As mentioned above, the method for distributing the video program through the repeating broadcasting channels unit is a DeRe repeating broadcasting method or a WHB repeating broadcasting method. Herein the WHB repeating broadcasting method is described in detail. As shown in FIG. 8, it is a flow chart of a WHB repeating broadcasting method. It includes:

Step 801): segment video information with equal time length to obtain video slices $S_i$ of each time system, where i is a slice serial number of the video slice; and all video slices $S_i$ are connected in series in ascending order of the slice serial numbers to constitute the video information.

In this embodiment, it is assumed that a video program with a time length of D exists, the playing speed of the video program is b, and therefore, the total size of the video is S=D*b. Taking a video program with a time length of 120 m as an example, it is assumed that the playing speed is 10 Mbps, and therefore, the total size of the video is 9 Gbytes. It is assumed that the waiting time of the user is reduced to:

$$T = D/N \quad (48)$$

where N is a positive integer; T is a user waiting time.

In this technical solution, the video program is segmented into N slices evenly. $S_i$ is the i-th slice of the video program. The time length for each $S_i$ is d. The time length d is called as a time system by us. All slices are connected in series in ascending order of the slice serial numbers thereof to constitute the entire video program.

Step 802): segment each video slice $S_i$ with equal time length to obtain video sub-slices $S_{i,j}$ of each time system, where the number of the video sub-slices $S_{i,j}$ of each time system is equal to the slice serial number of the corresponding video slice in the same time system; i is the slice serial number of the video slice; j is sub-slice serial numbers of all video sub-slices of the video slice; and all video sub-slices $S_{i,j}$ are connected in series in ascending order of the sub-slice serial numbers to constitute the video slice $S_i$.

Figure 9:
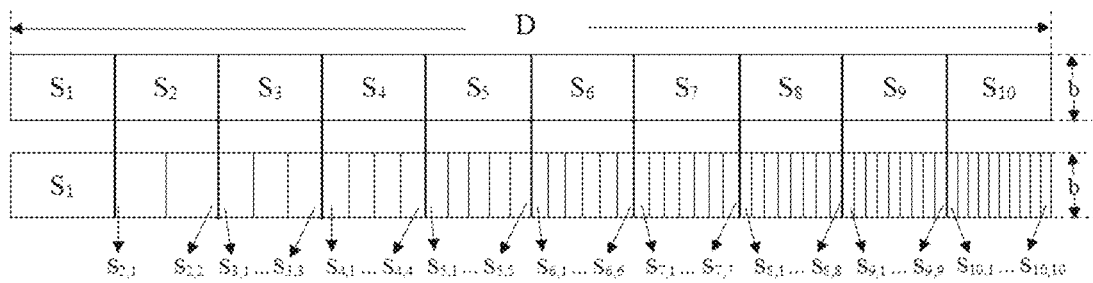
FIG. 9 is a schematic diagram of video cutting in a WHB repeating broadcasting algorithm.

In this technical solution, the i-th slice $S_i$ of the video program is segmented into i sub-slices evenly. $S_{i,j}$ is the j-th sub-slice of the slice $S_i$. All slices are connected in series in ascending order of the slice serial numbers thereof to constitute the entire slice. The size of $S_{i,j}$ is $S_i/i$. As shown in FIG. 9, it shows an example of video division of this technical solution, where N=10. The video is first segmented into 10 slices evenly, and then the i-th slice $S_i$ of the video is segmented into i sub-slices evenly.

Step 803): transmit the video sub-slices of all time systems through at least two repeating broadcasting channels to implement the repeating broadcasting of video information.

In this technical solution, the step of transmitting the video sub-slices of all time systems through at least two channels with equal bandwidth includes:

according to the size of a first video sub-slice of each video slice, successively placing the first video sub-slice of each video slice at a corresponding position in a space of a first time system of a corresponding repeating broadcasting channel in ascending order of the serial numbers of repeating broadcasting signals based on ascending order of the sub-slice serial numbers; and in a space of any other time system k of all repeating broadcasting channels, a position of the video sub-slice $S_{i,j}$ of each video slice $S_i$ in the repeating broadcasting channels is the same as a position of a first video sub-slice $S_{i,1}$ of the corresponding video slice in a space of a first time system of the repeating broadcasting channels, wherein j=(k−1)mod i+1.

Actually, in the case of only one repeating broadcasting channel, the video program is distributed circularly in the repeating broadcasting channel by using a program time length as a period.

Figure 10A:
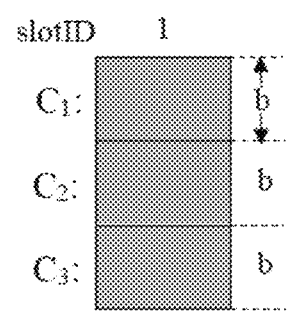
FIG. 10a is a schematic diagram I of placing video slices in a WHB repeating broadcasting algorithm.
Figure 10B:
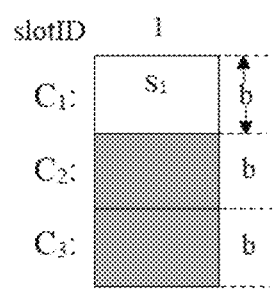
FIG. 10b is a schematic diagram II of placing video slices in a WHB repeating broadcasting algorithm.
Figure 10C:
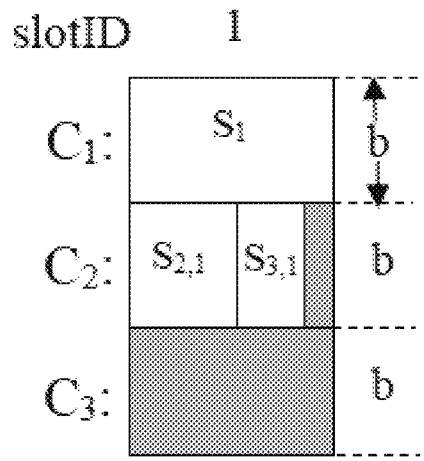
FIG. 10c is a schematic diagram III of placing video slices in a WHB repeating broadcasting algorithm.
Figure 10D:
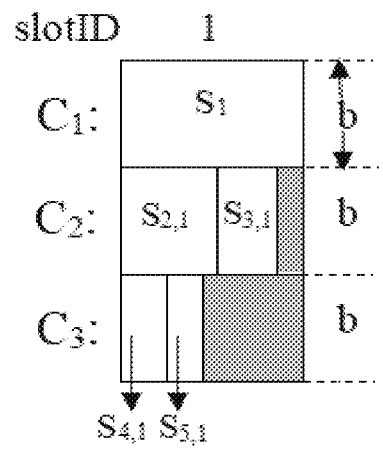
FIG. 10d is a schematic diagram IV of placing video slices in a WHB repeating broadcasting algorithm.
Figure 10E:
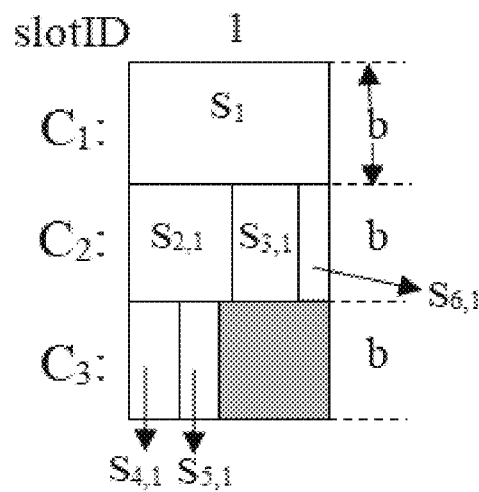
FIG. 10e is a schematic diagram V of placing video slices in a WHB repeating broadcasting algorithm.
Figure 10F:
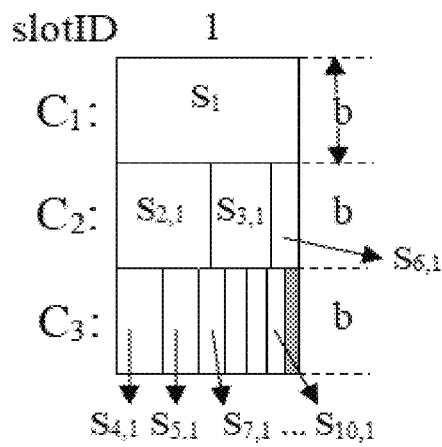
FIG. 10f is a schematic diagram VI of placing video slices in a WHB repeating broadcasting algorithm.

In this embodiment, it is assumed that we have sufficient channels to transmit the video program, and the transmission bandwidth of each channel is equal. Taking N=10 as an example, arrangements of sub-slices in each channel of the first time system are considered: first, the sub-slice $S_{1,1}$ is placed in channel $C_1$, and at this time, the remaining space of $C_1$ in the first time system is 0, as shown in FIG. 10a and FIG. 10b. The shaded part represents the remaining space in the channel. The element without shades represents the sub-slice that is arranged. Then, $S_{2,1}$ is placed in channel $C_2$, and at this time, $C_2$ in first time system has a remaining space of d/2; $S_{3,1}$ is continuously placed in channel $C_2$, and at this time, $C_2$ only has a remaining space of d/6, which is not enough for placing $S_{4,1}$, and therefore, $S_{4,1}$ is placed in channel $C_3$, and at this time, $C_3$ has a remaining space of 3d/4; $S_{5,1}$ is continuously placed in channel $C_3$, and at this time, $C_3$ only has a remaining space of 11d/20; when placing $S_{6,1}$, since the remaining space for the channel $C_2$ is not enough for receiving $S_{6,1}$, the sub-slice $S_{6,1}$ is placed in channel $C_2$, and $C_2$ has 0 remaining space; sub-slices $S_{7,1}$, $S_{8,1}$, $S_{9,1}$, and $S_{10,1}$ are continuously arranged, as shown in FIG. 10c, FIG. 10d, FIG. 10e, and FIG. 10f. The arrangement mode actually is a greedy algorithm; specifically, it refers to placing the sub-slices of each slice in the remaining space of a channel with a small serial number as many as possible; the four sub-slices can all be placed in the channel $C_3$, and the remaining space of $C_3$ is 179d/2520.

The position arrangements of the sub-slices in the channel in the first time system are stated above. On this basis, in any time system k, a position of the sub-slice $S_{i,j}$ belonging to the slice $S_i$ in the channel is the same as a position of the sub-slice $S_{i,1}$ in the channel in first time system, where, j=(k−1)mod i+1. For example, the sub-slice $S_6$ of the slice in the tenth time system is $S_{6,4}$, and in the time system, the sub-slice $S_{6,4}$ is located at an end of the channel $C_2$. Each channel periodically broadcasts all sub-slices of the video using this mode.

Figure 11:
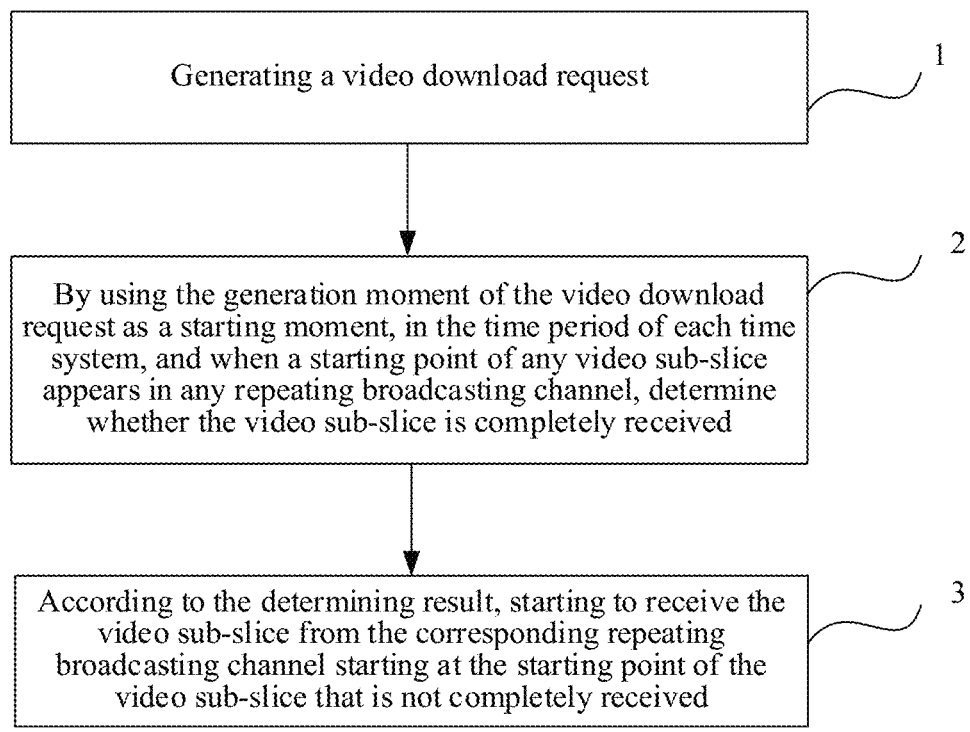
FIG. 11 is a flow chart of a video information receiving method based on a WHB repeating broadcasting algorithm.

As shown in FIG. 11, it is a flow chart of a video information receiving method based on a WHB repeating broadcasting algorithm. It includes:

Step 1): generate a video download request.

Step 2): By using the generation moment of the video download request as a starting moment, in the time period of each time system, and when a starting point of any video sub-slice appears in any repeating broadcasting channel, determine whether the video sub-slice is completely received.

Step 3): according to the determining result, start to receive the video sub-slice from the corresponding repeating broadcasting channel starting at the starting point of the video sub-slice that is not completely received.

It is assumed that the client has enough spaces to cache part of the video that is playing. When to view a video, the user waits for downloading the video data until encountering the starting point of any sub-slice in any channel. It is assumed that the user starts to download the video data at moment $T_0$. The user necessarily follows the following steps when receiving the slice:

1) In a time of a time system, i.e., a time period of $T_0$ to $T_0$+d, when a starting point of any sub-slice $S_{i,j}$ appears in any channel $C_i$ (1≤i≤channelID$_{max}$), the user starts to download video data from the channel $C_1$. It is assumed that the moment for the user to start to download the sub-slice $S_{i,j}$ is $T_0+\delta_i (0 \leq \delta_i \leq 1)$, where $\delta_i$ is the time from the moment $T_0$ until encountering the starting point of the sub-slice $S_{i,j}$.

2) When the slice $S_i$ is completely received by the user, the user stops receiving the slice $S_i$ from the channel $C_j$ where $S_i$ is located; when the starting point of the sub-slice of the slice $S_k$ that is not completely received appears in the channel $C_j$, the user continues to receive the video data from the channel $C_j$. For slice $S_i$, the user stops receiving all sub-slices thereof from the moment of $T_0+(i-1)d+\delta_i$.

Figure 12:
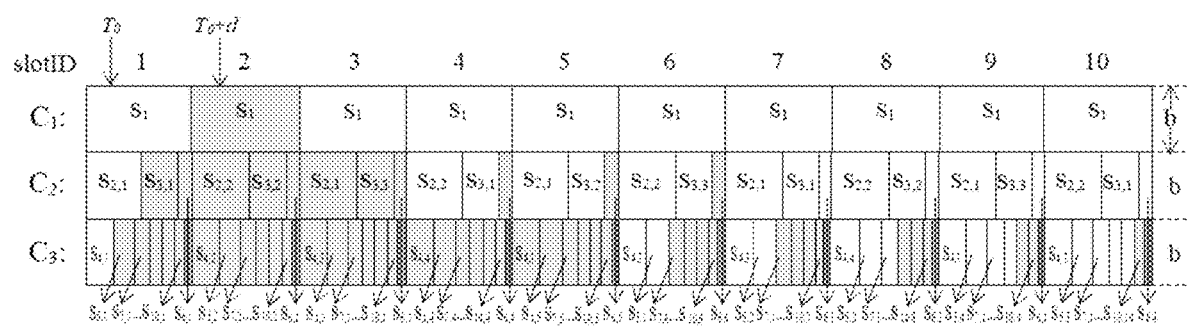
FIG. 12 is a schematic diagram of receiving video slices by a client based on a WHB repeating broadcasting algorithm.

3) To ensure that the video can be continuously played, we may delay the viewing starting time of the user back for a period of time. If the user starts to download the video data at the moment $T_0$, as shown in FIG. 12, the light shaded part in FIG. 12 is the video slices received by the user who starts to receive at the moment $T_0$ and starts to view the video at the moment $T_0$+d, and then, the user starts to view the video slices received at the moment $T_0$+d, so as to implement uninterruptedly viewing the video.

In this technical solution, while keeping the specific HB algorithm with low transmission bandwidth demands, the original slicing mode and channel involved are improved, so that this technical solution is easy to be implemented in engineering. However, the bandwidth required by this technical solution in the transmission of video programs is close to the theoretical lower limit of the repeating broadcasting algorithm, and this technical solution is suitable for the scene that cannot be changed once the channel bandwidth is determined. Furthermore, it can be seen from FIG. 12 that a user needs to wait for a time system to view a video after sending a video viewing request.

Figure 13:
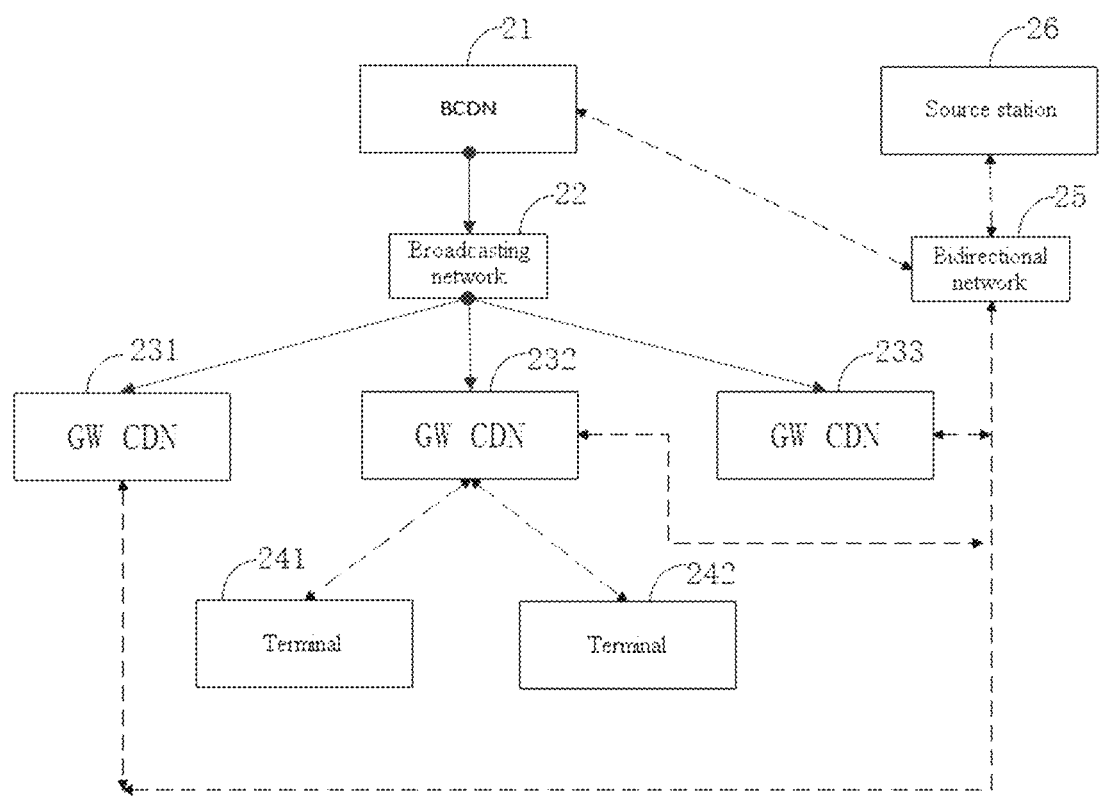
FIG. 13 is a schematic diagram of network topology of a repeating broadcasting distribution solution.

As shown in FIG. 13, it is a schematic diagram of network topology of a repeating broadcasting distribution solution. In FIG. 13, makers represent Broadcasting Content Distribution Networks (BCDN); markers 231, 232, and 233 all represent that gateway CDN (GW CDN) is a similar household router device. The BCDN is a general term for methods for distributing contents using a broadcasting channels, and a core algorithm thereof is based on the video distribution method of this technical solution.

CDN and GW CDN are distributed by means of multicast network, as shown in marker 22 in FIG. 13. In this way, on the basis of using a little network bandwidth, the overlapping bandwidth flow of repeated popular video streams can be transmitted, and even if the terminal number is increased, the network capacity does not need to be increased, and only one CDN is required to be deployed. A bidirectional network connection exists between the CDN and GW CDN at the same time, for transmitting interactive signaling and some low-speed network data.

Figure 14:
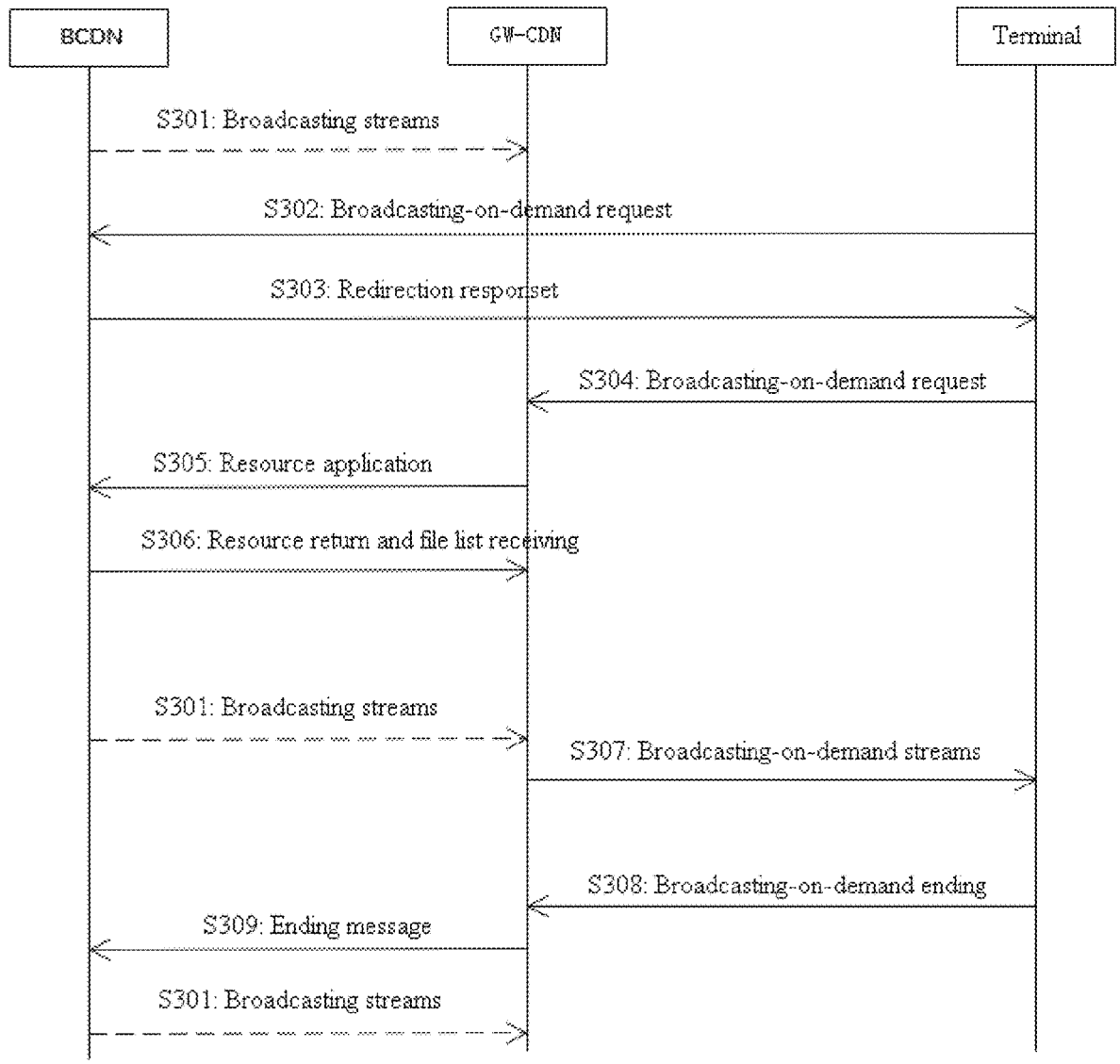
FIG. 14 is a flow chart of a repeating broadcasting distribution solution.

FIG. 14 is a flow chart of a repeating broadcasting distribution solution, and the detailed process is described as follows:

S301: BCDN determines a target popular video. Transfer the target popular video from VOD to repeating broadcasting for sending. First slice the target popular video. Segment the target popular video with equal time length to obtain video slices $S_i$ of each time system, where i is a slice serial number of the video slice; and all video slices $S_i$ are connected in series in ascending order of the slice serial numbers to constitute the video information. Segment each video slice $S_i$ with equal time length to obtain video sub-slices $S_{i,j}$ of each time system, where the number of the video sub-slices $S_{i,j}$ of each time system is equal to the slice serial number of the corresponding video slice in the same time system; i is the slice serial number of the video slice; j is sub-slice serial numbers of all video sub-slices of the video slice; and all video sub-slices $S_{i,j}$ are connected in series in ascending order of the sub-slice serial numbers to constitute the video slice $S_i$. Transmit the video sub-slices of all time systems through the repeating broadcasting channels. Send the target popular video onto the broadcasting networks.

S302: the terminal generates a playing request and starts to download the target popular video. The playing request is URL. The URL is subjected to DNS analysis first; a DNS server maps a domain name to a BCDN corresponding IP address according to strategies; in this way, the request first reaches the BCDN, for example, the request URL is analyzed as http://www.BCDN.com/a.mp4.

S303: the BCDN receives the request, checks the request, and search whether a related film source is included and whether the film source is pushed for broadcasting; when meeting playing starting requirements, it returns a redirection response, and returns a GW CDN related URL, for example, the redirection URL may be set as http://gw_cdn-.com/a.mp4.

S304: When the terminal sends the request to the GW CDN according to the redirection URL, it needs to configure the DNS mapping on the local area network of the terminal device to match the domain name of gw_cdn.com with the IP address of the GW CDN. The GW CDN device will be deployed on each local area subnet.

S305: the GW CDN sends a request to the BCDN, the request containing the name and serial number information of the film source of the VOD, and the exchange format of the request is JSON format with good readability and expansibility.

S306: the BCDN returns the information of the repeating broadcasting channel, including the IP address, port or frequency point and PID of the relevant repeating broadcasting channel.

S307: the GW CDN receives the slice data, sorts the slice data, caches the first arrived slice, and integrates the stream data into the protocol format supported by the terminal playing.

S308: When the playing ends, the terminal sends an ending message to the GW CDN, and the GW CDN stops receiving streams from the push broadcast channel and also stops sending the streams to the terminal to clear the playing control state.

S309: the GW CDN forwards a playing ending message to the BCDN, and the BCDN updates the playing state simultaneously and clears the relevant state and database at the same time.

In the WHB repeating broadcasting algorithm implementing solution, the mode of slice multichannel distribution is adopted: according to the size of a first video sub-slice of each video slice, successively placing the first video sub-slice of each video slice at a corresponding position in a space of a first time system of a corresponding repeating broadcasting channel in ascending order of the serial numbers of repeating broadcasting signals based on ascending order of the sub-slice serial numbers; and in a space of any other time system k of all repeating broadcasting channels, a position of the video sub-slice $S_{i,j}$ of each video slice $S_i$ in the repeating broadcasting channels is the same as a position of a first video sub-slice $S_{i,1}$ of the corresponding video slice in a space of a first time system of the repeating broadcasting channels. This ensures that whenever the viewer plays from the beginning of the film source, the required waiting time is very short. The waiting time depends on the time length of the slice, and the general granularity is controlled within a few seconds. Actually, the first slice time length determining method includes: the number of the repeating broadcasting channels of the video program is determined by taking the derivative of the sum of a repeating broadcasting flow and a supplementary packet flow of the video program distributed through the repeating broadcasting channels; the repeating broadcasting slice time length is determined according to the repeating broadcasting slice number and the video program time length; and the repeating broadcasting slice number is determined using the repeating broadcasting channel number. The second slice time length determining method includes: the repeating broadcasting slice time length of the video program is set as a constant; the number of the repeating broadcasting channels is determined according to the repeating broadcasting slice number; and the repeating broadcasting slice number is determined using the repeating broadcasting slice time length and the video program time length.

In this technical solution, an implementation of the present application provides a fourth video distribution method, including:

obtaining the number of the repeating broadcasting channels, the number of repeating broadcasting slices, and a curve of the number of on-line viewers of each video program;

Determining a video program recommended to the corresponding user terminal; and when the number of repeating broadcasting channels is greater than the total number of repeating broadcasting channels occupied by all video programs distributed through the repeating broadcasting channels, pushing a video program through spare repeating broadcasting channels to the corresponding user terminal.

Preferably, the video distribution method further includes:

obtaining a first result when the number of repeating broadcasting channels is less than the total number of the repeating broadcasting channels occupied by all video programs distributed through the repeating broadcasting channels, where the first result represents a broadcasting-on-demand flow expected to be generated for the recommended video program; determining a video program with a minimum broadcasting-on-demand flow carried by repeating broadcasting in all video programs distributed by means of repeating broadcasting, and according to the curve of the number of on-line viewers, determining a second result, where the second result represents an area between the number of on-line viewers in the last repeating broadcasting channel of the video program with the minimum broadcasting-on-demand flow carried by repeating broadcasting and the viewing time progress; and comparing the first result with the second result, and when the first result is greater than the second result, using the last repeating broadcasting channel of the video program with the minimum broadcasting-on-demand flow carried by repeating broadcasting to push the video program to a corresponding user terminal.

Figure 15:
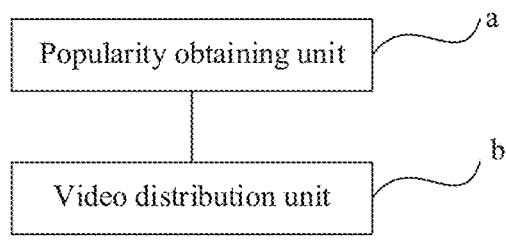
FIG. 15 is a block diagram of a video distribution apparatus disclosed by this specification.

As shown in FIG. 15, it is a block diagram of a video distribution apparatus provided by an implementation of the present application. It includes:

a popularity obtaining unit a, configured to obtain a popularity of each video program, wherein the popularity is a preference degree of a user group for a video program within a statistic time period; and a video distribution unit b, configured to determine, according the popularity of each video program, to distribute a video content of the video program through repeating broadcasting channels or by means of broadcasting on demand.

Preferably, the video distribution unit is configured to:

use an effective click of each video program to determine to distribute the video program through the repeating broadcasting channels or by means of broadcasting on demand, where the effective click is obtained by dividing a total time length of viewing the video program in the statistic time period by a statistic time length.

Preferably, the video distribution unit includes:

a first comparison sub-unit, configured to compare an effective click of each video program with an effective click threshold, to obtain a first comparison result; and a first video distribution sub-unit, configured to determine to distribute the video program through the repeating broadcasting channels or by means of broadcasting on demand according to the first comparison result, wherein the effective click threshold is determined according to a time length of the video program, the number of the repeating broadcasting channels, an observing time period, and a repeating broadcasting slice time length.

Preferably, the first video distribution sub-unit is specifically configured to:

if the effective click of the video program is greater than the effective click threshold, distribute the video program through the repeating broadcasting channels; or if the effective click of the video program is less than or equal to the effective click threshold, distribute the video program by means of broadcasting on demand.

Preferably, the video distribution unit further includes:

a historical broadcasting-on-demand data obtaining sub-unit, configured to obtain historical broadcasting-on-demand data of the video program distributed through the repeating broadcasting channels;

a first interest feature obtaining sub-unit, configured to extract an interest feature of a corresponding user from the historical broadcasting data, wherein the interest feature comprises: a video program and a viewing time length ratio of a certain video program viewed by a user;

a first similarity obtaining sub-unit, configured to obtain, according to the viewing time length ratio of the video program, a similarity between the video program in the interest feature and each clustering center, wherein the clustering center is obtained by clustering sample video program data;

a first hidden factor vector obtaining sub-unit, configured to determine a hidden factor vector of the video program according to the similarity;

a first parameter determining sub-unit, configured to determine a video program preference degree deviation value, a user preference degree deviation value, a hidden factor vector of a user, and a hidden factor vector between the user and the viewed video program;

a preference degree value obtaining sub-unit, configured to obtain a preference degree value for the video program according to the video program hidden factor vector, the total number of video programs viewed by the user, the video program preference degree deviation value, the user preference degree deviation value, the hidden factor vector of the user, and the hidden factor vector between the user and the viewed video program;

a first sorting sub-unit, configured to sort the video programs distributed through the repeating broadcasting channels according to the preference degree value; and a second video distribution sub-unit, configured to distribute the corresponding video program through the repeating broadcasting channels according to a sorting result.

Preferably, the first parameter determining sub-unit is specifically configured to:

solve a loss function using a random gradient descent method and determine the corresponding video program preference degree deviation value, user preference degree deviation value, hidden factor vector of the user, and hidden factor vector between the user and the viewed video program when the value of the loss function is a minimum value.

Preferably, the similarity is obtained by the first similarity obtaining sub-unit through a Manhattan distance formula, a Euclidean distance formula or a Pearson formula.

Preferably, the first hidden factor vector obtaining sub-unit includes:

a first extreme value similarity module, configured to obtain a maximum similarity and a minimum similarity from a similarity between the video program and each clustering center;

a first normalization module, configured to divide the similarity between the video program and each clustering center by the maximum similarity or minimum similarity to obtain normalization result values; and a first zero setting module, configured to set the normalization result values less than a threshold as zero, maintain the normalization result values greater than or equal to the threshold unchanged, and use a vector constituted by obtained result values as the hidden factor vector of the video program.

Preferably, the video distribution unit further includes:

a second sorting sub-unit, configured to sort the effective clicks of the video programs distributed through the repeating broadcasting channels; and a third video distribution sub-unit, configured to distribute the corresponding video program through the repeating broadcasting channels according to a sorting result.

Preferably, the video distribution unit further includes:

a unit channel flow carrying rate obtaining sub-unit, configured to obtain a unit channel flow carrying rate of the video program distributed through the repeating broadcasting channels;

a third sorting sub-unit, configured to sort the unit channel flow carrying rates of the video programs distributed through the repeating broadcasting channels; and a fourth video distribution sub-unit, configured to distribute the corresponding video program through the repeating broadcasting channels according to a sorting result.

Preferably, the video distribution unit further includes:

a second parameter determining sub-unit, configured to obtain the number of the repeating broadcasting channels, the number of repeating broadcasting slices, and a curve of the number of on-line viewers of the video program distributed through the repeating broadcasting channels;

a first partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a first comparison sub-unit, configured to, in all curves of the number of on-line viewers of the video programs distributed through the repeating broadcasting channels, compare an area between the number of on-line viewers corresponding to a current time length period that is not placed in the repeating broadcasting channels in each video program and a viewing time progress to obtain a maximum area; and a fifth video distribution sub-unit, configured to allocate one repeating broadcasting channel for distributing in a repeating broadcasting manner the video content of the video program corresponding to the maximum area upon each comparison.

Preferably, the video distribution unit further includes:

an on-line viewer number curve sub-unit, configured to obtain the curve of the number of on-line viewers of the video program distributed through the repeating broadcasting channels;

a repeating broadcasting channel number determining sub-unit, configured to determine, according to a first repeating broadcasting time length of the video program, the number of the repeating broadcasting channels corresponding to a minimum value of sums of repeating broadcasting flows and supplementary packet flows of the video program distributed through the repeating broadcasting channels;

a repeating broadcasting slice parameter determining sub-unit, configured to determine, according to the number of the repeating broadcasting channels and the first repeating broadcasting time length of the video program, a repeating broadcasting slice time length and the number of the repeating broadcasting slices;

a second partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a second comparison sub-unit, configured to, in all curves of the number of on-line viewers of the video programs distributed through the repeating broadcasting channels, compare an area between the number of on-line viewers corresponding to a current time length period that is not placed in the repeating broadcasting channels in each video program and a viewing time progress to obtain a maximum area;

a repeating broadcasting time length determining sub-unit, configured to determine, according to each comparison result, that each repeating broadcasting channel is used for distributing the video content of the video program corresponding to the maximum area in a repeating broadcasting manner, and when the number of comparisons equals to the number of the repeating broadcasting channels, and collect statistics on the time length corresponding to the maximum area to obtain a second repeating broadcasting time length of each video program; and an iteration sub-unit, configured to obtain an absolute value of a difference between a total flow carrying rate corresponding to the first repeating broadcasting time length and a total flow carrying rate corresponding to the second repeating broadcasting time length; if the absolute value is less than or equal to a threshold, use the second repeating broadcasting time length of the video program distributed in a repeating broadcasting manner as a final repeating broadcasting time length of the video program and arrange the repeating broadcasting channels to distribute the corresponding video content; if the absolute value is greater than the threshold, use the second repeating broadcasting time length of the video program distributed in a repeating broadcasting manner as the first repeating broadcasting time length, determine, according to each area comparison result, the video content for repeating broadcasting through the repeating broadcasting channels and the second repeating broadcasting time length of the video program until the absolute value of the difference between the total flow carrying rate corresponding to the first repeating broadcasting time length and the total flow carrying rate corresponding to the second repeating broadcasting time length is less than or equal to the threshold, stop an iterative operation, and arrange the repeating broadcasting channels to distribute the corresponding video content.

Preferably, the video distribution unit further includes:

a third parameter determining sub-unit, configured to obtain the number of the repeating broadcasting channels, the number of repeating broadcasting slices, and a curve of the number of on-line viewers of each video program;

a third partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a first sorting result obtaining sub-unit, configured to obtain an area between the number of on-line viewers corresponding to a time length period of a last repeating broadcasting channel of a video program distributed through the repeating broadcasting channels and a viewing time progress, and arrange in descending order to obtain a first sorting result;

a second sorting result obtaining sub-unit, configured to use the popularity to arrange the video programs that are not placed in the repeating broadcasting channels for distribution in an ascending order to obtain a second sorting result; and obtain an area between the number of on-line viewers corresponding to a time length period of the first n−1 repeating broadcasting channels of each video program in the second sorting result and the viewing time progress, wherein n is the number of the repeating broadcasting channels of the video programs that are not placed in the repeating broadcasting channels for distribution; and a sixth video distribution sub-unit, configured to compare an area between the number of on-line viewers corresponding to the time length period of the first n−1 repeating broadcasting channels of a first video program in the second sorting result and a viewing time progress with the sum of areas between the number of on-line viewers corresponding to the time length period of the first n−1 last repeating broadcasting channels in the first sorting result and the viewing time progress; if the area between the number of on-line viewers corresponding to the time length period of the first n−1 repeating broadcasting channels of the first video program in the second sorting result and the viewing time progress is greater than the sum of areas between the number of on-line viewers corresponding to the time length period of the first n−1 last repeating broadcasting channels in the first sorting result and the viewing time progress, use the corresponding n−1 repeating broadcasting channels in the first sorting result for repeatedly broadcasting the video contents corresponding to the time length period of the first n−1 repeating broadcasting channels of the first video program in the second sorting result; continue to compare the area between the number of on-line viewers corresponding to the time length period of the first n−1 repeating broadcasting channels of a second video program in the second sorting result and the viewing time progress with the sum of areas between the number of on-line viewers corresponding to the time length period of the first n−1 last repeating broadcasting channels in remaining areas in the first sorting result and the viewing time progress, until the video content corresponding to the time length period of the last repeating broadcasting channel of the video program distributed through the repeating broadcasting channels is replaced or the area between the number of on-line viewers corresponding to the time length period of the first n−1 repeating broadcasting channels of the current video program in the second sorting result and the viewing time progress is less than or equal to the sum of the areas between the number of on-line viewers corresponding to the time length period of the first n−1 last repeating broadcasting channels in the remaining areas in the first sorting result and the viewing time progress; and arrange the repeating broadcasting channels to distribute the corresponding video content.

Preferably, the number of the repeating broadcasting channels of the video program is determined by the popularity obtaining unit by taking the derivative of the sum of a repeating broadcasting flow and a supplementary packet flow of the video program distributed through the repeating broadcasting channels; the repeating broadcasting slice time length is determined according to the repeating broadcasting slice number and the video program time length; and the repeating broadcasting slice number is determined using the repeating broadcasting channel number.

Preferably, the repeating broadcasting slice time length of the video program is set by the popularity obtaining unit as a constant; the number of the repeating broadcasting channels is determined according to the repeating broadcasting slice number; and the repeating broadcasting slice number is determined using the repeating broadcasting slice time length and the video program time length.

Preferably, when the repeating broadcasting slice time length of the video program obtained by the popularity obtaining unit is greater than a time length threshold, a video content is obtained by means of broadcasting on demand from a starting moment of the video program, and the video content of the video program is obtained through the repeating broadcasting channels from a moment corresponding to a starting point of a first video sub-slice appearing at any one repeating broadcasting channel.

Preferably, the video distribution apparatus further includes:

a target video program determining unit, configured to obtain and determine a video program recommended to the corresponding user terminal; and a first target video program recommendation unit, configured to, when the number of repeating broadcasting channels is greater than the total number of repeating broadcasting channels occupied by all video programs distributed through the repeating broadcasting channels, push a video program through spare repeating broadcasting channels to the corresponding user terminal.

Preferably, the video distribution apparatus further includes:

a first result obtaining unit, configured to obtain a first result, wherein the first result represents a broadcasting-on-demand flow expected to be generated for the recommended video program;

a second result obtaining unit, configured to determine a video program with a minimum broadcasting-on-demand flow carried by repeating broadcasting in all video programs distributed by means of repeating broadcasting, and according to the curve of the number of on-line viewers, determine a second result, wherein the second result represents an area between the number of on-line viewers in the last repeating broadcasting channel of the video program with the minimum broadcasting-on-demand flow carried by repeating broadcasting and the viewing time progress; and a second target video program recommendation unit, configured to compare the first result with the second result, and when the first result is greater than the second result, use the last repeating broadcasting channel of the video program with the minimum broadcasting-on-demand flow carried by repeating broadcasting to push the video program to a corresponding user terminal.

Preferably, the target video program determining unit includes:

a historical broadcasting-on-demand data obtaining sub-unit, configured to obtain historical broadcasting-on-demand data of the user;

a second interest feature obtaining sub-unit, configured to extract an interest feature of a corresponding user from the historical broadcasting data, wherein the interest feature comprises: a video program and a viewing time length ratio of a certain video program viewed by a user;

a second similarity obtaining sub-unit, configured to obtain, according to the viewing time length ratio of the video program, a similarity between the video program in the interest feature and each clustering center, wherein the clustering center is obtained by clustering sample video program data;

a second hidden factor vector obtaining sub-unit, configured to determine a hidden factor vector of the video program according to the similarity;

a second parameter determining sub-unit, configured to determine a video program preference degree deviation value, a user preference degree deviation value, a hidden factor vector of a user, and a hidden factor vector between the user and the viewed video program;

a preference degree prediction value obtaining sub-unit, configured to obtain a preference degree prediction value of the user for each program according to the video program hidden factor vector, the total number of video programs viewed by the user, the video program preference degree deviation value, the user preference degree deviation value, the hidden factor vector of the user, and the hidden factor vector between the user and the viewed video program; and a recommendation sub-unit, configured to determine a video program recommended to the corresponding user terminal according to the preference degree prediction value.

Preferably, the preference degree prediction value obtaining sub-unit obtains, through statistics, the total number of all video programs viewed by the user through the historical behavior of the user.

Preferably, the recommendation sub-unit includes:

a removal module, configured to remove a video program viewed by the user;

a recommendation list obtaining module, configured to arrange remaining video programs according to the size of the preference degree prediction value in descending order and generate a recommendation list according to an arrangement result; and a video program sending module, configured to send data of a video program ranked front in the recommendation list to a user terminal.

Preferably, the second hidden factor vector obtaining sub-unit is specifically configured to:

solve a loss function using a random gradient descent method and determine the corresponding video program preference degree deviation value, user preference degree deviation value, hidden factor vector of the user, and hidden factor vector between the user and the viewed video program when the value of the loss function is a minimum value.

Preferably, the second interest feature obtaining sub-unit obtains a viewing time length ratio for a user to view a certain video program according to dividing a time length of the certain video program by a total time length of the corresponding video program.

Preferably, the similarity is obtained by the second similarity obtaining sub-unit through a Manhattan distance formula, a Euclidean distance formula or a Pearson formula.

Preferably, the second hidden factor vector obtaining sub-unit includes:

a second extreme value similarity module, configured to obtain a maximum similarity and a minimum similarity from a similarity between the video program and each clustering center;

a second normalization module, configured to divide the similarity between the video program and each clustering center by the maximum similarity or minimum similarity to obtain normalization result values; and a second zero setting module, configured to set the normalization result values less than a threshold as zero, maintain the normalization result values greater than or equal to the threshold unchanged, and use a vector constituted by obtained result values as the hidden factor vector of the video program.

Preferably, the method for distributing the video program through the repeating broadcasting channels for the video distribution unit is a DeRe repeating broadcasting method or a WHB repeating broadcasting method.

Preferably, the video distribution unit includes:

a first segmenting sub-unit, configured to segment the video program with equal time length to obtain video slices $S_i$ of each time system, wherein i is a slice serial number of the video slice; all video slices $S_i$ are connected in series in ascending order of the slice serial numbers to constitute the video program; and the time system is a time length of the video slices $S_i$ of the video program;

a second segmenting sub-unit, configured to segment each video slice $S_i$ with equal time length to obtain video sub-slices $S_{i,j}$ of each time system, wherein the number of the video sub-slices $S_{i,j}$ of each time system is equal to the slice serial number of the corresponding video slice in the same time system; i is the slice serial number of the video slice; j is sub-slice serial numbers of all video sub-slices of the video slice; and all video sub-slices $S_{i,j}$ are connected in series in ascending order of the sub-slice serial numbers to constitute the video slice $S_i$; and a first repeating broadcasting sub-unit, configured to transmit the video sub-slices of all time systems through at least two repeating broadcasting channels to implement the repeating broadcasting of the video program.

Preferably, the first repeating broadcasting unit includes:

a first repeating broadcasting distribution module, configured to, according to the size of a first video sub-slice of each video slice, successively place the first video sub-slice of each video slice at a corresponding position in a space of a first time system of a corresponding repeating broadcasting channel in ascending order of the serial numbers of repeating broadcasting signals based on ascending order of the sub-slice serial numbers; and a second repeating broadcasting distribution module, configured to, in a space of any other time system k of all repeating broadcasting channels, set a position of the video sub-slice $S_{i,j}$ of each video slice $S_i$ in the repeating broadcasting channels the same as a position of a first video sub-slice $S_{i,1}$ of the corresponding video slice in a space of a first time system of the repeating broadcasting channels, wherein j=(k−1)mod i+1.

Preferably, the video distribution unit includes:

a second repeating broadcasting sub-unit, configured to, in the case of only one repeating broadcasting channel, distribute the video program circularly in the repeating broadcasting channel by using a program time length as a period.

Preferably, it further includes:

a channel bandwidth determining unit, configured to determine the bandwidth of the repeating broadcasting channel according to a playing bit rate of the video program.

Preferably, the unit channel flow carrying rate is determined by dividing a difference, which is obtained by subtracting a supplementary packet flow generated through repeating broadcasting of the same video program from a sum of flows generated by viewing the video program by all users in the statistic time period, by the number of repeating broadcasting channels used for repeating broadcasting of the video program, and further by a statistic time length.

Preferably, the video distribution apparatus further includes:

a fast forward unit, configured to, according to a fast forward playing request instruction, distribute the video content of a corresponding time length period by means of broadcasting on demand.

Preferably, the video distribution apparatus further includes:

a fast backward unit, configured to, according to a fast backward playing request instruction, obtain the video content of a corresponding time length period from a cache region.

Preferably, the video distribution unit further includes:

a fourth sorting sub-unit, configured to, according to the popularity, sort the video programs that are not placed in the repeating broadcasting channels for distribution; and a seventh video distribution sub-unit, configured to, when the repeating broadcasting channels are spare, use a sorting result to distribute the video programs that are not placed in the repeating broadcasting channels for distribution in a repeating broadcasting manner until all repeating broadcasting channels are used.

To implement the purpose above, an implementation of the present application provides a video distribution apparatus, including:

a parameter determining unit, configured to obtain the number of the repeating broadcasting channels, the number of repeating broadcasting slices, and a curve of the number of on-line viewers of each video program;

a target video determining unit, configured to determine a video program recommended to the corresponding user terminal; and a first video distribution unit, configured to, when the number of repeating broadcasting channels is greater than the total number of repeating broadcasting channels occupied by all video programs distributed through the repeating broadcasting channels, push a video program through spare repeating broadcasting channels to the corresponding user terminal.

Preferably, the video distribution apparatus further includes:

a second video distribution unit, configured to obtain a first result when the repeating broadcasting channel number is less than the total number of the repeating broadcasting channels occupied by all video programs distributed through the repeating broadcasting channels, wherein the first result represents a broadcasting-on-demand flow expected to be generated for the recommended video program; determine a video program with a minimum broadcasting-on-demand flow carried by repeating broadcasting in all video programs distributed by means of repeating broadcasting, and according to the curve of the number of on-line viewers, determine a second result, wherein the second result represents an area between the number of on-line viewers in the last repeating broadcasting channel of the video program with the minimum broadcasting-on-demand flow carried by repeating broadcasting and the viewing time progress; and compare the first result with the second result, and when the first result is greater than the second result, use the last repeating broadcasting channel of the video program with the minimum broadcasting-on-demand flow carried by repeating broadcasting to push the video program to a corresponding user terminal.

Figure 16:
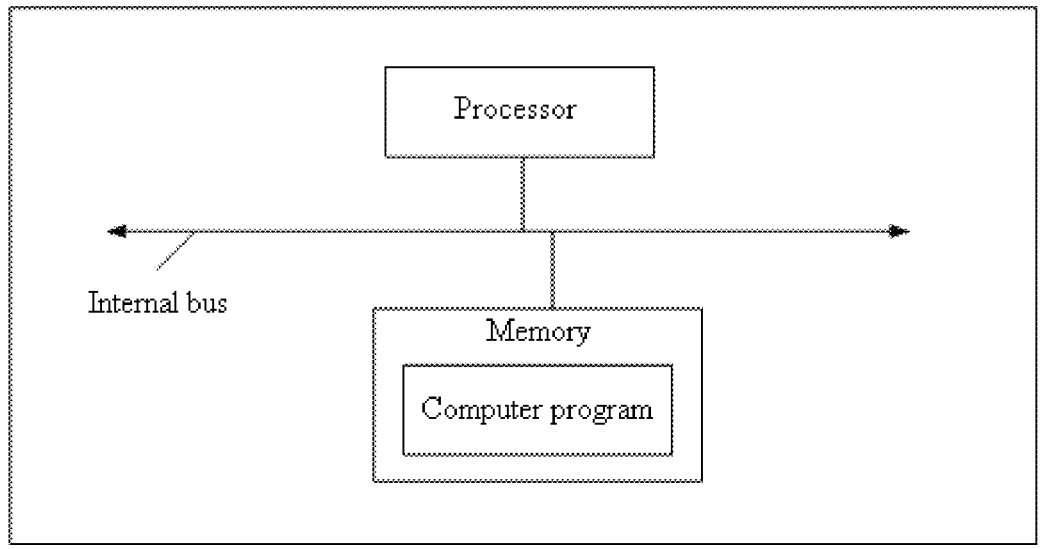
FIG. 16 is a schematic diagram of an electronic device disclosed by this specification.

As shown in FIG. 16, it is a schematic diagram of an electronic device provided by an embodiment of this specification. It includes a memory, a processor, and a computer program stored on the memory and runnable on the processor, where when the computer program is executed by the processor, the video distribution method in FIG. 1 above is implemented.

For the video recommendation method provided by the implementation of this specification, the specific functions implemented by the memory and processor thereof can be explained by comparing with the preceding implementations in this description and can achieve the technical effects of the preceding implementations, and thus are omitted for conciseness.

Figure 17:
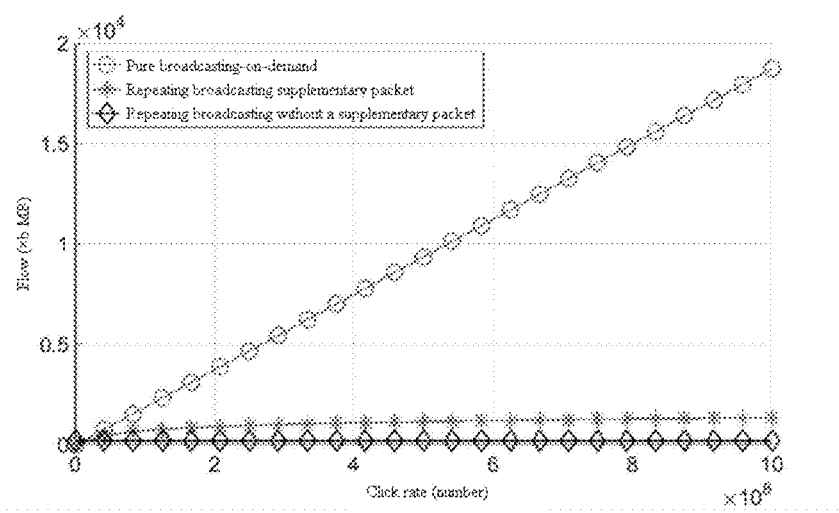
FIG. 17 is a relation graph between a large amount of video program flows and effective clicks in a linear coordinate system.
Figure 18:
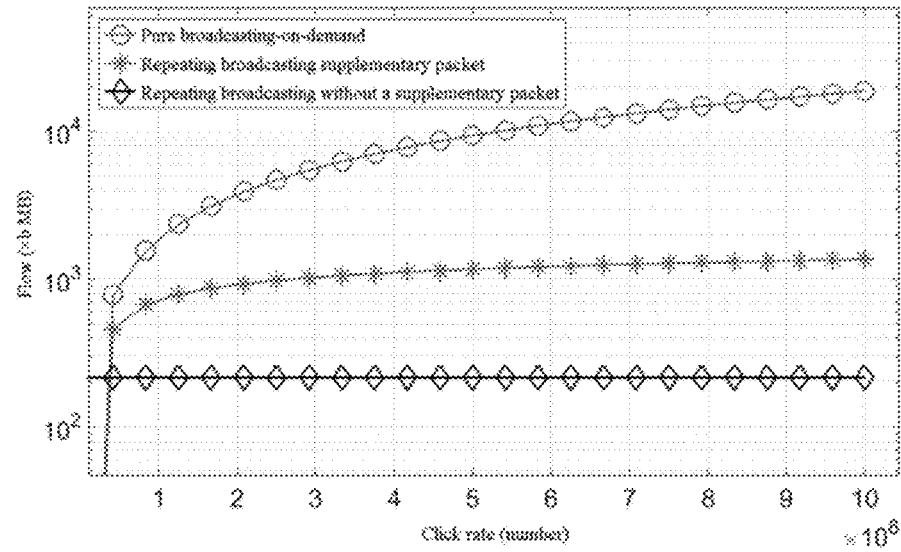
FIG. 18 is a relation graph between a large amount of video program flows and effective clicks in a semilog coordinate system.

FIG. 17 is a relation graph between a large amount of video program flows and effective clicks in a linear coordinate system. FIG. 18 is a relation graph between a large amount of video program flows and effective clicks in a semilog coordinate system. In FIG. 17 and FIG. 18, the horizontal coordinate represents the total effective click of the video program; the longitudinal coordinate represents the flow generated by distributing the video; the unit is MB (1 MB represents $10^6$ bytes or $8 \times 10^6$ bits). The asterisk curve describes the flows generated by the distribution of the video in this technical solution under different effective clicks; the o shaped curve describes the flows generated by the distribution of the video in the pure broadcasting-on-demand solution under different effective clicks; the diamond shaped curve describes the flows generated by the distribution of the video in this technical solution under different effective clicks without considering the supplementary packet. As can be seen from FIG. 17 and FIG. 18, in the traditional pure broadcasting-on-demand solution, the flow generated by distributing a large amount of videos is sharply increased along with the increasing of the total effective click, and the increasing trend is roughly a linear increasing; while in this technical solution, the flow generated by distributing a large amount of videos is relatively slowly increased along with the increasing of the total effective click, and the increasing trend is roughly in a logarithmic increasing. As can be seen that for a large amount of video programs, the distribution efficiency of using this technical solution is far higher than that of the traditional pure broadcasting-on-demand distribution solution.

Table 5 indicates a percentage of the flow generated by distributing using this technical solution to the flow generated using the traditional pure broadcasting-on-demand distribution solution with different total effective clicks when distributing a large amount of programs. xeN in the table represents $x \times 10^N$.

TABLE 5

| Click rate V | 1e3 | 1e4 | 1e5 | 1e6 | 1e7 | 1e8 | 1e9 |
|---|---|---|---|---|---|---|---|
| Percentage (%) | 100.00 | 100.00 | 99.85 | 95.40 | 80.31 | 38.68 | 7.26 |

Hence, the larger the total effective click is, the less the proportion of the flow generated by distributing using this technical solution to the flow generated using the traditional pure broadcasting-on-demand distribution solution is, and the more the flow saved during distribution using this technical solution, and therefore, the advantages of the solution is more obvious.

The expression of the flow when using this technical solution for distributing a large amount of video programs consists of two parts:

1) The flow generated by repeating broadcasting distribution;

2) The flow generated by supplementary packet.

Figure 19:
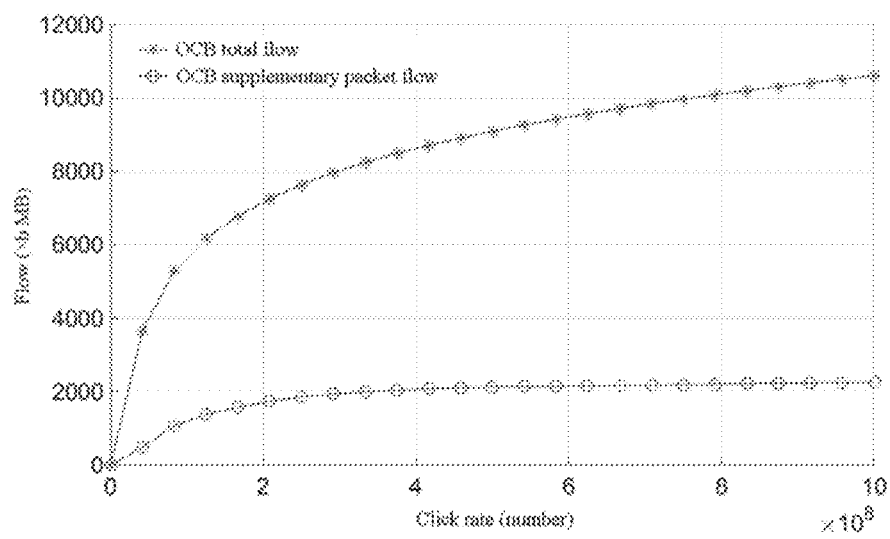
FIG. 19 is a flow analysis graph of distributing a large amount of video programs in this technical solution.

The flow generated by supplementary packet is as shown in FIG. 19. The horizontal coordinate represents the total effective click of the video program; the longitudinal coordinate represents the flow generated by distributing the video program; the unit is MB (1 MB represents 106 bytes or 8×106 bits).

In FIG. 19, The asteroid-shaped curve represents the total flows of the distribution of a large amount of video programs in this solution; the "o" constructed curve represents the flow generated by the supplementary packet therein. In the distribution of a large amount of videos, the increasing of the supplementary packet flow is quite slow as the increasing of the total effective click; after the total effective click is increased to a certain numeral value, the supplementary packet flow would no longer be increased as the increasing of the total effective click, and the flow generated through supplementary packet almost tends to a constant value.

Since the supplementary packet flow tends to be stable, as the increasing of the total effective click, the proportion of the flow generated through supplementary packet to the total flow would be gradually reduced. When the total effective click is increased to a certain degree, the proportion of the supplementary packet flow to the total flow is less than 20%.

In conclusion, the total flow of distributing a large amount of video programs using this technical solution increases logarithmically with the increasing of the program total effective click.

Figure 20:
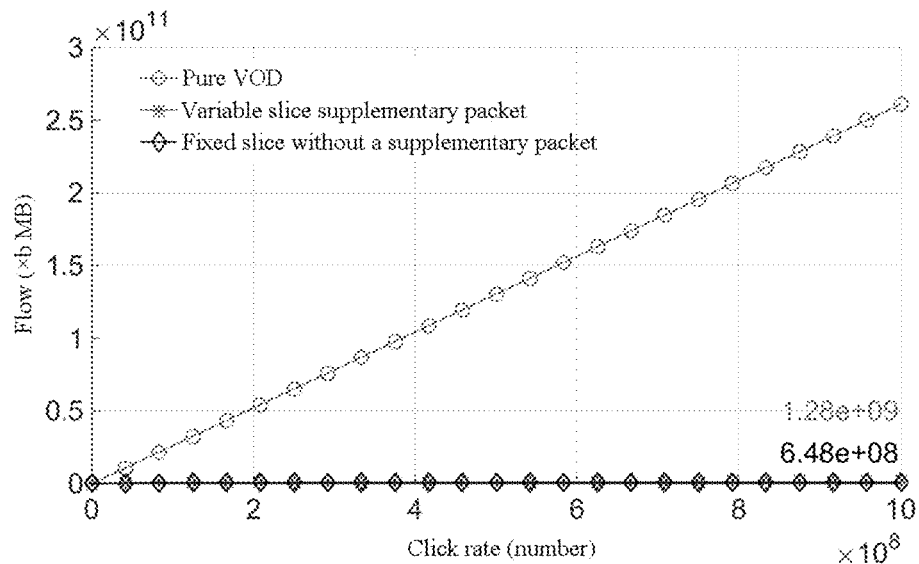
FIG. 20 is a schematic diagram I of flow trend simulation of different distribution solutions.
Figure 21:
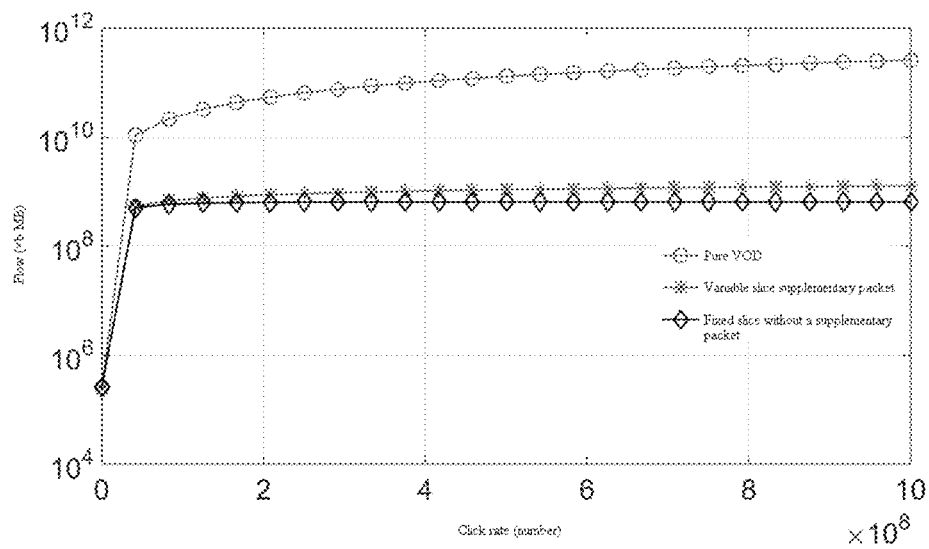
FIG. 21 is a schematic diagram II of flow trend simulation of different distribution solutions.

As shown in FIG. 20, it is a schematic diagram I of flow trend simulation of different distribution solutions. As shown in FIG. 21, it is a schematic diagram II of flow trend simulation of different distribution solutions. In FIG. 20 and FIG. 21, the horizontal coordinate represents the effective click of the video program; the longitudinal coordinate represents the flow generated by distributing the video; the unit is B (1 B represents 1 bytes or 8 bits). FIG. 20 is a linear coordinate system. FIG. 21 is a semilog coordinate system. The asterisk curve describes the flows generated by the distribution of the video in this technical solution under different effective clicks; the "o" constructed curve describes the flows generated by the distribution of the video in the pure broadcasting-on-demand solution under different effective clicks; the black diamond shaped curve describes the flows generated by the distribution of the video in this technical solution under different effective clicks without counting the supplementary packet. As can be known from FIG. 20 and FIG. 21, for the pure VOD distribution solution, according to an ideal point-to-point network structure, as the increasing of the clicks, the video flows are also linearly increased and the increasing amount of the flows are also linearly increased.

Figure 22:
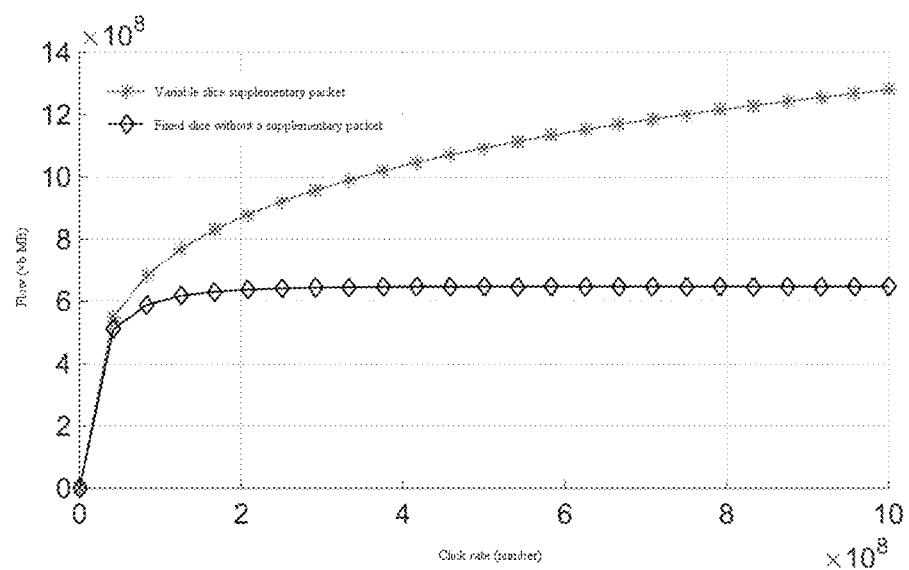
FIG. 22 is a schematic diagram of flow trends generated in this technical solution with a supplementary packet and without counting the supplementary packet.

To more remarkable see the flow trends generated by distributing the video with the supplementary packet and without counting the supplementary packet, as shown in FIG. 22, the horizontal coordinate represents the effective click of the video program; the longitudinal coordinate represents the flow generated by distributing the video; the unit is B (1 B represents 1 bytes or 8 bits). The asterisk curve describes the flows generated by the distribution of the video in this technical solution under different effective clicks; the black diamond shaped curve describes the flows generated by the distribution of the video in this technical solution under different effective clicks without counting the supplementary packet. For this technical distribution solution with supplementary packet, as the increasing of the click, the increasing of the flow is logarithmically increased in a relatively slow manner, and the increasing amount of the flow is also logarithmically increased; for this technical distribution solution without counting the supplementary packet, the increasing of the flow thereof is constantly increased in a relatively slower manner, and the increasing amount of the flow is not changed with the increasing of the click, and therefore, when the clicks are increased to a certain degree (when the click of the program at last also exceeds the threshold), the flow will no longer be increased.

In this implementation, the memory may include a physical apparatus for storing information, usually digitizing the information and then storing in a medium using electrical, magnetic or optical methods. The memory of this implementation may further include: an apparatus for storing information by means of electricity, such as RAM, ROM, etc.; an apparatus that uses magnetic energy to store information, such as a hard disk, a floppy disk, a magnetic tape, a magnetic core memory, a magnetic bubble memory, or a U disk; and an apparatus that stores information optically, such as a CD or DVD. Of course, there are other forms of memories, such as a quantum memory, a graphene memory, and so on.

In this implementation, the processor can be implemented according to any proper mode. For example, the processor may take, for example, a microprocessor or processor and a computer-readable medium which stores a computer-readable program code (such as software or firmware) that can be executed by the (micro)processor, a logic gate, a switch, an Application Specific Integrated Circuit (ASIC), a programmable logic controller, and an embedded microcontroller, and other forms.

In this embodiment, an embodiment of this specification further provides a readable storage medium, having a computer program stored thereon, where when the computer program is executed, steps of the video distribution method above is implemented.

As compared with the existing technology, in this technical solution, popular videos are distributed to the user terminal by means of repeating broadcasting or recommending, and non-hot videos are distributed to the user terminal by means of VOD, while can not only greatly reduce the overall data flow, but also quite slowly increase the flow with the increase of user clicks. Hence, the problem of flow congestions on the Internet during peak hours will be solved. Moreover, it can greatly improve the distribution efficiency, reduce flows, reduce investments, and save resources and energy.

A person skilled in the art also knows that other than implementing the client and server by means of pure computer-readable program codes, the same function can be completely implemented through logic programming of the method steps so that the client and server are in the forms of logic gates, switches, application-specific integrated circuits, programmable logic controllers, embedded microcontrollers, etc. Therefore, the client and server can be considered as a hardware component, and the apparatuses included therein for performing various functions can also be considered as structures within the hardware component. Or even, the apparatuses for performing various functions can be considered as either software modules for implementing the method or structures within the hardware component.

From the description of the implementation above, a person skilled in the art can clearly understand that this specification can be implemented by means of software plus the necessary general hardware platform. Based on such an understanding, the essence of the technical solution of this specifically or the part contributing to the existing technology can be manifested in the form of a software product; the computer software product can be stored in a storage medium, such as ROM/RAM, a disk, an optical disk, etc., including several instructions to make a computer device (which may be a personal computer, a server, a network device, etc.) to perform the methods described in each or parts of the implementations of this specification.

The various implementations in this specification are all described in an incremental manner. The same and similar parts of various implementations can be referred to each other. Each implementation focuses on the differences with respect to other implementations. In particular, for the implementations of the client and server, both can refer to the introduction of the implementation of the method described above for explanation.

No matter for a single video program or a large amount of video programs, even for music pictures and other non-video programs, as long as it is about content, this technical solution can be used. Moreover, for videos, the solution has even more advantages. The flow generated when distributing the video in this technical solution increases logarithmically with the increasing of the effective click of the video program. The increasing speed is quite slow.

Compared with the original pure on-demand distribution scheme, not only the growth trend is much slower, but also the flow generated by the distribution of the same program is also greatly reduced, and the efficiency of saving flow is up to more than 90% in theory. Moreover, with the increasing of the effective click, the advantages of this technical solution will be more prominent. The solution also has good characteristics under the condition of limited channels, and the flow saving rate is still up to more than 80%.

Therefore, the solution can be well applied to large video websites such as Youtube, Tudou, and Youku.

Compared with traditional VOD or Content Distribution (CDN) distribution modes, video distribution using this technical solution has the following significant advantages:

1. High transmission efficiency. Under the same channel (1000 channel upper limit), the number of videos distributed by the repeating broadcasting solution is 20 times that of the traditional CDN distribution solution. For the flow generated by transmitting the same video program, the repeating broadcasting solution is about 24% of the flow of the traditional CDN solution.

2. Low waiting time. Theoretically, the repeating broadcasting solution can achieve the waiting time of any time (5 s or 1 s or even less, the waiting time of 5 s is tolerable for most users), and the waiting time is very stable. The transmission waiting time of the traditional CDN mode depends largely on the current transmission network situation. When the network is smooth, the waiting time can basically reach about 3 s. However, when the transmission network is relatively congested and the channel resources are tight, the transmission waiting time of traditional CDN will increase greatly; 10 s or even a few minutes may be possible.

3. High reliability and good user experience. Good user experience. Because for the repeating broadcasting solution, the transmission efficiency is improved, the transmission waiting time is reduced, and the transmission waiting time is relatively stable, the waiting time threshold can be set according to the user's feelings. The repeating broadcasting solution can ensure that the receiving user starts to view the repeatedly broadcast video content continuously without stop within the set waiting time threshold. Therefore, the reliability of the repeating broadcasting solution is greatly improved, so that more users can be accommodated to watch the video and the user feelings are greatly improved.

4. Low energy consumption and low investment. Efficient transmission will inevitably lead to the saving of transmission resources, which will greatly slow down the progress of network expansion and reduce the pressure caused by limited network resources. Therefore, it greatly reduces the investment in network construction and saves a lot of energy consumption for the society.

This specification can be described in the general context of a computer executable instruction executed by a computer, for example, a program module. In general, the program module includes routines, programs, objects, components, data structures, and so on that perform a specific task or implement a specific abstract data type. This specification can also be practiced in distributed computing environments where tasks are performed by remote processing devices that are connected over a communication network. In the distributed computing environment, the program module can reside in both local and remote computer storage media, including storage devices.

In the 1990s, it was clear whether a technological improvement was a hardware improvement (for example, an improvement to the circuit structure of diodes, transistors, switches, etc.) or a software improvement (an improvement to the process flow). However, with the development of technology, many current improvements to method flows can be regarded as the direct improvements to the hardware circuit structure. Designers almost obtain the corresponding hardware circuit structure by programming the improved method flows into the hardware circuit. Therefore, it cannot be said that an improvement to the method flow cannot be achieved with a hardware entity module. For example, a Programmable Logic Device (PLD) (such as a Field Programmable Gate Array (FPGA)) is such an integrated circuit whose Logic function is determined by the user's programming of a device. A digital system is programmed by the designers themselves to be "integrated" on a single PLD, without the need for a chip manufacturer to design and manufacture a dedicated integrated circuit chip. Moreover, today, instead of making integrated circuit chips by hand, this programming is mostly implemented in "logic compiler" software instead, which is similar to the software compiler used in the development and writing of programs, and an original code to be compiled is also written in a specific programming language. This is called the Hardware Description Language (HDL), not just one HDL, but many HDL types, such as Advanced Boolean Expression Language (Abel), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), and the like; the most commonly used is Very high-speed Integrated Circuit Hardware Description Language (VHDL) and Verilog. A person skilled in the art should also be clear that it is easy to obtain the hardware circuit for implementing the logical method flow only by using the above-mentioned hardware description languages for a little logic programming on the method flow and programming into the integrated circuit.

The controller can be implemented in any appropriate mode; for example, the processor may take, for example, a microprocessor or processor and a computer-readable medium which stores a computer-readable program code (such as software or firmware) that can be executed by the (micro)processor, a logic gate, a switch, an Application Specific Integrated Circuit (ASIC), a programmable logic controller, and an embedded microcontroller, and other forms. Examples of the controller include, but not limited to, the following microcontrollers: ARC 625D, Atmel AT91SAM, Microchip PIC18F26K20, and Silicone Labs C8051F320; the memory controller can also be implemented as part of the control logic of the memory. A person skilled in the art also knows that other than implementing the controller by means of pure computer-readable program codes, the same function can be completely implemented through logic programming of the method steps so that the controller is in the forms of logic gates, switches, application-specific integrated circuits, programmable logic controllers, embedded microcontrollers, etc. Therefore, the controller can be considered as a hardware component, and the apparatuses included therein for performing various functions can also be considered as structures within the hardware component. Or even, the apparatuses for performing various functions can be considered as either software modules for implementing the method or structures within the hardware component.

The system, apparatus, module, or unit explained in the above-mentioned embodiments may be implemented specifically by a computer chip or entity, or by a product having a certain function. A typical implementing device is a computer. Specifically, the computer may be, such as, a personal computer, a laptop computer, a vehicle-mounted human-computer interaction device, a cellular phone, a camera phone, a smart phone, a personal digital assistant, a media player, a navigation device, an electronic mail device, a game console, a tablet computer, a wearable device or a combination of any of these devices.

Although the embodiments of this specification provide the operating steps of the method as described in the embodiments or flow charts, more or fewer operating steps may be included based on conventional or uncreative means. The sequence of steps listed in the embodiments is only one of the execution sequences of steps and does not represent a unique execution sequence. In actual apparatus or end product execution, it can be performed sequentially or in parallel (such as in-parallel processor or a multithreading environment, or even in a distributed data processing environment) in the method shown in the embodiments or drawings. The term "include", "comprise" or any of its other variants is intended to cover a non-exclusive comprising, so that the process, method, product or device including a series of elements not only includes those elements, but also include other elements that are not explicitly listed, or further includes inherent elements of the process, method, product or device. Without further limitations, the existence of additional identical or equivalent elements in the process, method, product or device including the elements are not excluded.

For the convenience of description, when describing the above-mentioned device, they are divided into various modules for respective descriptions according to functions thereof. Certainly, in the implementation of the embodiment of this specification, the function of each module can be realized in the same or more software and/or hardware, or the module that realizes the same function can also be realized by the combination of multiple submodules or subunits. The apparatus embodiments described above are only exemplary. For example, the partition of the unit is only a logical function partition. Other partitioning modes can be used during actual implementations, such as multiple units or members can be combined or integrated into another system, or some features can be ignored or not implemented. Another point, the mutual coupling or direct coupling or communication connection shown or discussed may be indirect coupling or communication connection through some interfaces, apparatus or units, and may be electrical, mechanical or other forms.

A person skilled in the art also knows that other than implementing the controller by means of pure computer-readable program codes, the same function can be completely implemented through logic programming of the method steps so that the controller is in the forms of logic gates, switches, application-specific integrated circuits, programmable logic controllers, embedded microcontrollers, etc. Therefore, the controller can be considered as a hardware component, and the apparatuses included therein for performing various functions can also be considered as structures within the hardware component. Or even, the apparatuses for performing various functions can be considered as either software modules for implementing the method or structures within the hardware component.

The present invention is described with reference to flow charts and/or block diagrams of the methods, devices (systems), and computer program products according to the embodiments of the present invention. It should be understood that each process and/or box in a flowchart and/or block diagram and the combination of the processes and/or boxes in the flowcharts and/or block diagrams can be realized by computer program instructions. The computer program instructions can be provided to processors of general-purpose computers, specialized computers, embedded processors, or other programmable data processing devices to produce a machine, so that the instructions executed by the processor of the computer or other programmable data processing device produces an apparatus for implementing a specific function in one or more flows in the flow chart and/or one or more boxes in the block diagram.

These program instruction can also be stored in the computer can boot a computer or other programmable data processing equipment to work in a specific manner of computer memory, makes stored in the computer memory instructions produce including device manufactures, the directive device in a process flow chart or multiple processes and/or block diagram a box or more of the functions of specified in the box.

The computer program instructions can also be loaded to a computer or other programmable data processing device, so as to execute a series of operating steps on the computer or other programmable devices to produce a computer implemented processing, so that the instruction executed on the computer or other programmable devices provides a step of implementing a specific function in one or more flows in the flow chart and/or one or more boxes in the block diagram.

In a typical configuration the computing device includes one or more processors (CPU), an Input/output interface, a network interface, and an internal storage.

The internal storage may include non-permanent memory in computer-readable media, random access memory (RAM) and/or non-volatile memory, such as read-only memory (ROM) or flash RAM. The internal storage is an example of the computer-readable media.

Computer-readable media include permanent and non-permanent, removable and non-removable media and information storage can be achieved by any method or technology. Information can be computer-readable instructions, data structures, modules of a program, or other data. Examples of computer storage media include, but not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only disc read-only memory (CD-ROM), digital multipurpose optical disc (DVD) or other optical storage, magnetic cassette, magnetic disk storage or other magnetic storage device or any other non-transmission media that may be used for storing information that can be accessed by a computing device. As defined in the text, the computer-readable media do not include computer-readable media (transitory media), such as modulated data signals and carriers.

A persons skilled in the art should understand that embodiments of this specification may be provided as methods, systems, or computer program products. Therefore, the embodiments of this specification may take the forms of full hardware embodiments, full software embodiments, or a combination embodiment of software and hardware aspects. Furthermore, the embodiments of this specification may be in the form of a computer program product implemented on one or more computer available storage media (including, but not limited to, disk memory, CD-ROM, optical memory, etc.) containing computer available program codes.

The embodiments of this specification can be described in the general context of a computer executable instruction executed by a computer, such as a program module. In general, the program module includes routines, programs, objects, components, data structures, and so on that perform a specific task or implement a specific abstract data type. The embodiments of this specification can also be practiced in distributed computing environments where tasks are performed by remote processing devices that are connected over a communication network. In the distributed computing environment, the program module can reside in both local and remote computer storage media, including storage devices.

The various embodiments in this specification are all described in an incremental manner. The same and similar parts of various embodiments can be referred to each other. Each embodiment focuses on the differences with respect to other embodiments. In particular, for system embodiments, since they are basically similar to method embodiments, the description is relatively simple. For relevant information, please refer to part of explanations of the method embodiments. In the description of this specification, the description of the reference terms "an embodiment", "some embodiments", "an example", "a specific example", "some examples," and the like means that specific features, structures, materials or characteristics described in combination with the embodiment(s) or example(s) are included in at least one embodiment or example of the embodiments of this specification In this specification, exemplary descriptions of the foregoing terms do not necessarily refer to a same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

The foregoing is an embodiment of the embodiments of this specification only and is not intended to limit the embodiments of this specification. The embodiments of this specification are subject to a variety of changes and variations for a person skilled in the art. Any modifications, equivalent substitutions, improvements, etc. made within the spirit and principles of the embodiments of this specification shall all be covered by the scopes of claims of the embodiments of this specification.

Although this specification is described by means of implementations, a person having ordinary skill in the art is aware that there are many variations and changes in this specification that do not deviate from the spirit of this specification and it is expected that the attached claims include such variations and changes without deviating from the spirit of this specification.

The invention claimed is:

1. A video distribution method, comprising:
obtaining a popularity of each video program, wherein the popularity is a preference degree of a user group for a video program within a statistic time period;
determining, according to the popularity of each video program, to distribute a video content of the video program through repeating broadcasting channels or by means of broadcasting on demand; and
distributing the video content through the repeating broadcasting channels or by the means of broadcasting on demand,
wherein the step of determining to distribute the video program through repeating broadcasting channels or by means of broadcasting on demand comprises:
using an effective click of each video program to determine to distribute the video program through the repeating broadcasting channels or by means of broadcasting on demand, wherein the effective click is obtained by dividing a total time length of viewing the video program in the statistic time period by a statistic time length,
wherein the step of using an effective click of each video program to determine to distribute the video program through the repeating broadcasting channels or by means of broadcasting on demand comprises:
comparing the effective click of each video program with an effective click threshold, to obtain a first comparison result; and
determining to distribute the video program through the repeating broadcasting channels or by means of broadcasting on demand according to the first comparison result, wherein the effective click threshold is determined according to a time length of the video program, the number of the repeating broadcasting channels, an observing time period, and a repeating broadcasting slice time length.

2. The method according to claim 1, wherein the step of determining to distribute the video program through the repeating broadcasting channels or by means of broadcasting on demand according to the first comparison result comprises:
if the effective click of the video program is greater than the effective click threshold, distributing the video program through the repeating broadcasting channels;
or if the effective click of the video program is less than or equal to the effective click threshold, distributing the video program by means of broadcasting on demand.

3. The method according to claim 1, wherein the step of determining, according the popularity of each video program, to distribute a video content of the video program through repeating broadcasting channels or by means of broadcasting on demand further comprises:
sorting the effective clicks of the video programs distributed through the repeating broadcasting channels; and
distributing the corresponding video program through the repeating broadcasting channels according to a sorting result.

4. The method according to claim 1, wherein the step of determining, according the popularity of each video program, to distribute a video content of the video program through repeating broadcasting channels or by means of broadcasting on demand further comprises:
obtaining a unit channel flow carrying rate of the video program distributed through the repeating broadcasting channels;
sorting the unit channel flow carrying rates of the video programs distributed through the repeating broadcasting channels; and
distributing the corresponding video program through the repeating broadcasting channels according to a sorting result.

5. The method according to claim 1, wherein the step of determining, according the popularity of each video program, to distribute a video content of the video program through repeating broadcasting channels or by means of broadcasting on demand further comprises:
obtaining the number of the repeating broadcasting channels, the number of repeating broadcasting slices, and a curve of the number of on-line viewers of the video program distributed through the repeating broadcasting channels;
partitioning the curve of the number of on-line viewers by a time length period corresponding to each addition of a repeating broadcasting channel according to a relation list between the number of the repeating broadcasting channels and the number of repeating broadcasting slices;

in all curves of the number of on-line viewers of the video programs distributed through the repeating broadcasting channels, comparing an area between the number of on-line viewers corresponding to a current time length period that is not placed in the repeating broadcasting channels in each video program and a viewing time progress to obtain a maximum area; and allocating one repeating broadcasting channel for distributing in a repeating broadcasting manner the video content of the video program corresponding to the maximum area upon each comparison.

6. The method according to claim 1, wherein the step of determining, according the popularity of each video program, to distribute a video content of the video program through repeating broadcasting channels or by means of broadcasting on demand further comprises:

obtaining the curve of the number of on-line viewers of the video program distributed through the repeating broadcasting channels;

determining, according to a first repeating broadcasting time length of the video program, the number of the repeating broadcasting channels corresponding to a minimum value of sums of repeating broadcasting flows and supplementary packet flows of the video program distributed through the repeating broadcasting channels;

determining, according to the number of the repeating broadcasting channels and the first repeating broadcasting time length of the video program, a repeating broadcasting slice time length and the number of the repeating broadcasting slices;

partitioning the curve of the number of on-line viewers by a time length period corresponding to each addition of a repeating broadcasting channel according to a relation list between the number of the repeating broadcasting channels and the number of repeating broadcasting slices;

in all curves of the number of on-line viewers of the video programs distributed through the repeating broadcasting channels, comparing an area between the number of on-line viewers corresponding to a current time length period that is not placed in the repeating broadcasting channels in each video program and a viewing time progress to obtain a maximum area; and determining, according to each comparison result, that each repeating broadcasting channel is used for distributing the video content of the video program corresponding to the maximum area in a repeating broadcasting manner, and when the number of comparisons equals to the number of the repeating broadcasting channels, and collecting statistics on the time length corresponding to the maximum area to obtain a second repeating broadcasting time length of each video program; and obtaining an absolute value of a difference between a total flow carrying rate corresponding to the first repeating broadcasting time length and a total flow carrying rate corresponding to the second repeating broadcasting time length; if the absolute value is less than or equal to a threshold, using the second repeating broadcasting time length of the video program distributed in a repeating broadcasting manner as a final repeating broadcasting time length of the video program and arranging the repeating broadcasting channels to distribute the corresponding video content; if the absolute value is greater than the threshold, using the second repeating broadcasting time length of the video program distributed in a repeating broadcasting manner as the first repeating broadcasting time length, determining, according to each area comparison result, the video content for repeating broadcasting through the repeating broadcasting channels and the second repeating broadcasting time length of the video program until the absolute value of the difference between the total flow carrying rate corresponding to the first repeating broadcasting time length and the total flow carrying rate corresponding to the second repeating broadcasting time length is less than or equal to the threshold, stopping an iterative operation, and arranging the repeating broadcasting channels to distribute the corresponding video content.

7. The method according to claim 1, wherein the step of determining, according the popularity of each video program, to distribute a video content of the video program through repeating broadcasting channels or by means of broadcasting on demand further comprises:

obtaining the number of the repeating broadcasting channels, the number of repeating broadcasting slices, and a curve of the number of on-line viewers of each video program;

partitioning the curve of the number of on-line viewers by a time length period corresponding to each addition of a repeating broadcasting channel according to a relation list between the number of the repeating broadcasting channels and the number of repeating broadcasting slices;

obtaining an area between the number of on-line viewers corresponding to a time length period of a last repeating broadcasting channel of a video program distributed through the repeating broadcasting channels and a viewing time progress, and arranging in descending order to obtain a first sorting result;

using the popularity to arrange in an ascending order the video programs that are not placed in the repeating broadcasting channels for distribution to obtain a second sorting result;

obtaining an area between the number of on-line viewers corresponding to a time length period of the first n−1 repeating broadcasting channels of each video program in the second sorting result and the viewing time progress, wherein n is the number of the repeating broadcasting channels of the video programs that are not placed in the repeating broadcasting channels for distribution; and comparing an area between the number of on-line viewers corresponding to the time length period of the first n−1 repeating broadcasting channels of a first video program in the second sorting result and a viewing time progress with the sum of areas between the number of on-line viewers corresponding to the time length period of the first n−1 last repeating broadcasting channels in the first sorting result and the viewing time progress; if the area between the number of on-line viewers corresponding to the time length period of the first n−1 repeating broadcasting channels of the first video program in the second sorting result and the viewing time progress is greater than the sum of areas between the number of on-line viewers corresponding to the time length period of the first n−1 last repeating broadcasting channels in the first sorting result and the viewing time progress, using the corresponding n−1 repeating broadcasting channels in the first sorting result for repeatedly broadcasting the video contents corresponding to the time length period of the first n−1 repeating broadcasting channels of the first video program in the second sorting result; continuing to compare the area between the number of on-line viewers corresponding to the time length period of the first n−1 repeating broadcasting channels of a second video program in the second sorting result and the viewing time progress with the sum of areas between the number of on-line viewers corresponding to the time length period of the first n−1 last repeating broadcasting channels in remaining areas in the first sorting result and the viewing time progress, until the video content corresponding to the time length period of the last repeating broadcasting channel of the video program distributed through the repeating broadcasting channels is replaced or the area between the number of on-line viewers corresponding to the time length period of the first n−1 repeating broadcasting channels of the current video program in the second sorting result and the viewing time progress is less than or equal to the sum of the areas between the number of on-line viewers corresponding to the time length period of the first n−1 last repeating broadcasting channels in the remaining areas in the first sorting result and the viewing time progress; and arranging the repeating broadcasting channels to distribute the corresponding video content.

8. The method according to claim 1, wherein the number of the repeating broadcasting channels of the video program is determined by taking the derivative of the sum of a repeating broadcasting flow and a supplementary packet flow of the video program distributed through the repeating broadcasting channels; the repeating broadcasting slice time length is determined according to the repeating broadcasting slice number and the video program time length; and the repeating broadcasting slice number is determined using the repeating broadcasting channel number.

9. The method according to claim 1, wherein the repeating broadcasting slice time length of the video program is set as a constant; the number of the repeating broadcasting channels is determined according to the repeating broadcasting slice number; and the repeating broadcasting slice number is determined using the repeating broadcasting slice time length and the video program time length.

10. The method according to claim 1, wherein when the repeating broadcasting slice time length of the video program is greater than a time length threshold, a video content is obtained by means of broadcasting on demand from a starting moment of the video program, and the video content of the video program is obtained through the repeating broadcasting channels from a moment corresponding to a starting point of a first video sub-slice appearing at any one repeating broadcasting channel.

11. The method according to claim 1, wherein the video distribution method further comprises:
when the number of the repeating broadcasting channels is greater than the total number of the repeating broadcasting channels occupied by all video programs distributed through the repeating broadcasting channels, distributing the corresponding video program through spare repeating broadcasting channels according to the total preference degree list.

12. The method according to claim 11, wherein when the number of the repeating broadcasting channels is less than or equal to the total number of the repeating broadcasting channels occupied by all video programs distributed through the repeating broadcasting channels, the video distribution method further comprises:
obtaining a first result, wherein the first result represents a broadcasting-on-demand flow expected to be generated for the video program in the total preference degree list;
determining a video program with a minimum broadcasting-on-demand flow carried by repeating broadcasting in all video programs distributed by means of repeating broadcasting, and according to the curve of the number of on-line viewers, determining a second result, wherein the second result represents an area between the number of on-line viewers in the last repeating broadcasting channel of the video program with the minimum broadcasting-on-demand flow carried by repeating broadcasting and the viewing time progress; and
comparing the first result with the second result, and when the first result is greater than the second result, using the last repeating broadcasting channel of the video program with the minimum broadcasting-on-demand flow carried by repeating broadcasting to push the video program to a corresponding user terminal; and using an area between the number of on-line viewers in the last repeating broadcasting channel of the video program with the minimum broadcasting-on-demand flow carried by remaining repeating broadcasting and the viewing time progress as a second area to continue the comparison until the first result is less than the second result.

13. The method according to claim 1, wherein the method for distributing the video program through the repeating broadcasting channels is a DeRe repeating broadcasting method or a WHB repeating broadcasting method.

14. The method according to claim 13, wherein the WHB repeating broadcasting method comprises:
segmenting the video program with equal time length to obtain video slices $S_i$ of each time system, wherein i is a slice serial number of the video slice; all video slices $S_i$ are connected in series in ascending order of the slice serial numbers to constitute the video program; and the time system is a time length of the video slices $S_i$ of the video program;
segmenting each video slice $S_i$ with equal time length to obtain video sub-slices $S_{i,j}$ of each time system, wherein the number of the video sub-slices $S_{i,j}$ of each time system is equal to the slice serial number of the corresponding video slice in the same time system; i is the slice serial number of the video slice; j is sub-slice serial numbers of all video sub-slices of the video slice; and all video sub-slices $S_{i,j}$ are connected in series in ascending order of the sub-slice serial numbers to constitute the video slice $S_i$; and
transmitting the video sub-slices of all time systems through at least two repeating broadcasting channels to implement the repeating broadcasting of the video program.

15. The method according to claim 14, wherein the step of transmitting the video sub-slices of all time systems through at least two repeating broadcasting channels comprises:
according to the size of a first video sub-slice of each video slice, successively placing the first video sub-slice of each video slice at a corresponding position in a space of a first time system of a corresponding repeating broadcasting channel in ascending order of the serial numbers of repeating broadcasting signals based on ascending order of the sub-slice serial numbers; and in a space of any other time system k of all repeating broadcasting channels, a position of the video sub-slice $S_{i,j}$ of each video slice $S_i$ in the repeating broadcasting channels is the same as a position of a first video sub-slice $S_{i,1}$ of the corresponding video slice in a space of a first time system of the repeating broadcasting channels, wherein j=(k−1)mod i+1.

16. The method according to claim 1, wherein the video distribution method further comprises:

according to a fast forward playing request instruction, distributing the video content of a corresponding time length period by means of broadcasting on demand.

17. The method according to claim 1, wherein the video distribution method further comprises:

according to the popularity, sorting the video programs that are not placed in the repeating broadcasting channels for distribution; and when the repeating broadcasting channels are spare, using a sorting result to distribute the video programs that are not placed in the repeating broadcasting channels for distribution in a repeating broadcasting manner until all repeating broadcasting channels are used.

18. A video distribution apparatus, comprising:

a popularity obtaining unit, configured to obtain a popularity of each video program, wherein the popularity is a preference degree of a user group for a video program within a statistic time period;

a video distribution unit, configured to determine, according to the popularity of each video program, to distribute a video content of the video program through repeating broadcasting channels or by means of broadcasting on demand; and a transmission unit configured to distribute the video content through the repeating broadcasting channels or by the means of broadcasting on demand, wherein the video distribution unit is further configured to use an effective click rate of each video program to determine to distribute the video program through the periodic broadcasting channels or by means of broadcasting on demand, wherein the effective click rate is obtained by dividing a total duration of viewing the video program in the statistic time period by a statistic duration, wherein the video distribution unit comprises:
a first comparison sub-unit, configured to compare an effective click of each video program with an effective click threshold, to obtain a first comparison result; and a first video distribution sub-unit, configured to determine to distribute the video program through the repeating broadcasting channels or by means of broadcasting on demand according to the first comparison result, wherein the effective click threshold is determined according to a time length of the video program, the number of the repeating broadcasting channels, an observing time period, and a repeating broadcasting slice time length.

19. The apparatus according to claim 18, wherein the first video distribution sub-unit is specifically configured to:

if the effective click of the video program is greater than the effective click threshold, distribute the video program through the repeating broadcasting channels; or if the effective click of the video program is less than or equal to the effective click threshold, distribute the video program by means of broadcasting on demand.

20. The apparatus according to claim 18, wherein the video distribution unit further comprises:

a second sorting sub-unit, configured to sort the effective clicks of the video programs distributed through the repeating broadcasting channels; and a third video distribution sub-unit, configured to distribute the corresponding video program through the repeating broadcasting channels according to a sorting result.

21. The apparatus according to claim 18, wherein the video distribution unit further comprises:

a unit channel flow carrying rate obtaining sub-unit, configured to obtain a unit channel flow carrying rate of the video program distributed through the repeating broadcasting channels;

a third sorting sub-unit, configured to sort the unit channel flow carrying rates of the video programs distributed through the repeating broadcasting channels; and a fourth video distribution sub-unit, configured to distribute the corresponding video program through the repeating broadcasting channels according to a sorting result.

22. The apparatus according to claim 18, wherein the video distribution unit further comprises:

a second parameter determining sub-unit, configured to obtain the number of the repeating broadcasting channels, the number of repeating broadcasting slices, and a curve of the number of on-line viewers of the video program distributed through the repeating broadcasting channels;

a first partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a first comparison sub-unit, configured to, in all curves of the number of on-line viewers of the video programs distributed through the repeating broadcasting channels, compare an area between the number of on-line viewers corresponding to a current time length period that is not placed in the repeating broadcasting channels in each video program and a viewing time progress to obtain a maximum area; and a fifth video distribution sub-unit, configured to allocate one repeating broadcasting channel for distributing in a repeating broadcasting manner the video content of the video program corresponding to the maximum area upon each comparison.

23. The apparatus according to claim 18, wherein the video distribution unit further comprises:

an on-line viewer number curve sub-unit, configured to obtain the curve of the number of on-line viewers of the video program distributed through the repeating broadcasting channels;

a repeating broadcasting channel number determining sub-unit, configured to determine, according to a first repeating broadcasting time length of the video program, the number of the repeating broadcasting channels corresponding to a minimum value of sums of repeating broadcasting flows and supplementary packet flows of the video program distributed through the repeating broadcasting channels;

a repeating broadcasting slice parameter determining sub-unit, configured to determine, according to the number of the repeating broadcasting channels and the first repeating broadcasting time length of the video program, a repeating broadcasting slice time length and the number of the repeating broadcasting slices;

a second partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a second comparison sub-unit, configured to, in all curves of the number of on-line viewers of the video programs distributed through the repeating broadcasting channels, compare an area between the number of on-line viewers corresponding to a current time length period that is not placed in the repeating broadcasting channels in each video program and a viewing time progress to obtain a maximum area;

a repeating broadcasting time length determining sub-unit, configured to determine, according to each comparison result, that each repeating broadcasting channel is used for distributing the video content of the video program corresponding to the maximum area in a repeating broadcasting manner, and when the number of comparisons equals to the number of the repeating broadcasting channels, and collect statistics on the time length corresponding to the maximum area to obtain a second repeating broadcasting time length of each video program; and an iteration sub-unit, configured to obtain an absolute value of a difference between a total flow carrying rate corresponding to the first repeating broadcasting time length and a total flow carrying rate corresponding to the second repeating broadcasting time length; if the absolute value is less than or equal to a threshold, use the second repeating broadcasting time length of the video program distributed in a repeating broadcasting manner as a final repeating broadcasting time length of the video program and arrange the repeating broadcasting channels to distribute the corresponding video content; if the absolute value is greater than the threshold, use the second repeating broadcasting time length of the video program distributed in a repeating broadcasting manner as the first repeating broadcasting time length, determine, according to each area comparison result, the video content for repeating broadcasting through the repeating broadcasting channels and the second repeating broadcasting time length of the video program until the absolute value of the difference between the total flow carrying rate corresponding to the first repeating broadcasting time length and the total flow carrying rate corresponding to the second repeating broadcasting time length is less than or equal to the threshold, stop an iterative operation, and arrange the repeating broadcasting channels to distribute the corresponding video content.

24. The apparatus according to claim 18, wherein the video distribution unit further comprises:

a third parameter determining sub-unit, configured to obtain the number of the repeating broadcasting channels, the number of repeating broadcasting slices, and a curve of the number of on-line viewers of each video program;

a third partitioning sub-unit, configured to partition the curve of the number of on-line viewers by a time length period corresponding to each addition of a repeating broadcasting channel according to a relation list between the number of the repeating broadcasting channels and the number of repeating broadcasting slices;

a first sorting result obtaining sub-unit, configured to obtain an area between the number of on-line viewers corresponding to a time length period of a last repeating broadcasting channel of a video program distributed through the repeating broadcasting channels and a viewing time progress, and arrange in descending order to obtain a first sorting result;

a second sorting result obtaining sub-unit, configured to use the popularity to arrange the video programs that are not placed in the repeating broadcasting channels for distribution in an ascending order to obtain a second sorting result; and obtain an area between the number of on-line viewers corresponding to a time length period of the first n−1 repeating broadcasting channels of each video program in the second sorting result and the viewing time progress, wherein n is the number of the repeating broadcasting channels of the video programs that are not placed in the repeating broadcasting channels for distribution; and a sixth video distribution sub-unit, configured to compare an area between the number of on-line viewers corresponding to the time length period of the first n−1 repeating broadcasting channels of a first video program in the second sorting result and a viewing time progress with the sum of areas between the number of on-line viewers corresponding to the time length period of the first n−1 last repeating broadcasting channels in the first sorting result and the viewing time progress; if the area between the number of on-line viewers corresponding to the time length period of the first n−1 repeating broadcasting channels of the first video program in the second sorting result and the viewing time progress is greater than the sum of areas between the number of on-line viewers corresponding to the time length period of the first n−1 last repeating broadcasting channels in the first sorting result and the viewing time progress, use the corresponding n−1 repeating broadcasting channels in the first sorting result for repeatedly broadcasting the video contents corresponding to the time length period of the first n−1 repeating broadcasting channels of the first video program in the second sorting result; continuously compare the area between the number of on-line viewers corresponding to the time length period of the first n−1 repeating broadcasting channels of a second video program in the second sorting result and the viewing time progress with the sum of areas between the number of on-line viewers corresponding to the time length period of the first n−1 last repeating broadcasting channels in remaining areas in the first sorting result and the viewing time progress, until the video content corresponding to the time length period of the last repeating broadcasting channel of the video program distributed through the repeating broadcasting channels is replaced or the area between the number of on-line viewers corresponding to the time length period of the first n−1 repeating broadcasting channels of the current video program in the second sorting result and the viewing time progress is less than or equal to the sum of the areas between the number of on-line viewers corresponding to the time length period of the first n−1 last repeating broadcasting channels in the remaining areas in the first sorting result and the viewing time progress;

and arrange the repeating broadcasting channels to distribute the corresponding video content.

25. The apparatus according to claim 18, wherein the number of the repeating broadcasting channels of the video program is determined by the popularity obtaining unit by taking the derivative of the sum of a repeating broadcasting flow and a supplementary packet flow of the video program distributed through the repeating broadcasting channels; the repeating broadcasting slice time length is determined according to the repeating broadcasting slice number and the video program time length; and the repeating broadcasting slice number is determined using the repeating broadcasting channel number.

26. The apparatus according to claim 18, wherein the repeating broadcasting slice time length of the video program is set by the popularity obtaining unit as a constant; the number of the repeating broadcasting channels is determined according to the repeating broadcasting slice number; and the repeating broadcasting slice number is determined using the repeating broadcasting slice time length and the video program time length.

27. The apparatus according to claim 18, wherein when the repeating broadcasting slice time length of the video program obtained by the popularity obtaining unit is greater than a time length threshold, a video content is obtained by means of broadcasting on demand from a starting moment of the video program, and the video content of the video program is obtained through the repeating broadcasting channels from a moment corresponding to a starting point of a first video sub-slice appearing at any one repeating broadcasting channel.

28. The apparatus according to claim 18, wherein the video distribution apparatus further comprises:
a first target video program recommendation unit, configured to, when the number of the repeating broadcasting channels is greater than the total number of the repeating broadcasting channels occupied by all video programs distributed through the repeating broadcasting channels, distribute the corresponding video program through spare repeating broadcasting channels according to the total preference degree list.

29. The apparatus according to claim 28, wherein the video distribution apparatus further comprises:
a first result obtaining unit, configured to obtain a first result, wherein the first result represents a broadcasting-on-demand flow expected to be generated for the recommended video program;
a second result obtaining unit, configured to determine a video program with a minimum broadcasting-on-demand flow carried by repeating broadcasting in all video programs distributed by means of repeating broadcasting, and according to the curve of the number of on-line viewers, determine a second result, wherein the second result represents an area between the number of on-line viewers in the last repeating broadcasting channel of the video program with the minimum broadcasting-on-demand flow carried by repeating broadcasting and the viewing time progress; and
a second target video program recommendation unit, configured to compare the first result with the second result, and when the first result is greater than the second result, use the last repeating broadcasting channel of the video program with the minimum broadcasting-on-demand flow carried by repeating broadcasting to push the video program to a corresponding user terminal; and use an area between the number of on-line viewers in the last repeating broadcasting channel of the video program with the minimum broadcasting-on-demand flow carried by remaining repeating broadcasting and the viewing time progress as a second area to continue the comparison until the first result is less than the second result.

30. The apparatus according to claim 18, wherein the method for distributing the video program through the repeating broadcasting channels for the video distribution unit is a DeRe repeating broadcasting method or a WHB repeating broadcasting method.

31. The apparatus according to claim 30, wherein the video distribution unit comprises:
a first segmenting sub-unit, configured to segment the video program with equal time length to obtain video slices $S_i$ of each time system, wherein i is a slice serial number of the video slice; all video slices $S_i$ are connected in series in ascending order of the slice serial numbers to constitute the video program; and the time system is a time length of the video slices $S_i$ of the video program;
a second segmenting sub-unit, configured to segment each video slice $S_i$ with equal time length to obtain video sub-slices $S_{i,j}$ of each time system, wherein the number of the video sub-slices $S_{i,j}$ of each time system is equal to the slice serial number of the corresponding video slice in the same time system; i is the slice serial number of the video slice; j is sub-slice serial numbers of all video sub-slices of the video slice; and all video sub-slices $S_{i,j}$ are connected in series in ascending order of the sub-slice serial numbers to constitute the video slice $S_i$; and
a first repeating broadcasting sub-unit, configured to transmit the video sub-slices of all time systems through at least two repeating broadcasting channels to implement the repeating broadcasting of the video program.

32. The apparatus according to claim 31, wherein the first repeating broadcasting sub-unit comprises:
a first repeating broadcasting distribution module, configured to, according to the size of a first video sub-slice of each video slice, successively place the first video sub-slice of each video slice at a corresponding position in a space of a first time system of a corresponding repeating broadcasting channel in ascending order of the serial numbers of repeating broadcasting signals based on ascending order of the sub-slice serial numbers; and
a second repeating broadcasting distribution module, configured to, in a space of any other time system k of all repeating broadcasting channels, set a position of the video sub-slice $S_{i,j}$ of each video slice $S_i$ in the repeating broadcasting channels the same as a position of a first video sub-slice $S_{i,1}$ of the corresponding video slice in a space of a first time system of the repeating broadcasting channels, wherein j=(k−1)mod i+1.

33. The apparatus according to claim 18, wherein the video distribution unit further comprises:
a fourth sorting sub-unit, configured to, according to the popularity, sort the video programs that are not placed in the repeating broadcasting channels for distribution; and a seventh video distribution sub-unit, configured to, when the repeating broadcasting channels are spare, use a sorting result to distribute the video programs that are not placed in the repeating broadcasting channels for distribution in a repeating broadcasting manner until all repeating broadcasting channels are used.

* * * * *